US012726608B2

(12) United States Patent
Rufitskiy et al.

(10) Patent No.: US 12,726,608 B2
(45) Date of Patent: Sep. 1, 2026

(54) FLIPPED TEMPLATES FOR RECONSTRUCTION-REORDERED INTRA BLOCK COPY

(71) Applicant: Comcast Cable Communications, LLC, Philadelphia, PA (US)

(72) Inventors: Vasily Alexeevich Rufitskiy, Vladimir (RU); Alexey Konstantinovich Filippov, Khimki (RU); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 139 days.

(21) Appl. No.: 18/521,166

(22) Filed: Nov. 28, 2023

(65) Prior Publication Data

US 2024/0179302 A1 May 30, 2024

Related U.S. Application Data

(60) Provisional application No. 63/428,393, filed on Nov. 28, 2022.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/137* (2014.11); *H04N 19/176* (2014.11)

(58) Field of Classification Search
CPC ........................... H04N 19/105; H04N 19/132
See application file for complete search history.

(56) References Cited

U.S. PATENT DOCUMENTS 10,327,002 B2 6/2019 Pang et al.
10,523,948 B2 12/2019 Xu et al.
(Continued)

FOREIGN PATENT DOCUMENTS

WO 2021056454 A1 4/2021

OTHER PUBLICATIONS

JVET-AA0070-v1, Joint Video Experts Team (JVET) of ITU-T SG 16 WP 3 and ISO/IEC JTC 1/SC 29 27th Meeting, by teleconference, Jul. 13-22, 2022, Source: Bytedance Inc., Title: EE2-3.2: Reconstruction-Reordered IBC for screen content coding.
(Continued)

*Primary Examiner* — Irfan Habib
(74) *Attorney, Agent, or Firm* — Banner & Witcoff, Ltd.

(57) ABSTRACT

A current block may be encoded/decoded based on a reference block flipped relative to the current block. An indication of whether a value of a parameter (e.g., a block vector difference) indicating the reference block matches a value of a predictor for the parameter (e.g., a block vector difference predictor) may be entropy encoded. The predictor may be selected from among a plurality of candidates based on costs associated with the plurality of candidates associated with candidate reference blocks. The cost of each candidate may be based on comparisons between a template of a current block and templates of the candidate reference blocks, where the templates of the candidate reference blocks have a shape flipped relative to that of the current block.

20 Claims, 28 Drawing Sheets

(51) Int. Cl.
*H04N 19/137* (2014.01)
*H04N 19/176* (2014.01)

(56) References Cited

U.S. PATENT DOCUMENTS 12,356,004 B2 * 7/2025 Chen .................... H04N 19/176
12,388,978 B2 * 8/2025 Chen .................... H04N 19/105
12,445,596 B2 * 10/2025 Li ........................ H04N 19/105
2014/0219356 A1 * 8/2014 Nishitani ............... H04N 19/51 375/240.16
2015/0373370 A1 12/2015 Rapaka et al.
2017/0195677 A1 7/2017 Ye et al.
2022/0256189 A1 * 8/2022 Lee ...................... H04N 19/593
2023/0217037 A1 * 7/2023 Ruiz Coll ............ H04N 19/593 375/240.16
2024/0022711 A1 * 1/2024 Li ........................ H04N 19/105
2024/0022763 A1 * 1/2024 Chen .................... H04N 19/159
2024/0146931 A1 * 5/2024 Park ..................... H04N 19/137
2024/0179301 A1 * 5/2024 Filippov .............. H04N 19/105
2024/0179302 A1 * 5/2024 Rufitskiy ............. H04N 19/105
2024/0187613 A1 * 6/2024 Filippov .............. H04N 19/105
2024/0223756 A1 * 7/2024 Zhang .................. H04N 19/176
2024/0223797 A1 * 7/2024 Chen .................... H04N 19/159
2024/0236299 A1 * 7/2024 Xu ......................... H04N 19/55
2024/0236330 A9 7/2024 Li et al.
2024/0236367 A1 * 7/2024 Chen .................... H04N 19/167
2024/0244180 A1 * 7/2024 Rufitskiy ............. H04N 19/105
2024/0298025 A1 * 9/2024 Zhang .................... H04N 19/52
2024/0357080 A1 * 10/2024 Zhang .................. H04N 19/105
2024/0357097 A1 * 10/2024 Chen .................... H04N 19/105
2024/0364870 A1 * 10/2024 Filippov ................ H04N 19/46
2024/0364904 A1 * 10/2024 Kang ..................... H04N 19/44
2024/0380907 A1 * 11/2024 Xu ....................... H04N 19/172
2024/0414323 A1 * 12/2024 Kang ..................... H04N 19/44
2025/0168348 A1 * 5/2025 Chernyak ............ H04N 19/132
2025/0193389 A1 * 6/2025 Xiu ...................... H04N 19/176
2025/0247547 A1 * 7/2025 Kim ..................... H04N 19/119
2025/0294142 A1 * 9/2025 Wang ................... H04N 19/136
2025/0324029 A1 * 10/2025 Wang ..................... H04N 19/18
2025/0350778 A1 * 11/2025 Filippov ................ H04N 19/52

OTHER PUBLICATIONS

JVET-AB2025, Joint Video Experts Team (JVET) of ITU-T SG 16 WP 3 and ISO/IEC JTC 1/SC 29 28th Meeting, Mainz, DE, Oct. 20-28, 2022, Source: Editors, Title: Algorithm Description of Enhanced Compression Model 7 (ECM 7).
JVET-Z0159-v1, Joint Video Experts Team (JVET) of ITU-T SG16 WP3, 26th Meeting, by teleconference, Apr. 20-29, 2022, Source: Bytedance Inc., Title: Non-EE2: Reconstruction-Reordered IBC for screen content coding.
Jian Cao et al., "Intra Block Copy Mirror Mode for Screen Content Coding in Versatile Video Coding," published Feb. 19, 2021, IEEE Access, vol. 9, 2021.
JVETAA0203-V1, Joint Video Experts Team of ITU-T SG16 WP3, 27th Meeting, by teleconference, Jul. 13-22, 2022, Source: Ofinno, LLC, Title: Crosscheck of JVET-AA0062 (EE2-3.3: Combination of EE2-3.1 and EE2-3.2).
JVET-AA2025, Joint Video Experts Team of ITU-T SG16 WP3, 27th Meeting, by teleconference, Jul. 13-22, 2022, Source: Editors, Title: Algorithm description of Enhanced Compression Model 6 (ECM 6).
Mar. 21, 2024—International Search Report—App. No. PCT/US2023/081361.
May 26, 2026—Japanese Office Action—JP App. 2025-531210.

* cited by examiner

Determine a block vector difference (BVD) associated with a current block (CB)
2302

Determine candidate templates of respective reference block (RB) candidates indicated by respective BVD candidates, wherein each of the candidate templates has a shape matching that of a current template, of the CB, flipped in a direction
2304

Compare samples in each of the candidate templates against samples in the current template to calculate respective costs
2306

Select, based on the costs, one of the BVD candidates as a BVD predictor
2308

Entropy encode an indication of whether a value of a symbol of the BVD matches a value of the symbol of the BVD predictor
2310

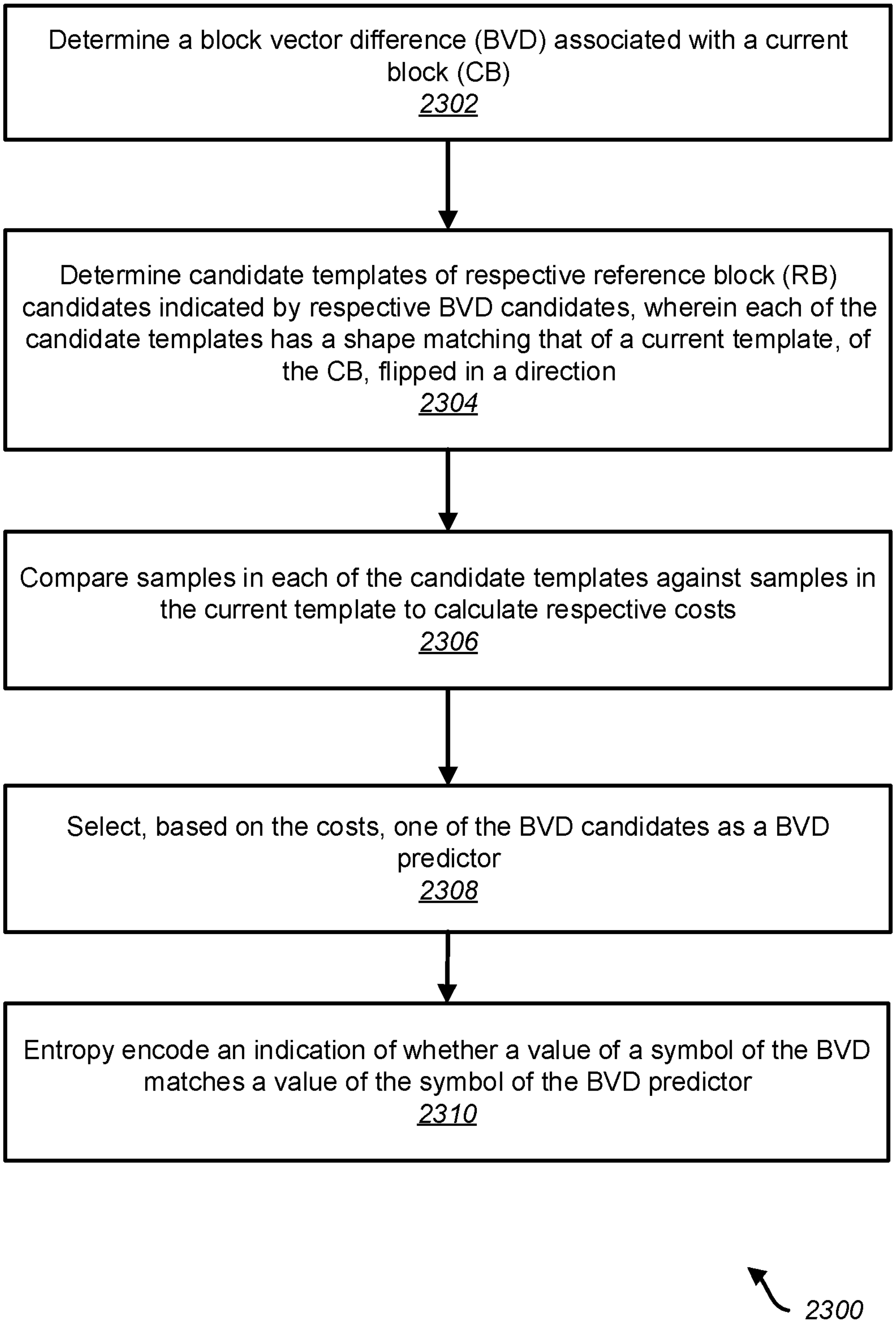

FIG. 23

FLIPPED TEMPLATES FOR RECONSTRUCTION-REORDERED INTRA BLOCK COPY

CROSS-REFERENCE TO RELATED APPLICATIONS

This application claims the benefit of U.S. Provisional Application No. 63/428,393, filed on Nov. 28, 2022, the entirety of which is hereby incorporated by reference in its entirety.

BACKGROUND

A video may be processed for storage, transmission, reception, and/or output (e.g., display). Processing the video comprises encoding and/or decoding, for example, to reduce a data size associated with the video.

SUMMARY

The following summary presents a simplified summary of certain features. The summary is not an extensive overview and is not intended to identify key or critical elements.

A video may comprise a sequence of frames (pictures) to be output consecutively. Predictive encoding and decoding may involve the use of information associated with reference blocks, within a frame, to encode and/or decode other blocks in the same frame. A reference block may be transformed (e.g., flipped) with respect to a current block to be encoded and/or decoded based on the reference block. A location of the reference block may be indicated by a block vector. The block vector may be determined based on a block vector predictor. An indication of whether a value based on the block vector matches a corresponding value based on the block vector predictor may be encoded and/or decoded. Encoding/decoding the indication may improve compression efficiency of the block vector difference, among other advantages. The block vector predictor may be determined from candidate block vector predictors based on template matching between a current template (of the current block) and candidate templates (of candidate reference blocks corresponding to the candidate block vector difference predictors). The candidate templates may be transformed (e.g., flipped) relative to the current template similarly to how the reference block is transformed relative to the current block. Transforming (e.g., flipping) the candidate templates may improve accuracy in determining the block vector predictor, among other advantages.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 23 shows an example method for using template matching to encode a current block (CB) that is flipped with respect to a reference block.

DETAILED DESCRIPTION

Figure 1:
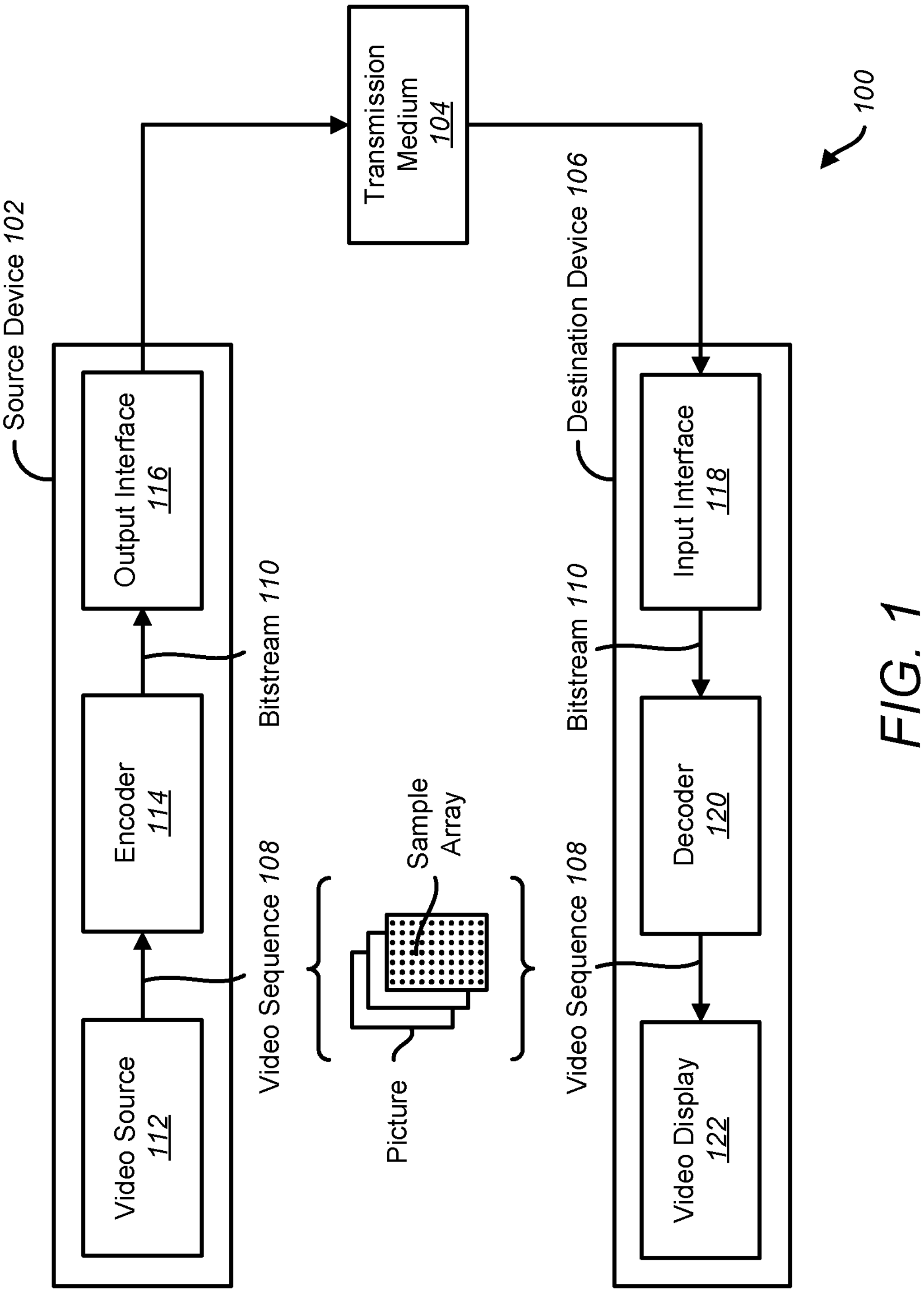
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
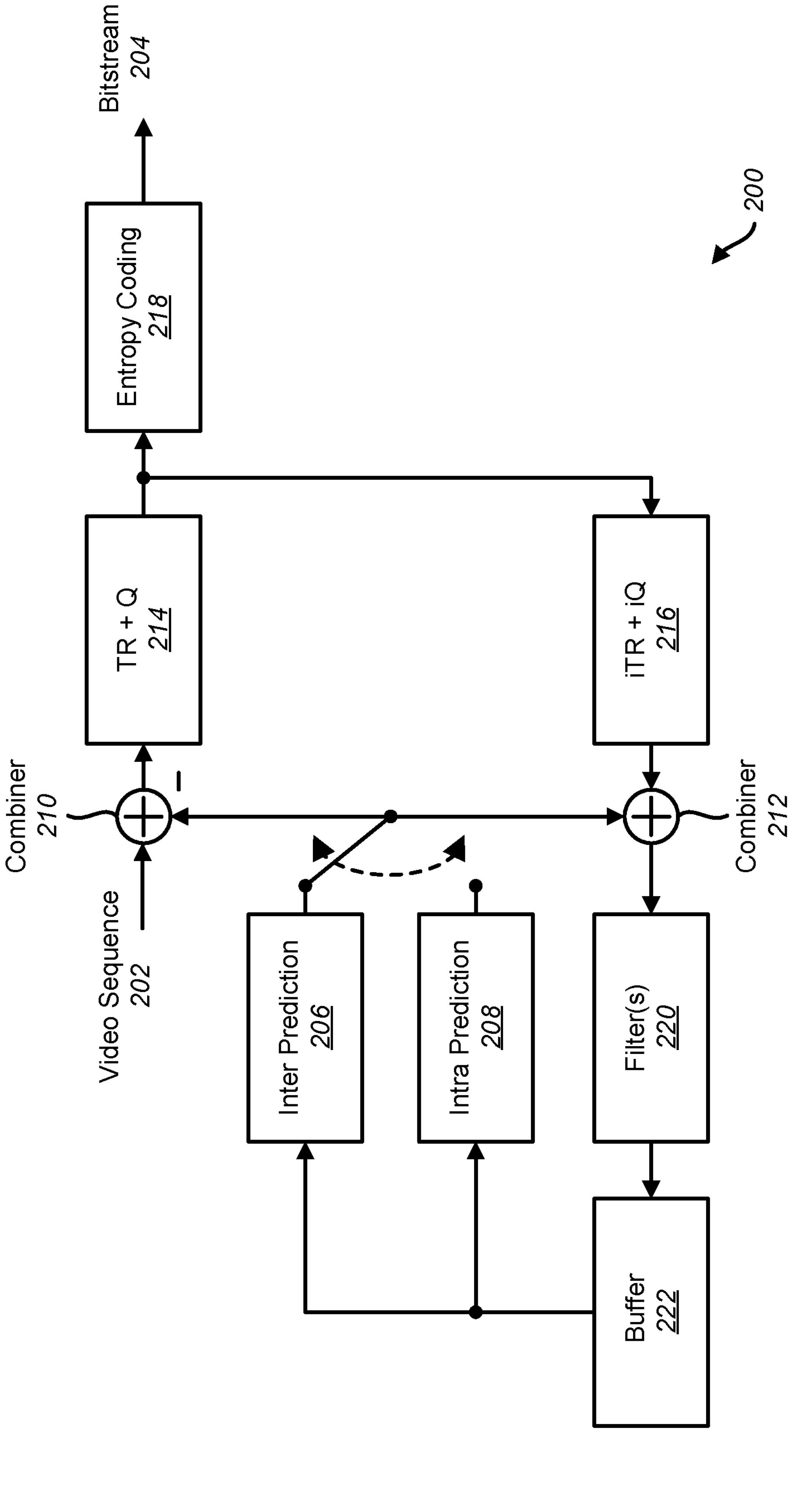
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
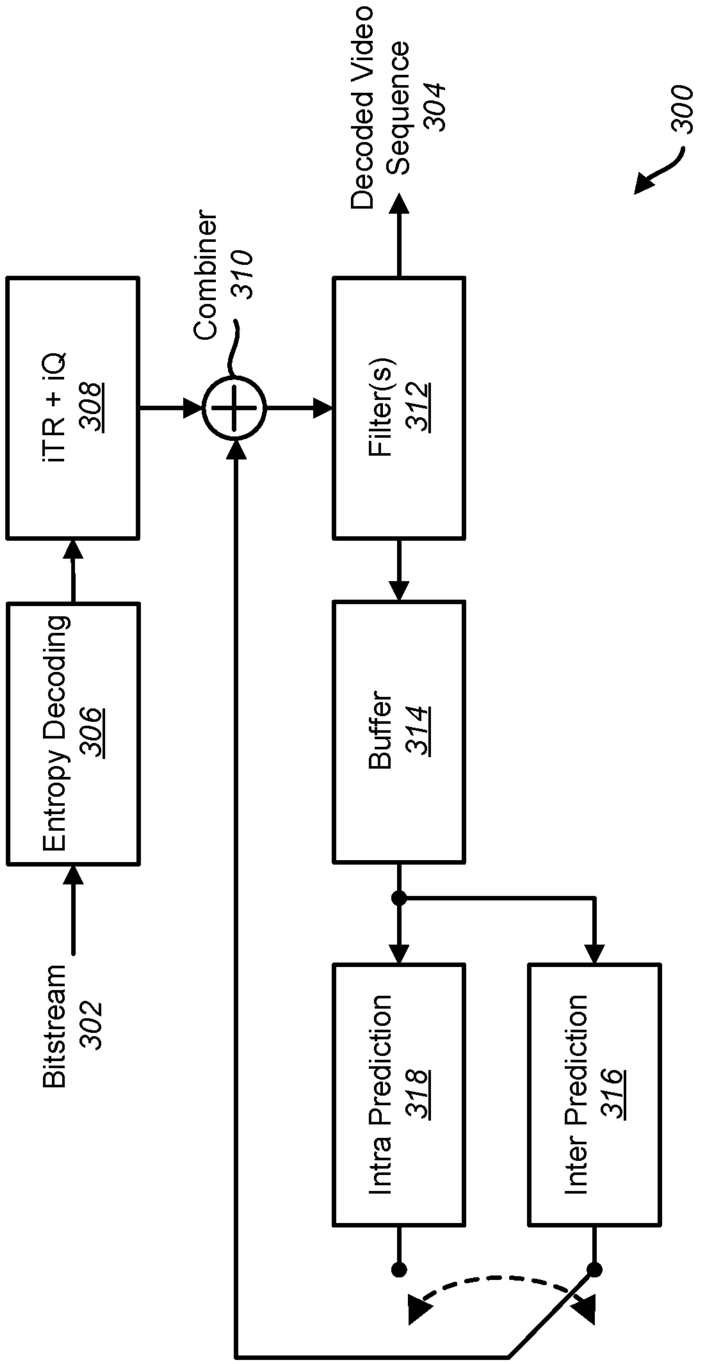
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG.

2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtrec. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
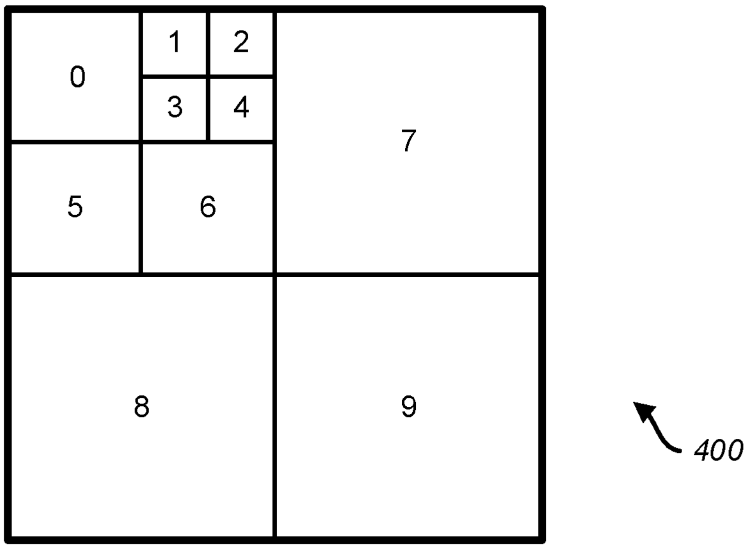
FIG. 4 shows an example quadtree partitioning of a coding tree block (CTB).
Figure 5:
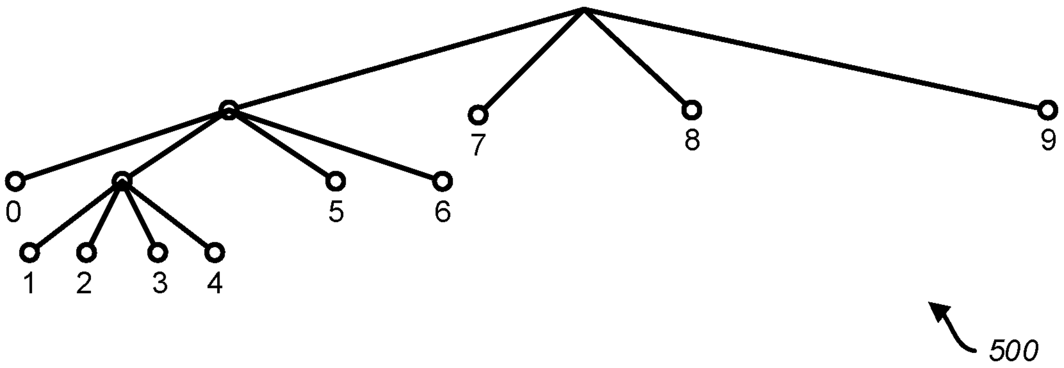
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
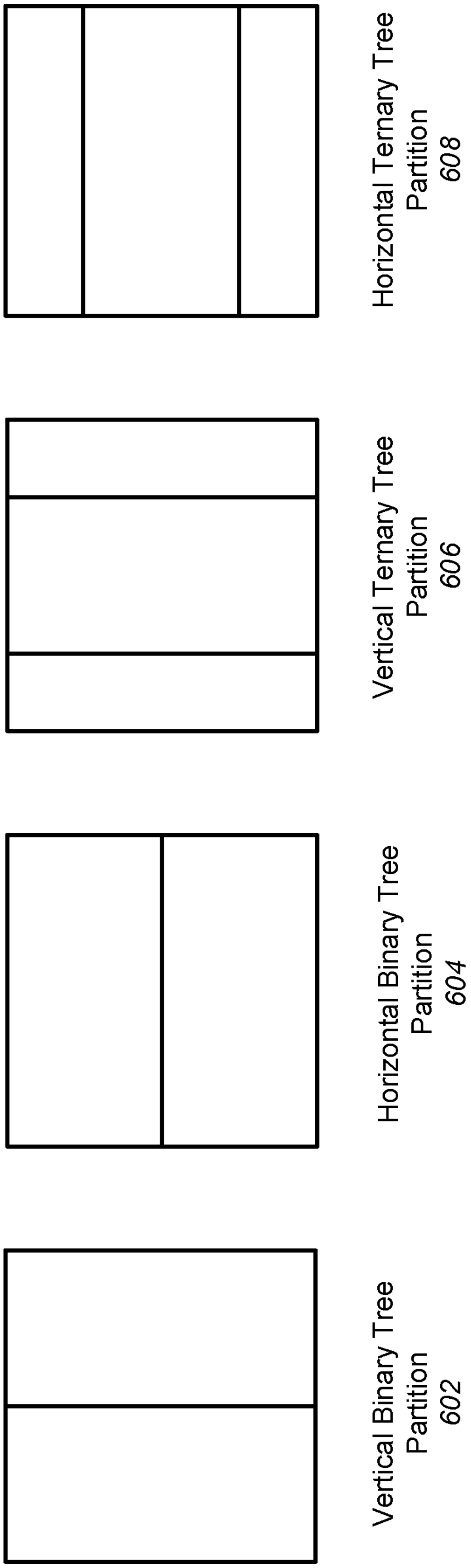
FIG. 6 shows example binary tree and ternary tree partitions.

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary trec partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
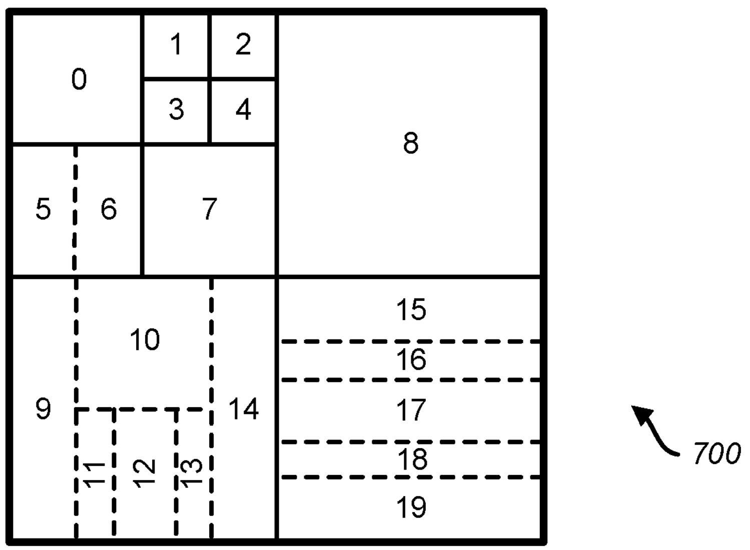
FIG. 7 shows an example of combined quadtree and multi-type tree partitioning of a CTB.
Figure 8:
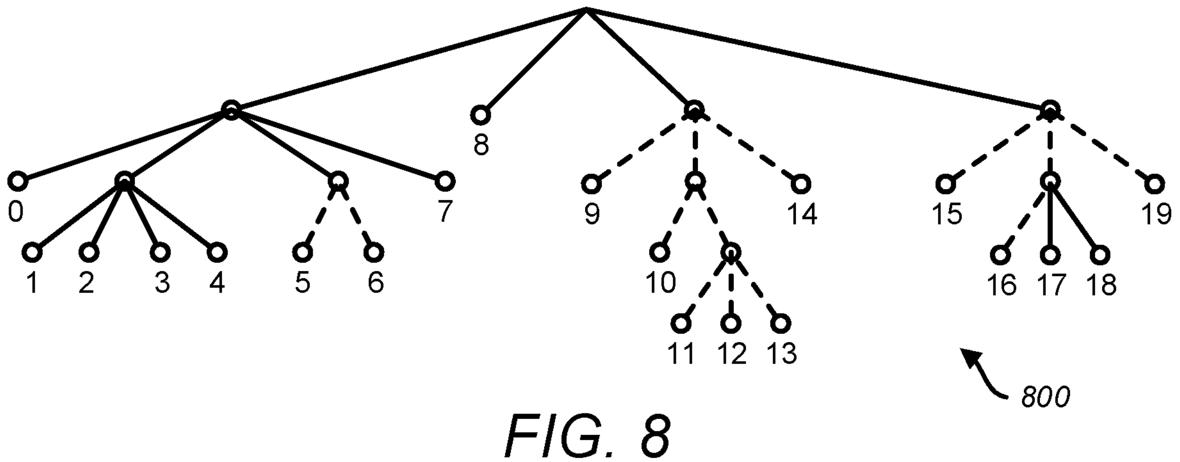
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type trec partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBS, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBS of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC. VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
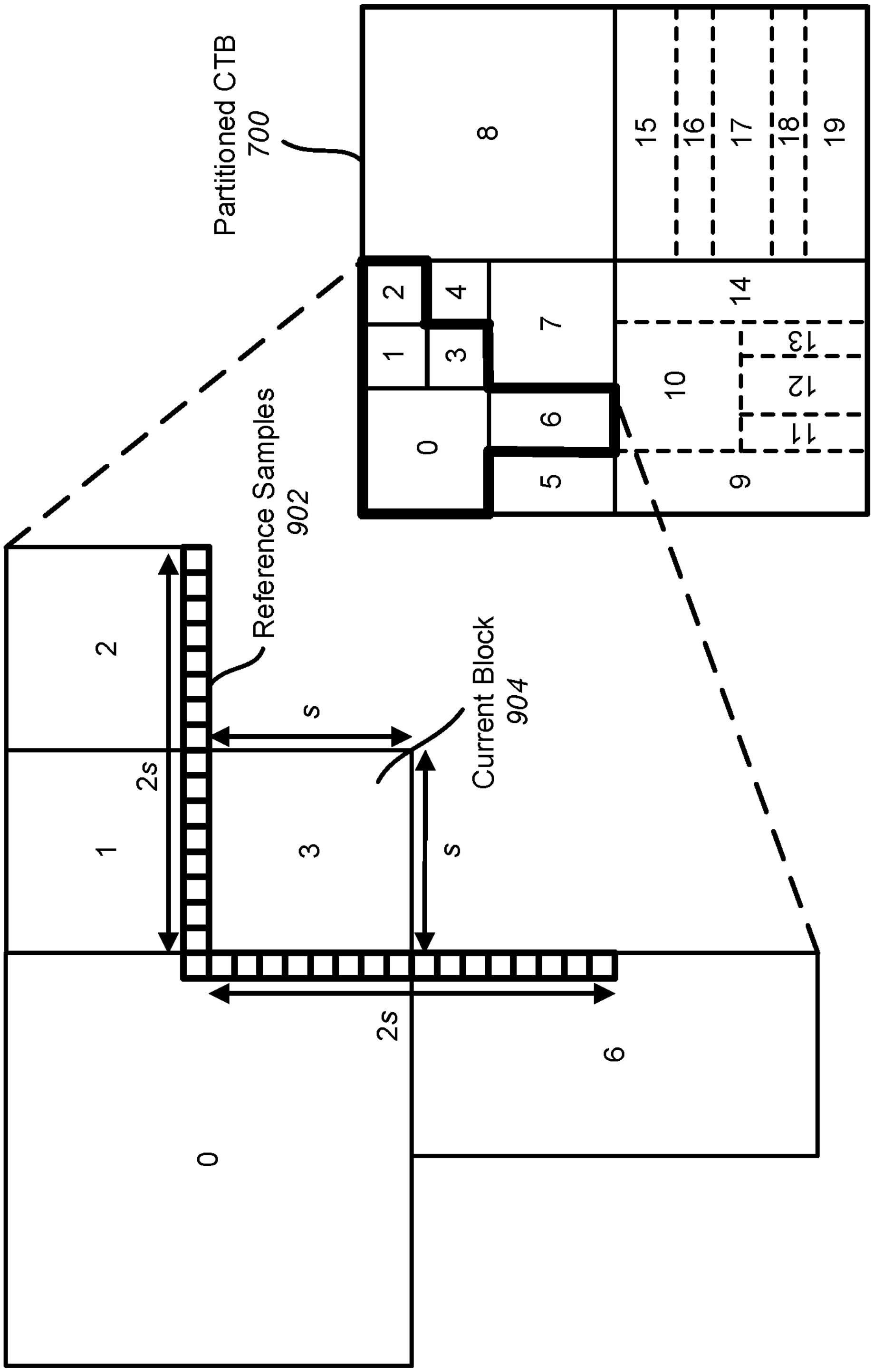
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2 w samples (or any other quantity of samples) of the row immediately adjacent to the top-most row of the current block 904, 2*h* samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described herein. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
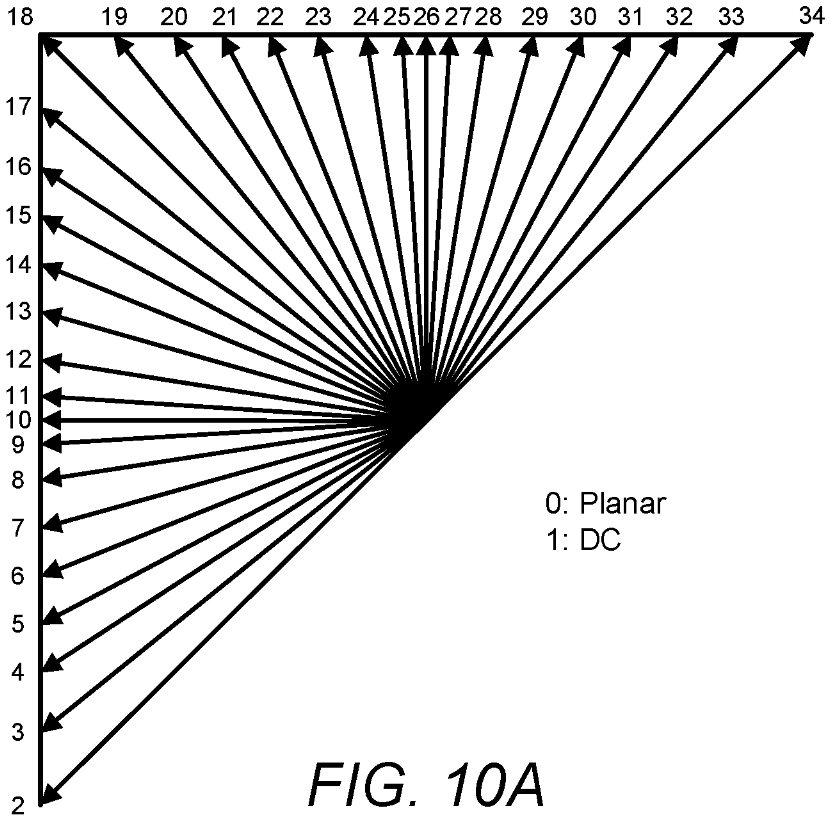
FIGS. 10A and 10B show example intra prediction modes.
Figure 10B:
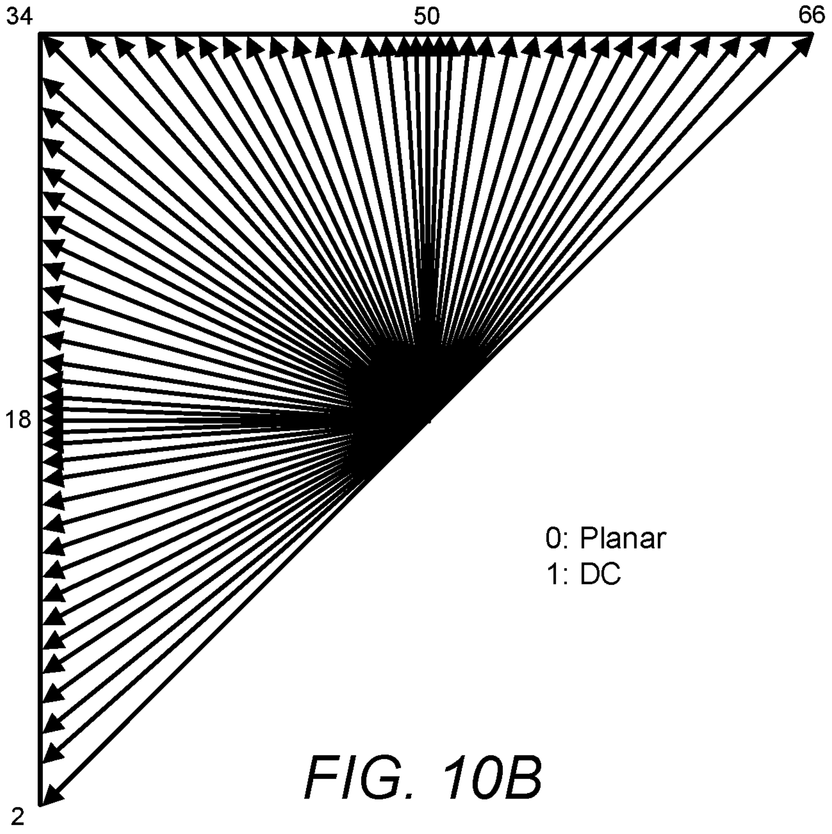

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
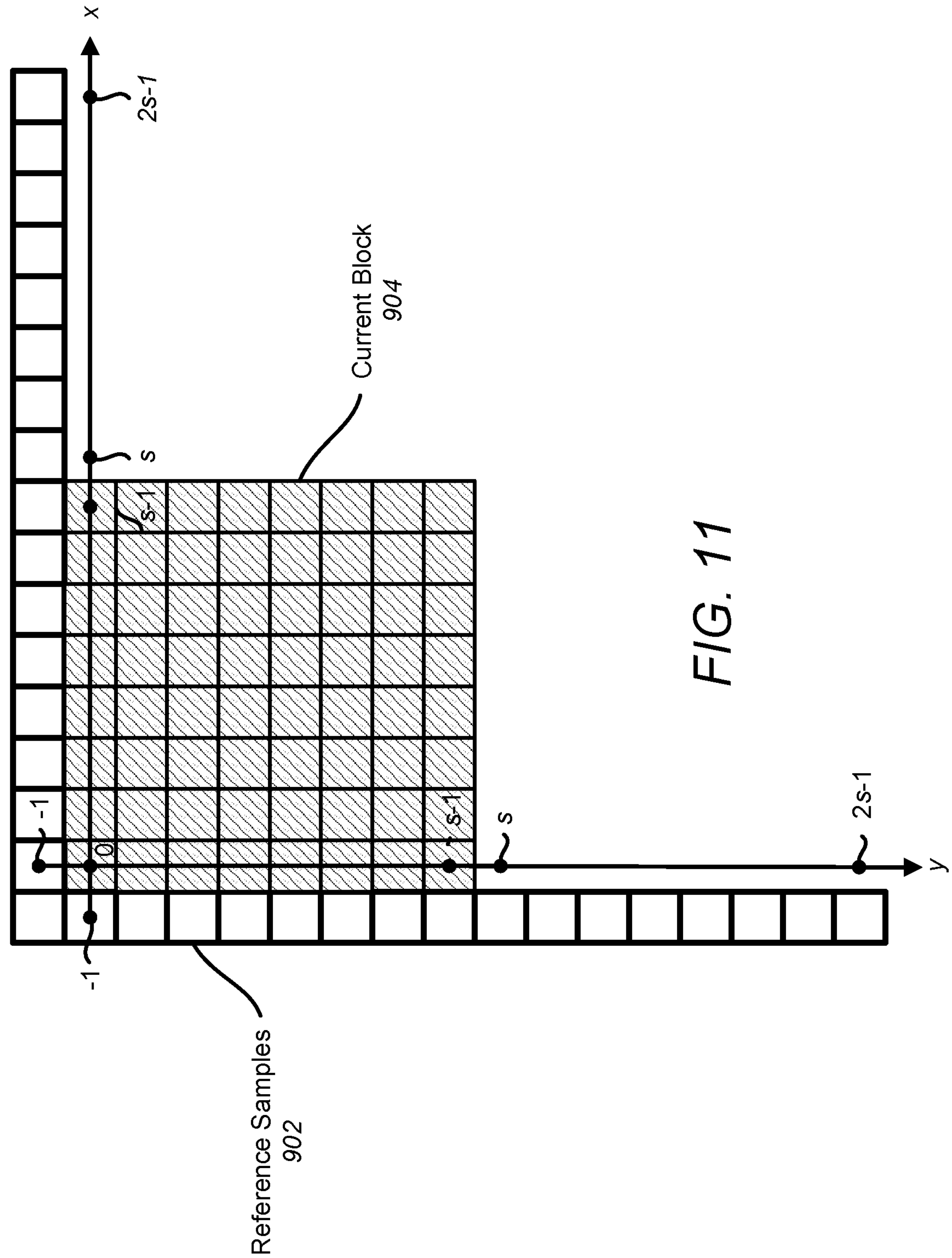
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x] = p[-1+x][-1], (x \geq 0). \tag{1}$$

The reference samples 902 to the left of the current block 904 may be placed in the one-dimensional array $ref_2[y]$:

$$ref_2[y] = p[-1][-1+y], (y \geq 0). \tag{2}$$

The prediction process may comprise determination of a predicted sample p[x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \tag{3}$$

where $$h[x][y] = (s - x - 1) \cdot ref_2[y] + (x + 1) \cdot ref_1[s] \tag{4}$$

may be the horizontal linear interpolation at the location [x][y] in the current block 904 and $$v[x][y] = (s - y - 1) \cdot ref_1[x] + (y + 1) \cdot ref_2[s] \tag{5}$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p [x][y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \tag{6}$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
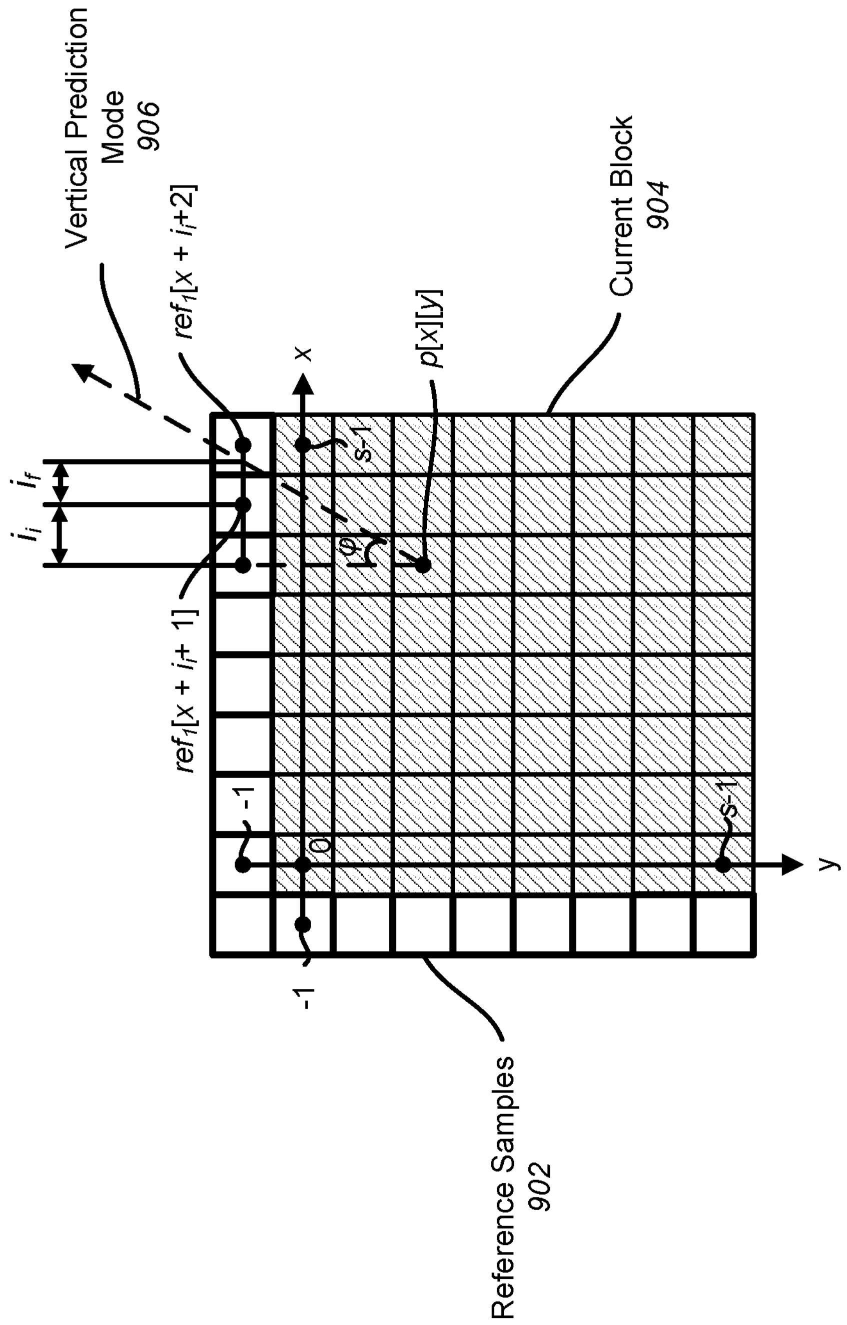
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y] = (1 - i_f) \cdot ref_1[x + i_i + 1] + i_f \cdot ref_1[x + i_i + 2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i = \lfloor (y + 1) \cdot \tan\varphi \rfloor. \quad (8)$$

$i_f$ may be the fractional part of the horizontal displacement of the projection point relative to the location [x][y] and may be determined/calculated as:

$$i_f = ((y + 1) \cdot \tan\varphi) - \lfloor (y + 1) \cdot \tan\varphi \rfloor, \quad (9)$$

where $\lfloor \bullet \rfloor$ is the integer floor function.

A location [x][y] of a sample in the current block 904 may be projected onto the vertical line of reference samples $ref_2[y]$, such as for horizontal prediction modes. A predicted sample p [x][y] for horizontal prediction modes may be determined/calculated as:

$$p[x][y] = (1 - i_f) \cdot ref_2[y + i_i + 1] + i_f \cdot ref_2[y + i_i + 2]. \quad (10)$$

$i_f$ may be the integer part of the vertical displacement of the projection point relative to the location [x][y]. $i_f$ may be determined/calculated as a function of the tangent of the angle φ of the horizontal prediction mode as:

$$i_i = \lfloor (x + 1) \cdot \tan\varphi \rfloor. \quad (11)$$

$i_f$ may be the fractional part of the vertical displacement of the projection point relative to the location [x][y]. $i_f$ may be determined/calculated as:

$$i_f = ((x + 1) \cdot \tan\varphi) - \lfloor (x + 1) \cdot \tan\varphi \rfloor, \quad (12)$$

where $\lfloor \bullet \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., 1/32 sample accuracy, or accuracy defined by any Other Metric). For 1/32 Sample Accuracy, the Set of Two-Tap FIR Interpolation Filters may comprise up to 32 different two-tap FIR interpolation filters—one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i] \cdot ref_1[x + iIdx + i], \quad (13)$$

where fT[i], i=0 . . . 3, may be the filter coefficients, and Idx is integer displacement. A predicted sample p[x][y], for horizontal prediction modes, may be determined based on the four-tap FIR filter as:

$$p[x][y] = \sum_{i=0}^{3} fT[i] \cdot ref_2[y + iIdx + i]. \quad (14)$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in $ref_2[y]$ in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in $ref_1[x]$ on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described herein for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
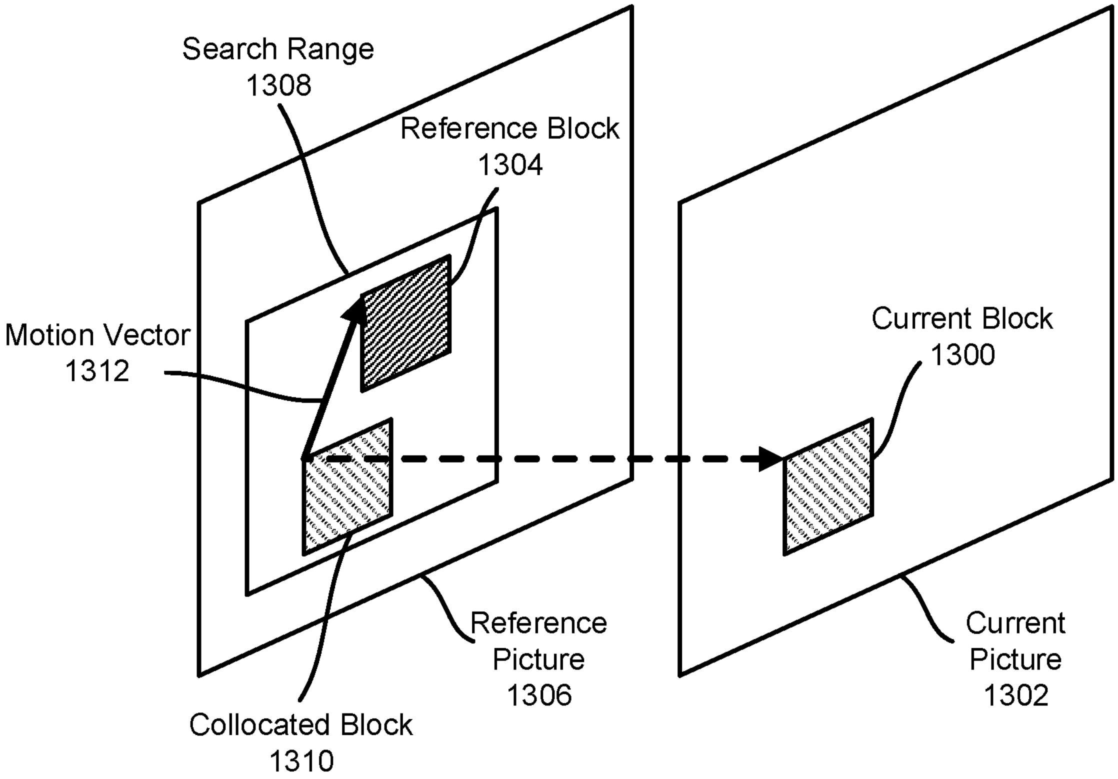
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
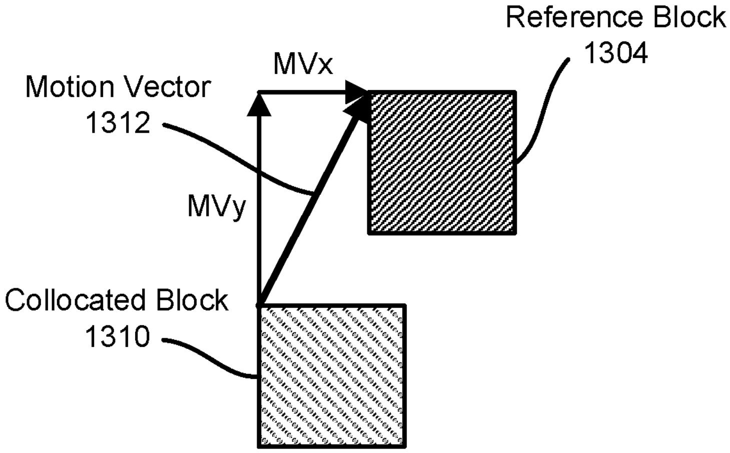
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component (MVx) and a vertical component (MVy) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have ½, ¼, ⅛, 1/16, 1/32, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
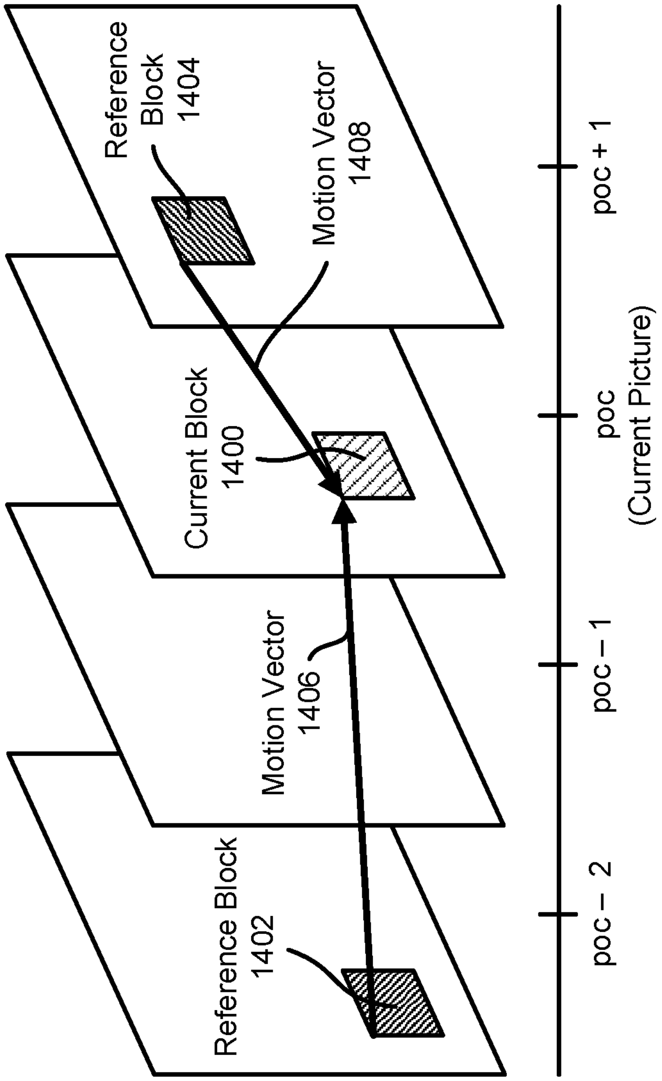
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture. of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component (MVx) and a vertical component (MVy)) relative to a position of the current block being coded, the MVD may be represented by two components $MVD_x$ and $MVD_y$. $MVD_x$ and $MVD_y$ may be determined/calculated as:

$$MVD_x = MV_x - MVP_x, \tag{15}$$

$$MVD_y = MV_y - MVP_y. \tag{16}$$

MVDx and MVDy may respectively represent horizontal and vertical components of the MVD. MVPx and MVPy may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
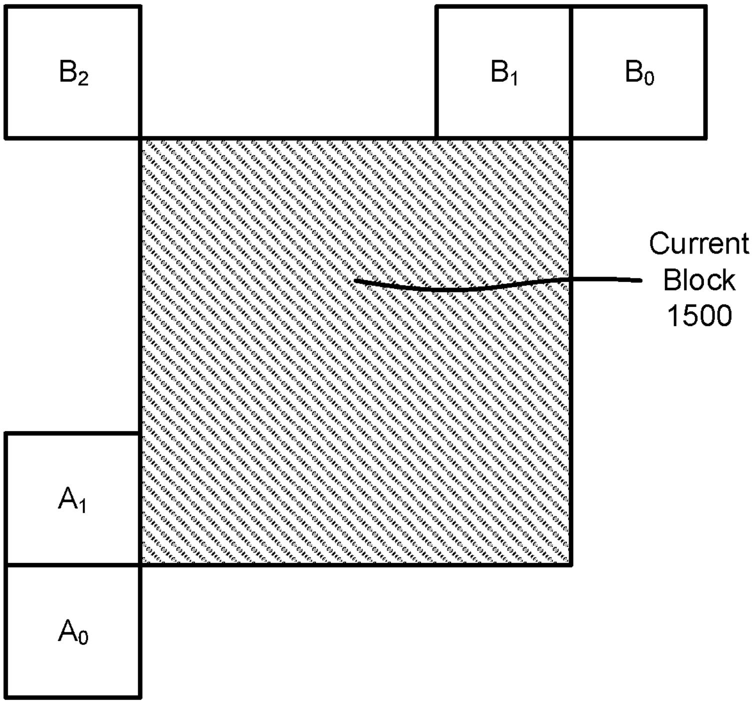
FIG. 15A shows example spatial candidate neighboring blocks for a current block.
Figure 15B:
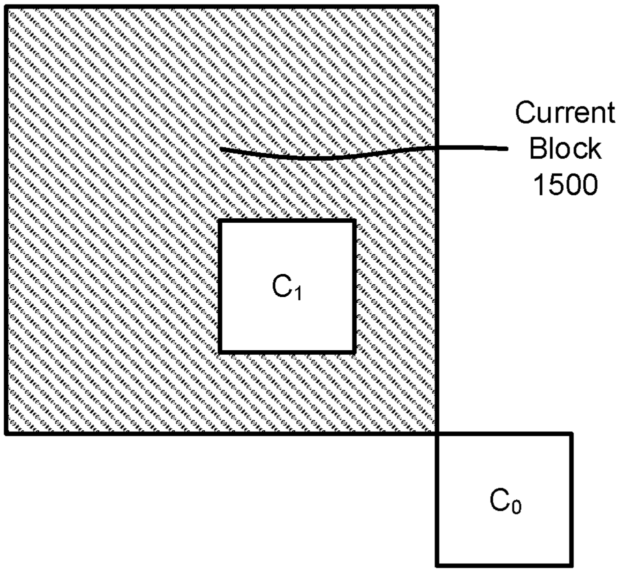
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to the current block 1500. The two temporal, co-located blocks may be C0 and C1. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks A0, A1, B0, B1, and B2) for inter prediction of a current block. The encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

Figure 16:
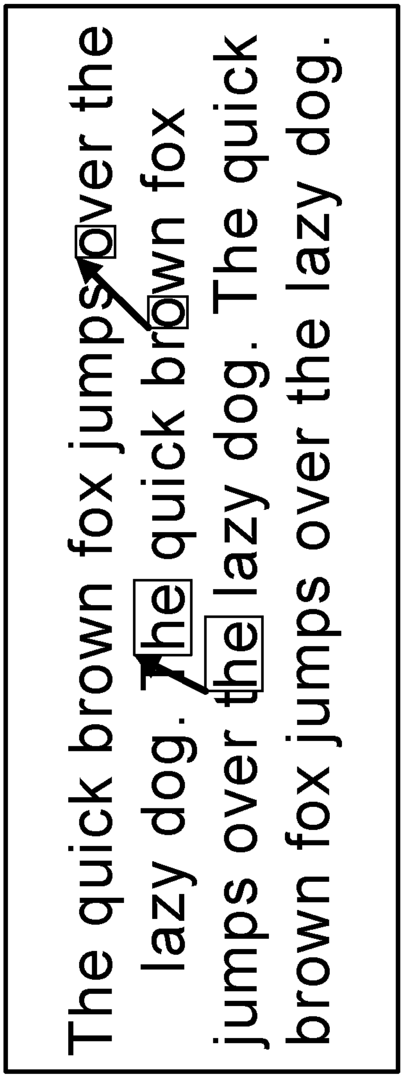
FIG. 16 shows an example of intra block copy (IBC) for encoding.

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate the selected BVP in the list of candidate BVPs. The BVD may be determined/calculated based on a difference between a BV of the current block and the selected BVP. For example, for a BV that indicates a position (e.g., represented by a horizontal component (BVx) and a vertical component (BVy)) relative to a position of the current block being coded, the BVD may represented by two components $BVD_x$ and $BVD_y$. $BVD_x$ and $BVD_y$ may be determined/calculated as:

$$BVD_x = BV_x - BVP_x, \tag{17}$$

$$BVD_y = BV_y - BVP_y. \tag{18}$$

BVDx and BVDy may respectively represent horizontal and vertical components of the BVD. BVPx and BVPy may respectively represent horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted A0, A1, B0, B1, and B2. The list of candidate BVPs may comprise more than two candidate BVPs.

A reference block may be determined as a best matching reference block to a current block (e.g., in IBC as used for screen content). Arrows (e.g., as shown in FIG. 16) may correspond to BVs that indicate respective displacements from respective current blocks to respective reference blocks that best match the respective current blocks. The reference blocks may match the respective current blocks. The determined/calculated residuals (e.g., prediction errors) may be small, if not zero.

In some instances, video content may be more efficiently encoded by considering symmetry properties. Symmetry may often be present in video content (e.g., in text character regions and computer-generated graphics in screen content video).

A reconstruction-reordered intra block copy (RRIBC) mode (e.g., also referred to as IBC mirror mode) (e.g., for screen content video coding) may advantageously consider symmetry within video content to improve the coding efficiency of IBC. The RRIBC mode may be adopted into a software algorithm (e.g., enhanced compression model (ECM) software algorithm that is currently under coordinated exploration study by the joint video exploration team (JVET) of ITU-T Video coding experts group (VCEG), ISO/IEC MPEG, or any other video coding technologies) as a potential enhancement (e.g., beyond the capabilities of VVC). A residual for a current block may be determined/calculated (e.g., if RRIBC mode is indicated for encoding the current block), for example, based on samples of a reference block (e.g., corresponding to an original reference block being encoded and decoded to form a reconstructed block) that are flipped relative to the current block (e.g., according to a flip direction indicated for the current block). The current block (e.g., the current block to be predicted and/or encoded) may be flipped, for example, before matching and residual calculation (e.g., at the encoder). The reference block may be derived without flipping. The current block (e.g., that was flipped at the encoder) may be determined based on the reference block and residual (e.g., residual information). The current block may be flipped back (e.g., at the decoder) to restore the original orientation of the current block (e.g., before being flipped at the encoder side). Also, or alternatively, the reference block may be flipped for matching, but flipping the current block for matching samples with candidate reference blocks may reduce a number of flipping operations.

The reference block may be flipped (e.g., instead of the current block being flipped). The reference block may be flipped, for example, to encode the current block (e.g., at the encoder). The reference block may be flipped back (e.g., at the decoder), for example, to restore the original orientation of the reference block at the encoder side. Reference herein to flipping the current block may alternatively refer to flipping the reference block, and vice versa. Flipping of the current block or the reference block may refer to flipping either block in a direction with respect to the other.

The flip direction (e.g., for the RRIBC mode) may comprise one of a horizontal direction or a vertical direction. Horizontal flipping may comprise that samples of the reference block are flipped along a vertical axis of the reference block. Vertical flipping may comprise that samples of the reference block are flipped along a horizontal axis of the reference block.

A first indication (e.g., a first syntax flag), for a current block coded in the RRIBC mode (e.g., an IBC AMVP coded block), may indicate/signal whether to use flipping (e.g., also referred to as mirror flipping) to encode/decode the current block. A second indication (e.g., a second syntax flag), for the current block, may indicate/signal a direction for flipping (e.g., vertical or horizontal). The flip direction (e.g., in IBC merge mode) may be inherited from neighboring blocks, without syntax signaling. Flipping of a reference block (or a current block—replace "Reference" with "Current") in a horizontal direction and a vertical direction may be represented by equations (19) and (20), respectively:

$$\text{Reference}(x, y) = \text{Sample}(w - 1 - x, y) \tag{19}$$

$$\text{Reference}(x, y) = \text{Sample}(x, h - 1 - y) \tag{20}$$

where w and h are the width and height of a current block, respectively. Sample(x,y) may indicate a sample value located at position (x, y). Reference(x,y) may indicate a corresponding reference sample value, for example, after flipping at position (x, y). Equation (19) shows, for horizontal flipping, that the reference block is flipped in a horizontal direction by sampling from right to left. Equation (20) shows, for vertical flipping, that the reference block is flipped in the vertical direction by sampling the reference block from down to up.

The current block and the reference block may be aligned horizontally or vertically. The current block and the reference block may be aligned horizontally or vertically, for example, if horizontal symmetry or vertical symmetry, respectively, is present. The reference block may be determined from a reference region (comprising candidate reference blocks) that is aligned in (e.g., corresponds to) the same flipping direction (e.g., horizontal direction or vertical direction). The reference block may be determined from a reference region that is aligned in the same flipping direction, for example, based on the RRIBC mode and a flipping direction. The vertical component (BVy) of the BV (e.g., indicating a displacement from the current block to the reference block) may not need to be signaled, for example, if flipping in a horizontal direction is used/indicated. The vertical component (BVy) of the BV may not need to be signaled because it may be inferred to be equal to 0. The horizontal component (BVx) of the BV may not need to be signaled, for example, if flipping in a horizontal direction is used/indicated. The horizontal component (BVx) of the BV may not need to be signaled because it may be inferred to be equal to 0. Only one component, aligned with the direction for flipping, of the BV may be encoded and signaled for the current block.

Figure 17:
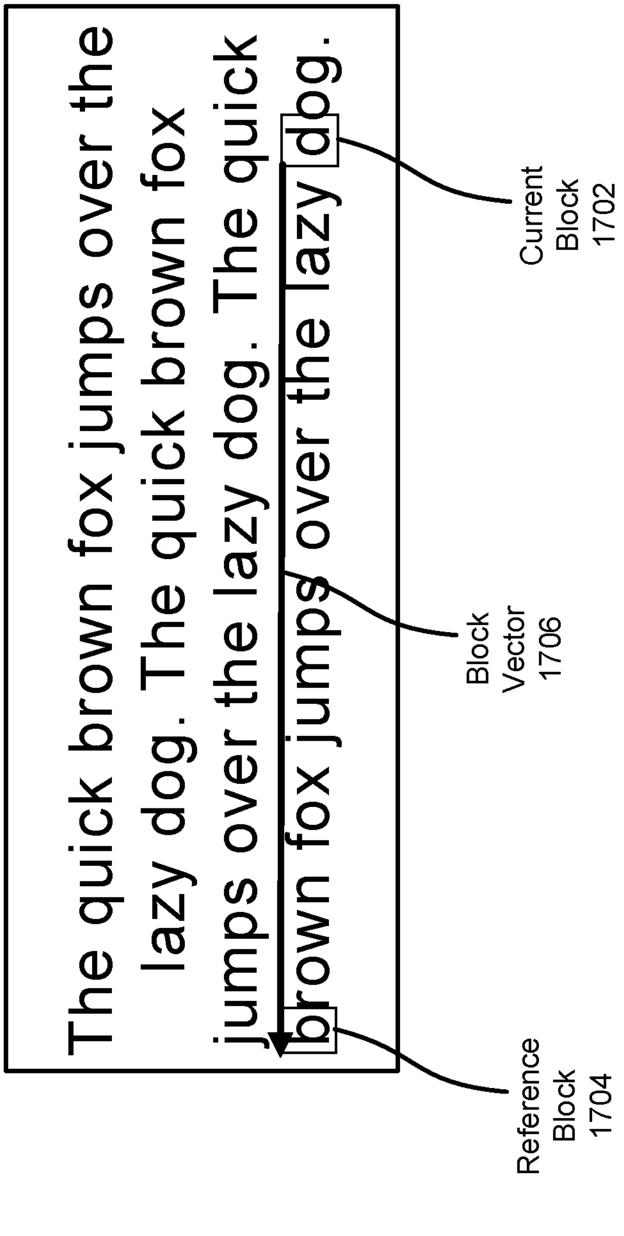
FIG. 17 shows an example of reconstruction-reordered IBC (RRIBC) mode as used for screen content.

FIG. 17 shows an example of RRIBC mode as used for screen content. The RRIBC mode may be used to utilize symmetry within text regions and increase efficiency for coding video content. An encoder (e.g., the encoder described herein with respect to FIG. 16, or encoder 114 as described herein with respect to FIG. 1) may determine that a reference block 1704 is the best matching reference block for a current block 1702. The encoder may determine that the reference block 1704 is the best matching reference block, for example, based on (or after) using horizontal flipping with respect to the reference block 1704. The encoder may select the reference block 1704 as the best matching reference block, for example, based on one or more cost criterion (e.g., a rate-distortion criterion, as described herein). The one or more cost criterion may be used with respect to the reference block 1704 that is flipped (e.g., after the reference block is flipped) in the horizontal direction relative to the current block 1702. For example, the current block 1702 may be flipped before the one or more cost criterion are applied to determine reference block 1704. The reference block 1704 may be located in a reference region that is in horizontal alignment with current block 1702. The reference block 1704 may be located (e.g., constrained to be located) in a reference region that is in horizontal alignment with current block 1702, for example, if horizontal flipping is used. A block vector 1706, indicating a displacement between current block 1702 and the reference block 1704, may be represented as only a horizontal component (BVx) of the BV 1706. The block vector 1706 may be represented as only a horizontal component (BVx) of the BV 1706 because of the constraints on possible locations of reference blocks. The vertical component of BV 1706 may be equal to 0, for example, if horizontal flipping is indicated/used.

A BV for a current block (e.g., coded using IBC) may be constrained to an IBC reference region. The BV may indicate a relative displacement from the current block to a reference block. A BVP that is used to predicatively code a BV may be similarly constrained (e.g., to the IBC reference region). The BVP may be constrained because a BVP may be derived from a BV of a spatially neighboring block, of the current block, or a prior coded BV. A BVD may be determined as a difference between the BV and the BVP. The BVD and an indication of the selected BVP may be encoded and sent via a bitstream to the BVD, and the BVP may enable decoding of the current block (e.g., as described herein). A reference block (e.g., that is flipped in a direction relative to the current block), in RRIBC, may be constrained to (e.g., selected from) an RRIBC reference region. The RRIBC reference region may be in and/or correspond to the direction of the flipping. The RRIBC reference region may be a subset or may be within the IBC reference region. The BVP may be used to predicatively code a BV. for a current block. The BV for the current block may indicate a relative displacement from the current block to a reference block within a reference region (e.g., the RRIBC region). A reference region (e.g., an RRIBC reference region) may be determined to correspond to a direction for flipping a reference block relative to a current block. A reference region (e.g., an RRIBC reference region) may be determined to correspond to the direction for flipping the reference block, for example, based on the RRIBC mode being activated. The reference region may indicate a region, within a picture frame, from which the reference block may be selected (e.g., after flipping the current block).

Figure 18:
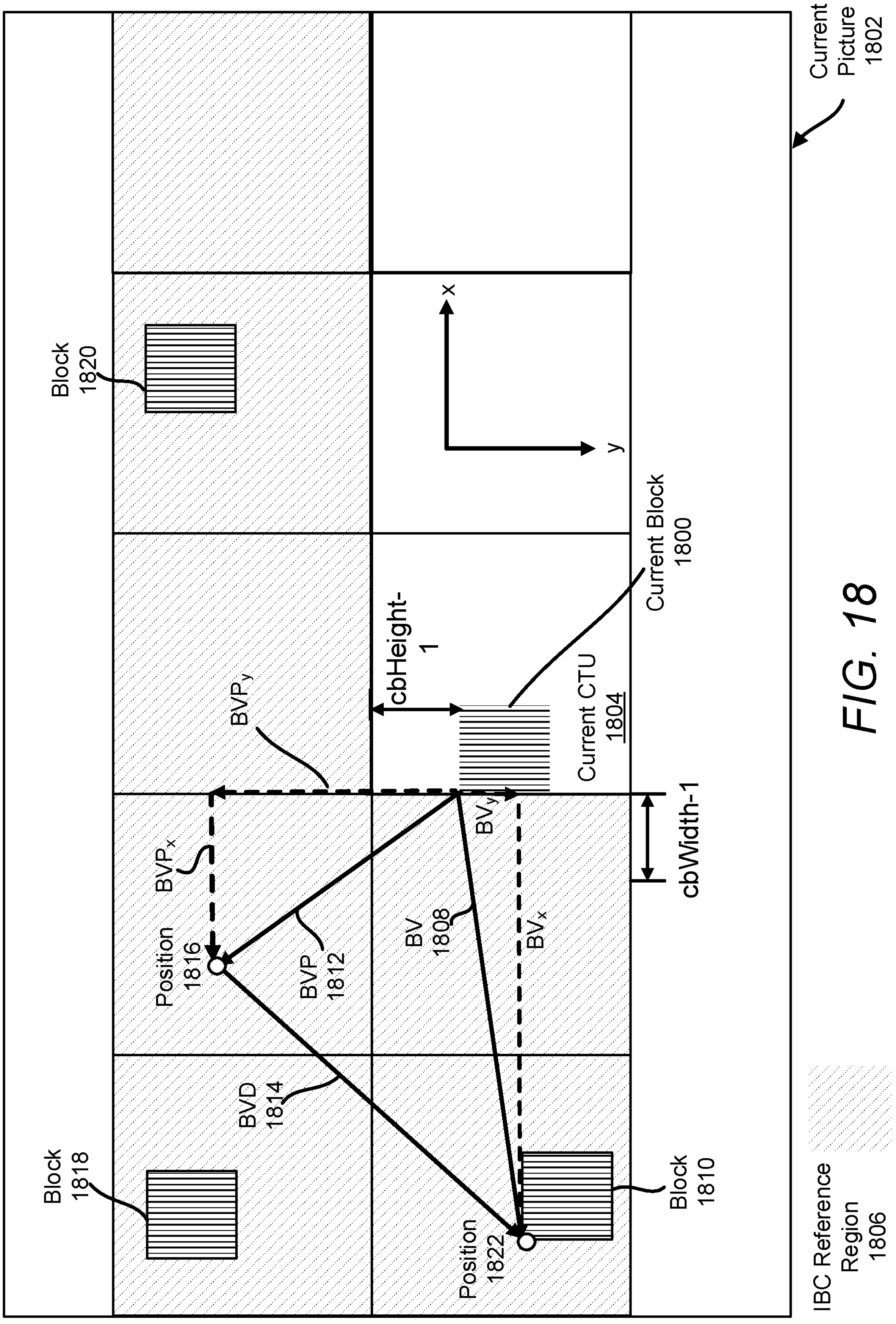
FIG. 18 shows an example of IBC predictive coding.

FIG. 18 shows an example of IBC predictive coding. An encoder (e.g., the encoder 200 in FIG. 2, or any other encoder) may use an IBC prediction mode to code a current block 1800 in a current picture (or portion of a current picture) 1802. The current block 1800 may be a prediction block (PB) or CB within a CTU 1804. IBC may comprise searching for a reference block in a same, current picture as the current block, unlike inter prediction that comprises searching for a reference block in a prior decoded picture that is different than the picture of the current block being encoded. As a result, only a part of the current picture may be available for searching for a reference block in IBC. For example, only the part of the current picture that has been decoded prior to the encoding of the current block may be available for searching for a reference block in IBC. Searching for a reference block in the part of the current picture that has been decoded (e.g., reconstructed and/or encoded then decoded) prior to the encoding of the current block may ensure the encoding and decoding systems can produce identical results but may also limit an IBC reference region.

Blocks may be scanned (e.g., from left-to-right, top-to-bottom) using a z-scan to form a sequence order for encoding/decoding (e.g., in HEVC, VVC, and/or any other video compression standards). The CTUs (represented by the large, square tiles as shown in FIG. 18) to the left and in the row immediately above current CTU 1804 may be encoded/decoded, based on the z-scan, prior to the current CTU 1804 and current block 1800 (e.g., prior to encoding the current CTU 1804 and current block 1800). The samples of the CTUs (e.g., as shown with hatching in FIG. 18) may form an exemplary IBC reference region 1806 for determining a reference block to predict/encode/decode the current block 1800. A different sequence order for encoding/decoding may be used (e.g., in other video encoders, decoders, and/or video compression standards). The IBC reference region 1806 (e.g., location of the IBC reference region) may be affected based on the sequence order.

One or more additional reference region constraints (e.g., in addition to the encoding/decoding sequence order) may be placed on the IBC reference region 1806. For example, the IBC reference region 1806 may be constrained based on a limited memory for storing reference samples. Additionally, or alternatively, the IBC reference region 1806 may be constrained to CTUs, for example, based on a parallel processing approach (e.g., use of tiles or wavefront parallel processing (WPP)). Tiles may be used, as part of a picture partitioning process, for flexibly subdividing a picture into rectangular regions of CTUS such that coding dependencies between CTUs of different tiles are not allowed. WPP may be similarly used, as part of a picture partitioning process, for partitioning a picture into CTU rows such that dependencies between CTUs of different partitions are not allowed. Use of tiles or WPP may enable parallel processing of the picture partitions.

A position of a block may refer to a position of the block's top-left sample. Additionally, or alternatively, the position of a block may be determined by the position of another sample in the block. The position of a sample, in a picture, may be indicated by a sample number in the horizontal direction (e.g., indicated by the variable x) and a sample number in the vertical direction (e.g., indicated by the variable y) relative to an origin (e.g., (x, y)=(0,0)) of the picture coordinate system or relative to a top left sample of a block (e.g., a CTU) in which the sample is located. The origin may be in a top left corner of the picture. In the horizontal x direction, the positive direction may be to the right. As x increases, the sample location may move farther right in the positive, horizontal direction. In the vertical y direction, the positive direction may be down. As y increases, the sample location moves farther down in the positive, vertical direction.

The encoder may use/apply a block matching technique to determine a BV 1808. The BV may indicate a relative displacement from the current block 1800 to a reference block 1810 within the IBC reference region 1806. The reference block 1810 may be a block that matches or best matches the current block 1800 (e.g., in accordance with intra block compensated prediction). Block 1810 may have been determined as the reference block, from the IBC reference region 1806, as being a better match than other blocks such (e.g., block 1818 and block 1820) within IBC reference region 1806. The BV 1808 may point to a position 1822 indicating (e.g., a top left corner of) block 1810. BV 1808 may have a horizontal ("x") component ($BV_x$) and a vertical ("y") component ($BV_y$).

The IBC reference region 1806 may be a constraint that may be used with respect to the BV 1808. The BV 1808 may be constrained by the IBC reference region 1806 to indicate a displacement from the current block 1800 (e.g., position of the current block 1800) to the reference block 1810 (e.g., position of the reference block 1810) that is within the IBC reference region 1806. The positions of the current block 1800 and the reference block 1810 may be determined, for example, based on the positions of their respective top-left samples.

The encoder may determine the best matching reference block from among blocks (e.g., within the IBC reference region 1806) that are tested. The encoder may determine the best matching reference block from among blocks (e.g., within the IBC reference region 1806) that are tested, for example, if a searching process occurs. The encoder may determine that the reference block 1810 may be the best matching reference block, for example, based on one or more cost criteria. The one or more cost criteria may comprise, for example, a rate-distortion criterion (e.g., Lagrangian rate-distortion cost). The one or more cost criteria may be based on, for example, one or more differences (e.g., one or more of an SSD, an SAD, an SATD, and/or a difference determined based on a hash function) between prediction samples of the reference block and original samples of the current block 1800. The reference block 1810 may comprise decoded (and/or reconstructed) samples of the current picture 1802 prior to being processed by in-loop filtering operations (e.g., deblocking and/or SAO filtering).

The encoder may determine and/or use a difference (e.g., a corresponding sample-by-sample difference) between the current block 1800 and the (determined and/or generated) reference block 1810. The difference may be referred to as a prediction error or residual. The encoder may store and/or send/signal, in/via a bitstream, the prediction error and related prediction information for decoding.

The prediction information may include the BV 1808. The prediction information may include an indication of the BV 1808. The BV 1808 may be predictively coded. The BV 1808 may be predictively coded, for example, before being stored and/or signaled via a bit stream (e.g., in HEVC, VVC, and/or other video compression schemes). The BV 1808 for the current block 1800 may be predictively coded (e.g., using a similar technique as AMVP for inter prediction). The BV 1808 may be predictively coded technique using BV prediction and difference coding. The encoder may code the BV 1808 as a difference between the BV 1808 and a BVP 1812, for example, if using BV prediction and difference coding technique. The encoder may select the BVP 1812 from a list of candidate BVPs. The BVP 1812 may have a horizontal ("x") component ($BVP_x$) and a vertical ("y") component ($BVP_y$). The BVP 1812 may point to/indicate a position 1816 within IBC reference region 1806. The candidate BVPs may be determined based on/from previously decoded BVs of blocks neighboring the current block 1800 and/or from other sources. A null BVP candidate (e.g., with an x-component and/or y-component with zero magnitude) may be added to the list of candidate BVPs, for example, if a BV from a neighboring block of the current block 1800 is not available. Both the encoder and decoder may generate and/or determine the list of candidate BVPs.

The encoder may determine a BVD 1814, for example, based on the encoder selecting the BVP 1812 from the list of candidate BVPs 18. The BVD 1814 may be calculated, for example, based on the difference between the BV 1808 and the BVP 1812. For example, the BVD 1814 may be represented by two directional components calculated according to equations (17) and (18), which are reproduced below:

$$BVD_x = BV_x - BVP_x \tag{17}$$

$$BVD_y = BV_y - BVP_y \tag{18}$$

$BVD_x$ and $BVD_y$ may respectively represent the horizontal and vertical components of the BVD 1814. BVx and BVy may respectively represent the horizontal and vertical components of the BV 1808. $BVP_x$ and $BVP_y$ may respectively represent the horizontal and vertical components of the BVP 1812. The horizontal x-axis and vertical y-axis are indicated in the lower right-hand corner of current picture 1802 for reference purposes. The x-axis may increase from left to right, and the y-axis may increase from top to bottom.

The encoder may signal, via a bitstream, the prediction error (e.g., residual), an indication of the selected BVP 1812 (e.g., via an index indicating the BVP 1812 in the list of candidate BVPs), and the separate components of BVD 1714 (e.g., as determined based on equations (17) and (18)). A decoder (e.g., the decoder 300, or any other video decoder), may decode the BV 1808, for example, by adding corresponding components of the BVD 1814 to corresponding components of the BVP 1812. The decoder may determine and/or generate the reference block 1810 (e.g., which forms/corresponds to a prediction of current block 1800) using the decoded BV 1808. The decoder may decode the current block 1800, for example, by combining the prediction with the prediction error received via the bitstream.

Figure 19:
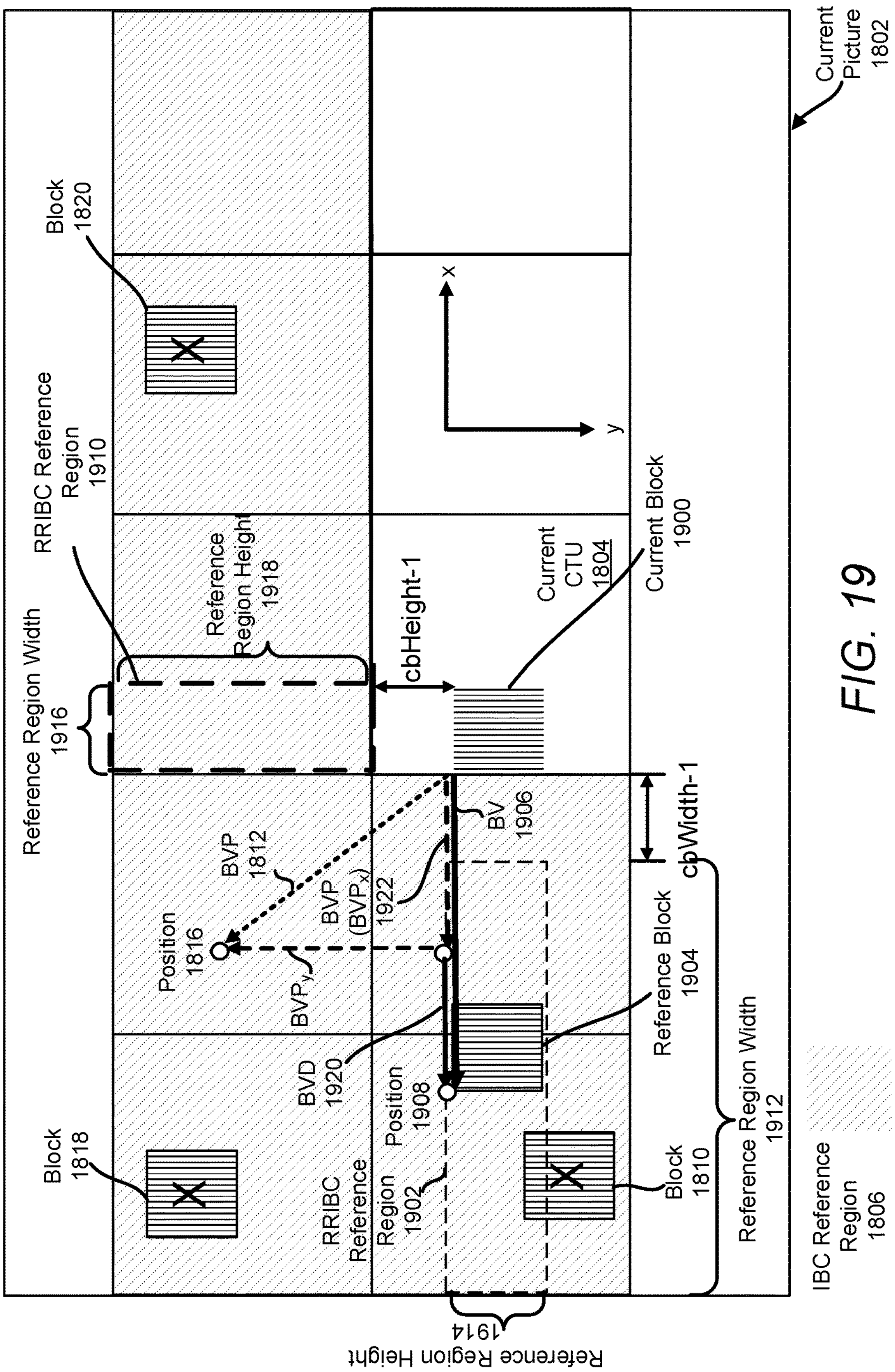
FIG. 19 shows an example RRIBC coding.

FIG. 19 shows an example RRIBC coding. For ease of reference, many of the elements from FIG. 18 are reproduced and similarly labeled in FIG. 19. FIG. 19 shows a current picture 1802 with an IBC reference region 1806. In FIG. 18, the current block 1804 is IBC coded. FIG. 19 shows a current block 1900 (e.g., within current CTU 1804) that is RRIBC coded.

The encoder may determine a reference region corresponding to a direction for flipping a reference block (e.g., relative to current block 1900), for example, based on use of an RRIBC mode. The encoder may determine the reference region corresponding to the direction for flipping, for example, based on the current block 1900 (e.g., to be coded in flipped mode/the RRIBC mode) and the direction for flipping the current block 1900 relative to the reference block (or vice versa). The reference region may be a rectangular reference region. The reference region may be in alignment with the direction for flipping.

The reference region for coding the current block 1900 may be determined as an RRIBC reference region 1902 that comprises as a rectangular region with a reference region width 1912 and a reference region height 1914, for example, based on the direction for flipping being a horizontal direction (e.g., relative to the current block 1900). The reference region width 1912 may be a difference between a left boundary (e.g., leftmost boundary) of an IBC reference region 1806 (e.g., which may have an x coordinate of 0) and a position that is offset to the left, from the current block (e.g., top left most sample of the current block 1900), by a width (cbWidth) or the width−1 of the current block 1900. The reference region height 1914 may be the same as a height (cbHeight) of current block 1900. The RRIBC reference region 1902 (e.g., applicable for flipping in the horizontal direction) may comprise/correspond to: an upper boundary and a lower boundary that correspond to (e.g., are aligned to) an upper boundary and a lower boundary, respectively, of the current block 1900; a right boundary defined by an offset of cbWidth to a left boundary of current block 1900; and a left boundary that corresponds to a left boundary of the IBC reference region 1806.

The reference region for coding the current block 1900 may be determined as an RRIBC reference region 1910 that comprises a rectangular region with a reference region width 1916 and a reference region height 1918, for example, based on the direction for flipping being a vertical direction (e.g., relative to the current block 1900). The reference region width 1916 may be the same as a width (cbWidth) of the current block 1900. The reference region height 1918 may be a difference between a top boundary (e.g., top most boundary) of the IBC reference region 1806 (e.g., which may have a y coordinate of 0) and a position (e.g., above the current block 1900 that is offset), from the current block 1900 (e.g., top left most sample of the current block 1900), by a height (cbHeight) of the current block 1900. The RRIBC reference region 1910 (e.g., applicable for flipping in the vertical direction) may comprise/correspond to: a left boundary and a right boundary that correspond to (e.g., are aligned to) a left boundary and a right boundary of the current block, respectively, 1900; a lower boundary defined by an offset of cbHeight above an upper boundary of current block 1900; and an upper boundary that corresponds to a top boundary of the IBC reference region 1806. The RRIBC reference region 1910 may extend beyond one or more of the boundaries of IBC reference region 1806. For example, the upper boundary of RRIBC reference region 1910 may extend beyond the upper boundary of IBC reference region 1806 (e.g., an upper boundary of the current picture 1802).

An RRIBC reference region may be offset from the current block 1900 (e.g., a position of the top left sample of current block 1900) in an x direction (e.g., a horizontal direction) and/or in a y direction (e.g., a vertical direction). The RRIBC reference region 1902 may be indicated by an offset, from the current block 1900, of −cb Width in the x direction and 0 in the y direction, for example, for flipping in a horizontal direction (e.g., horizontal flipping). The RRIBC reference region 1910 may be indicated by an offset, from the current block 1900, of 0 in the x direction and −cbHeight in the y direction. Other directions for flipping may be considered, for example, by defining the reference region as an offset in two directions (or based on an offset vector). Other flipping directions may be used beyond horizontal flipping and vertical flipping. For example, flipping may be defined by an angle relative to the current block 1900. For example, an offset having a same non-zero magnitude in the x direction and in the y direction may indicate flipping at a diagonal relative to the current block 1900.

The reference region (e.g., RRIBC reference region corresponding to flipping) may constrain/limit a location of a block from which a reference block may be determined. For horizontal flipping, some blocks (e.g., blocks 1810, 1818, and 1820, marked by an 'X' as shown in FIG. 19) may not be valid and may not be searched for determining a reference block for coding current block 1900. Again, the reference block may be flipped with respect to the current block 1900 (e.g., the current block 1900 may be flipped before determining the reference block). A reference block 1904 may be determined from within the RRIBC reference region 1902 (e.g., which may be a subset of the IBC reference region 1806). The reference block 1904 may be determined in a manner that is similar, or substantially similar, to the determination of the reference block 1810 in FIG. 18. The reference block 1904 may be determined in a manner that is similar, or substantially similar, to the determination of the reference block 1810 in FIG. 18, except that the reference block 1904 may be determined from the RRIBC reference region 1902 (instead of the IBC reference region 1806) and the current block 1900 may be flipped in the direction (e.g., horizontal) corresponding to the reference region 1902 before being compared with the reference block 1904. A reference block may be determined within the RRIBC reference region 1910 that corresponds to the vertical flipping direction, for example, based on the direction for flipping being vertical.

A list of candidate BVPs may include BVP 1812 (e.g., as described herein with respect to FIGS. 18-19). BVP 1812 may point to position 1816 within IBC reference region 1806. A BVP for predictively coding BV 1906 may be determined based on a component, of the BVP, corresponding to (and/or in alignment with) the direction of flipping. A second list of candidate BVPs may be generated based on the components, of the candidate BVPs, in the direction of flipping. A component of a BVP may be selected that corresponds to the flipping direction, for example, based on the RRIBC mode and the direction for flipping. A horizontal component (BVPx) of BVP 1812 may be selected based on the selected component corresponding to the horizontal flipping. A BVP may have a null component that does not correspond to the direction of flipping (e.g., for RRIBC coding of a current block).

A BVP 1922 (e.g., which may correspond to BVPx of BVP 1812) may be determined for coding BV 1906. For example, the BVP 1922 may be selected from the second list of candidate BVPs. BV 1906 may indicate a displacement of determined/selected reference block 1904 relative to the current block 1900. The BVD 1920 may be calculated, for example, based on a difference between the BV 1906 and the BVP 1922 (e.g., based on equations (17) and (18) described herein). The BV may have a component that is equal to 0 (e.g., a null component). The BV may have a component that is equal to 0, for example, because an RRIBC reference region corresponds to a flipping direction. For example, for horizontal flipping, the BV 1906 may have a non-zero horizontal component (BVx) and a vertical component (BVy) that is 0 (not shown in FIG. 19). The BV 1906, as well as BVD 1920 plus BVP 1922, may point to a position 1908 that indicates (e.g., a top left corner of) reference block 1904.

A BVD (e.g., in the IBC mode or the RRIBC mode) may be encoded by binarizing the magnitude (e.g., horizontal and/or vertical component magnitude) of the BVD using a binarization scheme (e.g., a binarization code). The encoded BVD, following binarization, may include a first part (e.g., a prefix and/or prefix part) that indicates a range of values that the magnitude of the BVD falls within and a second part (e.g., a suffix and/or a suffix part) that indicates a precise value, within the range of values, of the magnitude of the BVD. The BVD may include a horizontal component and a vertical component. The horizontal component and the vertical component may each be separately binarized using the binarization scheme/code. The BVD (e.g., BVD 1920) may be determined for a current block coded in an RRIBC mode, for example, as described herein with respect to FIG. 19. Coding the BVD may comprise that each component (e.g., horizontal/x component and vertical/y component) of the BVD is binarized separately. A first component of the BVD (e.g., BVD coded in RRIBC) in the direction of flipping may be binarized, for example, based on (e.g., because) the other component(s) may be null and/or have a value of 0.

There are a wide class of codes that include a first part that indicates a range of values and a second part that indicates a precise value within the range of values. These codes include, for example, Rice codes, Golomb codes (e.g., Golomb-Rice codes or Exponential Golomb codes), fixed length codes, etc.

For example, the magnitude of horizontal component BVD, of a BVD (e.g., BVD 1920 as shown in FIG. 19) may be binarized/encoded using a Golomb-Rice code. Golomb-Rice codes comprise a first part that that indicates a range of values and a second part that indicates a precise value within the range of values. The first part may be referred to as a prefix part and the second part may be referred to as a suffix part. A Golomb-Rice code Cgr k(v) of order k may comprise a unary coded prefix and k suffix bits (e.g., suffix with a bit length of k). The k suffix bits may be a binary representation of an integer $0 \le i < 2^k$. Golomb codes may use a tunable parameter M to divide an input value v into the prefix part and the suffix part. A prefix value q may be the result of a division by M, and a suffix value $v_s$, may be the remainder. Golomb-Rice codes are a class of Golomb codes where the parameter M is an exponent of 2 (e.g., $2^k$). For the input value v (e.g., where v is a non-negative integer) the prefix part (q) and the suffix part ($v_s$) may be determined by:

$$q = \left\lfloor \frac{v}{2^k} \right\rfloor. \tag{21}$$

$$v_s = v - q(2^k). \tag{22}$$

An example of a Golomb-Rice code for k=4 is given in Table 1. With reference to Table 1, $x_0, x_1, \ldots, x_n$ may denote bits of the codeword with $x_n \in \{0, 1\}$. The bit(s) prior to, and including, the 0 bit may correspond to the prefix part and the bits following the 0 bit may correspond to the suffix part.

TABLE 1

| v | Cgr 4(v) |
|---|---|
| 0, . . . , 15 | 0 $x_3, x_2, x_1, x_0$ |
| 16, . . . , 31 | 1 0 $x_3, x_2, x_1, x_0$ |
| 32, . . . , 47 | 1 1 0 $x_3, x_2, x_1, x_0$ |
| . | . |
| . | . |
| . | . |

The number of prefix bits is denoted by $N_p$, the number of suffix bits is denoted by $N_s$. For the Golomb-Rice code, the number of suffix bits is $N_s=k$. If encoding a value v, the quantity of prefix bits is determined as:

$$N_p = 1 + \left\lfloor \frac{v}{2^k} \right\rfloor. \tag{23}$$

Where $\lfloor x \rfloor$ represents the integer part of x. The suffix is the $N_s$-bit representation of the result of equation (24) (e.g., which is equivalent to equation (22)):

$$v_s = v - 2^k (N_p - 1). \tag{24}$$

The Golomb-Rice codes may use a suffix of fixed length. A length of the suffix may also be determined by the length of the prefix. Exponential Golomb codes (e.g., Exp-Golomb codes) may have a length of a suffix that is determined by the length of the prefix. Exponential Golomb codes may be used to binarize the magnitude of a component of BVD. A kth-order exponential Golomb code $C_{eg\ k}(v)$ may include a unary prefix code and a suffix of variable length. A number/quantity of bits in the suffix $N_s$ (e.g., a bit length of the suffix) may be determined by the value $N_p$ as follows:

$$N_s = k + N_p - 1. \tag{25}$$

The number/quantity of prefix bits $N_p$ (e.g., a bit length of the prefix) of $C_{eg\ k}(v)$ may be determined from the value v by:

$$2^k(2^{N_p - 1} - 1) \le v < 2^k(2^{N_p} - 1). \tag{26}$$

The suffix may be the $N_s$-bit representation of:

$$v_s = v - 2^k(2^{N_p - 1} - 1). \tag{27}$$

A codeword ($v_c$) that represents the value v may comprise a prefix value $v_p$ concatenated to a suffix value $v_s$. A number/quantity of bits of the codeword $N_c$ (e.g., a bit length of the codeword) may be determined as follows:

$$N_c = N_p + N_s. \tag{28}$$

The prefix part may be unary coded such that the prefix value may be represented as a unary value (comprising $i=N_p-1$ bits of 1 s) followed by a termination bit (e.g., separator bit or a delimiter bit). The termination bit may have an opposite value (e.g., 0) to a bit of the unary value. Additionally, or alternatively, the bit values may be swapped. For example, the unary value may comprise i 0s and the termination bit may be 1. The number i may represent a prefix group index that starts at 0. The suffix part may be determined as a (k+i)-bit binary number, which is logically equivalent to equation (25) (e.g., $N_p-1=i$).

Entropy coding may be used, for example, as described with respect to FIGS. 2 and 3. Entropy encoding may be used at and/or after the end of the video encoding process and/or at and/or before the beginning of the video decoding process. Entropy coding may compress a sequence of symbols by representing symbols with greater probability of occurring using fewer bits than symbols with less probability of occurring. Shannon's information theory provides that the optimal average code length for a symbol with probability p is −log 2(p), if the compressed sequence of symbols is represented in bits {0, 1}.

Syntax elements of a video sequence may be entropy encoded and/or decoded to encode or decode video content. The syntax elements may be generated by a video encoder. The syntax elements may describe how a video signal may be reconstructed at a video decoder. For a coding unit (CU), the syntax elements may include an intra prediction mode based on the CU being intra predicted, motion data (e.g., MVD and MVP related data) based on the CU being inter predicted, and/or displacement data (e.g., BVD and BVP related data) based on the CU being predicted using IBC and/or RRIBC mode.

A method of entropy coding may be arithmetic coding. Arithmetic coding is based on recursive interval subdivision. To arithmetically encode a symbol that takes a value from an m-ary source alphabet, an initial coding interval may be divided into m disjoint subintervals. Each of the m disjoint subintervals may have a width proportional to the probability of the symbol having a different one of the values in the m-ary source alphabet. The probabilities of the symbol having the different values in the m-ary source alphabet may be referred to as a probability model for the symbol. The symbol may be arithmetically encoded by choosing the subinterval corresponding to the actual value of the symbol as the new coding interval. By recursively using this interval-subdivision scheme with respect to each symbol si of a given sequence s={s1, s2, . . . , sN), the encoder may determine a value in the range of a final coding interval (e.g., after the Nth interval subdivision) as the arithmetic codeword for the sequence s. Each successive symbol of the sequence s that is encoded may reduce the size of the coding interval in accordance with the probability model of the symbol. The more likely symbol values may reduce the size of the coding interval by less than the more unlikely symbol values and hence add fewer bits to the arithmetic codeword for the sequence s in accordance with the general principle of entropy coding.

Arithmetic decoding may be based on a same recursive interval subdivision. An initial coding interval may be divided into m disjoint subintervals to arithmetically decode a symbol that takes a value from an m-ary source alphabet. Each of the m disjoint subintervals may have a width proportional to the probability of the symbol having a different one of the values in the m-ary source alphabet. The probabilities of the symbol having the different values in the m-ary source alphabet may be referred to as a probability model for the symbol (e.g., as discussed herein). The symbol may be arithmetically decoded from an arithmetic codeword by determining the symbol value corresponding to the subinterval within which the arithmetic codeword falls. This subinterval becomes the new coding interval. The decoder may sequentially decode each symbol si of a sequence s={s1, s2, . . . sN) by recursively using the interval-subdivision scheme N times and determining which subinterval the arithmetic codeword falls within for each recursive iteration.

A different probability model may be used to subdivide the coding interval for each arithmetically coded symbol. The probability model for a symbol may be determined based on (e.g., using) a fixed selection (e.g., based on a position of the symbol in a sequence of symbols representing a syntax element) and/or based on (e.g., using) an adaptive selection from among two or more probability models (e.g., based on information related to the symbol). Two or more symbols in a sequence of symbols may use a joint probability model. Selection of a probability model for a symbol may be referred to as context modeling. Arithmetic coding that uses context modeling may be referred to more specifically as context-based arithmetic coding. The selected probability model may be updated based on the actual coded value of the symbol. For example, the probability of the actual coded value of the symbol may be increased in the probability model while the probability of all other values may be decreased. Arithmetic coding that uses both context modeling and probability model adaptation may be referred to more specifically as context-based adaptive arithmetic coding.

Other variations of arithmetic coding may be possible, as would be appreciated by a person of ordinary skill in the art. A renormalization operation may be used if performing arithmetic coding to ensure that the precision needed to represent the range and lower bound of a subinterval does not exceed the finite precision of registers used to store these values. Also, or alternatively, other simplifications to the coding process may decrease complexity, increase speed, and/or reduce power requirements of the coding process in hardware and/or software. For example, probabilities of symbols and lower bounds and ranges of subintervals may be approximated or quantized.

Figure 20A:
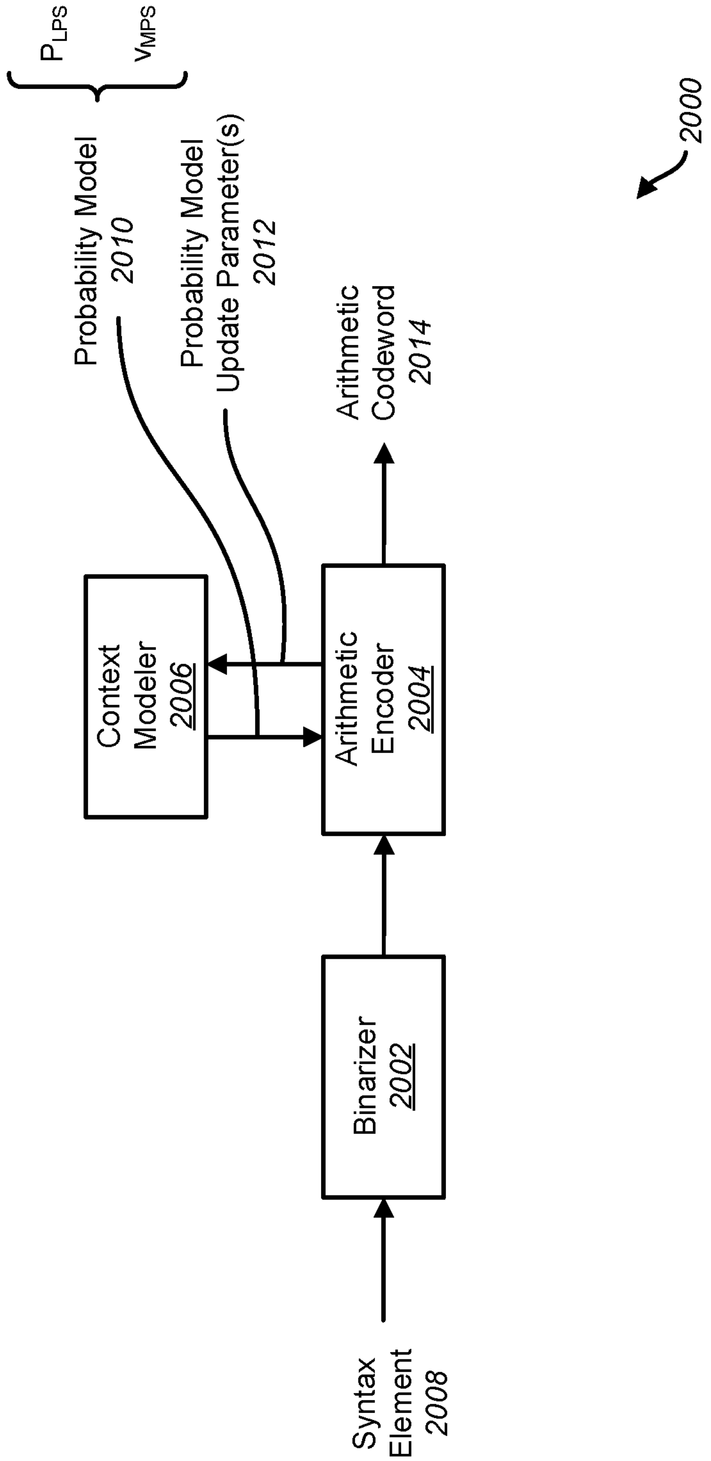
FIGS. 20A and 20B show an example of a context-based adaptive binary arithmetic coding (CABAC) encoder.
Figure 20B:
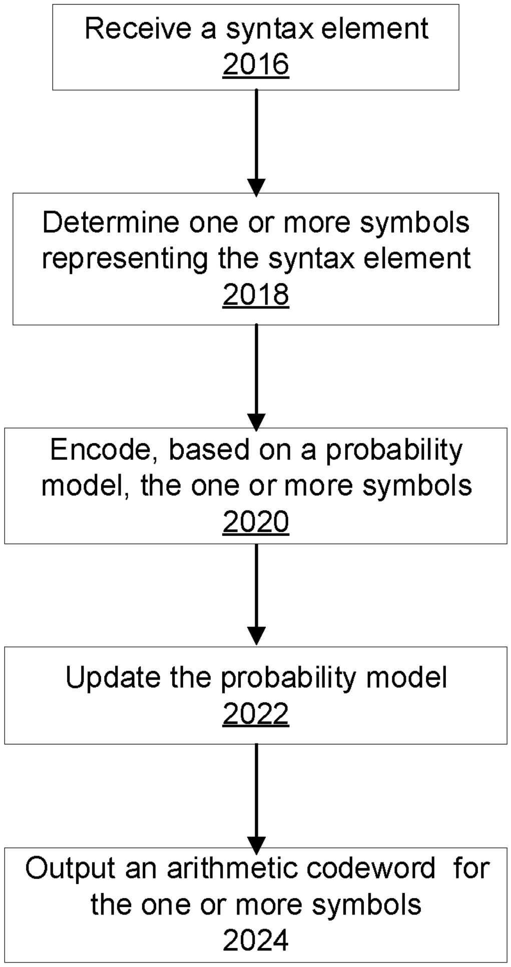

FIGS. 20A-B show an example of a context-based adaptive binary arithmetic coding (CABAC) encoder 2000 and example operations/methods thereof. CABAC encoder 2000 may comprise and/or be part of a video encoder, such as video encoder 200 in FIG. 2. For example, CABAC encoder 2000 may be configured to entropy encode syntax elements of a video sequence. CABAC encoder 2000 may include a binarizer 2002, an arithmetic encoder 2004, and/or a context modeler 2006.

CABAC encoder 2000 may receive a syntax element 2008 for arithmetic encoding (e.g., as shown at step 2016 in FIG. 20B). Syntax elements, such as syntax element 2008, may be generated by a video encoder. The syntax elements may describe how a video signal may be reconstructed at a video decoder. The syntax elements for a CU may comprise an intra prediction mode based on the CU being intra predicted, motion data (e.g., MVD and MVP related data) based on the CU being inter predicted, and/or displacement data (e.g., BVD and BVP related data) based on the CU being predicted using IBC.

One or more symbols representing the syntax element 2008 may be determined (e.g., as shown at step 2018 in FIG. 20B). For example, a binarizer 2002 may map the value of syntax element 2008 to a sequence of binary symbols (also referred to as a bin string or a sequence of bins) (e.g., as shown at step 2018 in FIG. 20 B). The binarizer 2002 may define a unique mapping of values of syntax element 2008 to respective sequences of binary symbols. The binarizer may generate a binary representation of a non-binary valued syntax element. Binarization of syntax elements may help to improve probability modeling and implementation of arithmetic encoding. The binarizer 2002 may use one or more binarization processes/schemes, such as unary, truncated unary, k-th order truncated Rice, k-th order exponential-Golomb (EGk), fixed-length, or some combination of two or more of these binarization processes. The binarizer 2002 may select a binarization process/scheme based on a type of syntax element 2008 and/or based on one or more syntax elements processed by the CABAC encoder 2000 (e.g., before receiving syntax element 2008). The binarizer 2002 may not process (e.g., binarize) syntax element 2008. The binarizer 2002 may not process (e.g., binarize) syntax element 2008, for example, based on syntax element 2008 already being represented by a sequence of one or more binary symbols. The binarizer 2002 may not be used and/or syntax element 2008 represented by a sequence of one or more non-binary symbols may be directly encoded by CABAC encoder 2000 (e.g., as shown at 2018 in FIG. 20B).

One or more symbols (e.g., the one or more binary and/or non-binary symbols) representing the syntax element 2008 may be processed by an arithmetic encoder 2004 (e.g., as shown at 2020 in FIG. 20B). One or more symbols (e.g., the one or more binary and/or non-binary symbols) representing the syntax element 2008 may be processed by an arithmetic encoder 2004 (e.g., step 2020), for example, after binarize 2002 optionally maps the value of syntax element 2008 to a sequence of binary symbols. The arithmetic encoder 2004 may process the one or more symbols via one of at least two modes: regular arithmetic encoding mode ("regular mode") or bypass arithmetic encoding mode ("bypass mode").

Arithmetic encoder 2004 may process binary symbols that do not have a uniform (and/or approximately uniform) probability distribution in regular arithmetic encoding mode (e.g., binary symbols that do not have a probability distribution of 0.5 for each of their two possible values). In regular arithmetic encoding mode, arithmetic encoder 2004 may perform arithmetic encoding as described herein. For example, arithmetic encoder 2004 may subdivide a current coding interval into m disjoint subintervals. Each of the m disjoint subintervals may have a width proportional to the probability of the binary symbol having a different one of the values in an m-ary source alphabet. For a binary symbol, m is equal to two and the current coding interval may be subdivided into two disjoint intervals that each have a width proportional to the probability of a different one of the two possible values {0, 1} for the binary symbol being encoded. The probabilities of the two possible values for the binary symbol may be indicated by a probability model 2010 for the binary symbol. Arithmetic encoder 2004 may encode the binary symbol by choosing the subinterval corresponding to the actual value of the binary symbol as the new coding interval for the next binary symbol to be encoded.

Arithmetic encoder 2004 may receive the probability model 2010 from a context modeler 2006. The context modeler 2006 may determine probability model 2010 for the binary symbol based on (e.g., using) a fixed selection (e.g., based on a position of the binary symbol in the sequence of binary symbols representing syntax element 2008) and/or based on (e.g., using) an adaptive selection from among two or more probability models (e.g., based on information related to the binary symbol). As shown in FIG. 20A, the probability model 2010 may comprise two parameters: a probability PLPS of a least probable symbol (LPS) and a value vMPS of a most probable symbol (MPS). Also, or alternatively, probability model 2010 may comprise the probability PMPS of the MPS. Also, or alternatively, probability model 2010 may comprise the value vLPS of the LPS. The arithmetic encoder 2004 may provide one or more probability model update parameters 2012 to context modeler 2006 (e.g., based on and/or after encoding the binary symbol). The context modeler 2006 may adapt the probability model 2010 (e.g., as shown at 2022 in FIG. 20B) based on the one or more probability model update parameters 2012. The one or more probability model update parameters 2012 may comprise the actual coded value of the binary symbol. The context modeler 2006 may update probability model 2010 by increasing the PLPS, for example, based on (e.g., if) the actual coded value of the binary symbol is not equal to vMPS. The context modeler 2006 may also, or alternatively, update the probability model 2010 by decreasing the PLPS, for example, based on (e.g., if) the actual coded value of the binary symbol is equal to vMPS.

The arithmetic encoder 2004 may process the one or more binary (and/or non-binary) symbols, which may have (or may be assumed to have) a uniform (or approximately uniform) probability distribution in bypass arithmetic encoding mode. The arithmetic encoder 2004 may bypass probability model determination and adaptation performed in regular arithmetic encoding mode in encoding these binary symbols, thereby speeding up the encoding process. The arithmetic encoder 2004 may bypass the probability model determination based on the binary symbols having (or being assumed to have) a uniform (or approximately uniform) probability distribution. Also, or alternatively, subdivision of the current coding interval may be simplified based on the uniform (or assumed uniform) probability distribution. For example, the current coding interval may be partitioned into two disjoint subintervals of equal width. Partitioning the current coding interval into two disjoint subintervals of equal width may be simple to implement and may further speed up the encoding process. Arithmetic encoder 2004 may encode the one or more binary (and/or non-binary) symbols by choosing the subinterval corresponding to the value of the binary (and/or non-binary) symbol as the new coding interval for the next binary (and/or non-binary) symbol to be encoded. CABAC encoding may have throughput limitations, so increasing encoding speed for binary symbols encoded by arithmetic encoder 2004 in bypass arithmetic encoding mode may be important.

The arithmetic encoder 2004 may determine a value in the range of the final coding interval (e.g., as described herein) as an arithmetic codeword 2014 for the binary symbols (e.g., as shown at step 2024 in FIG. 20B). The arithmetic encoder 2004 may determine a value in the range of the final coding interval (e.g., as described herein) as an arithmetic codeword 2014 for the binary symbols (2024), for example, after processing a number of binary symbols (e.g., corresponding to one or more syntax elements). Arithmetic encoder 2004 may then output arithmetic codeword 2014 (e.g., step 2024). For example, arithmetic encoder 2004 may output arithmetic codeword 2014 to a bitstream that may be received and processed by a video decoder.

A decoder (e.g., entropy decoding unit 306) may be configured to decode arithmetic codeword 2014 (representing an encoded syntax element). The decoder may comprise an arithmetic decoder configured to reverse (e.g., decode) the arithmetic encoding of the encoded syntax element (e.g., arithmetic codeword 2014) to determine a sequence of binary (or non-binary) symbols (and/or bins). A (de)binarizer (e.g., of the decoder) may reverse the operation of the binarizer 2002 (e.g., if binarized symbols) and may map the sequence of binary symbols to a value of syntax element 2008 (e.g., after and/or based on the determined sequence of the binary (or non-binary) symbols).

In at least some video coding/decoding technologies, two syntax elements coded in bypass arithmetic coding mode (also referred to herein as bypass mode) may be 1) one or more magnitude symbols of the motion vector difference (MVD) and 2) one or more magnitude symbols of the block vector difference (BVD). Other syntax elements that may be coded in bypass mode may include a sign of the MVD and/or a sign of the BVD. These syntax elements may be respectively determined as part of advanced motion vector prediction (AMVP) for inter prediction and/or AMVP for IBC and/or RRIBC (e.g., as described herein). Although the bypass arithmetic coding mode may be used to speed up the arithmetic coding process, compression of the symbols of these syntax elements coded in bypass arithmetic encoding mode may be limited, for example, because the symbols have probability distributions that are uniformly distributed (or at least assumed to be uniformly distributed). From information theory, a symbol cannot be compressed at a rate less than its entropy without loss of information. A symbol with a uniform probability distribution has maximum entropy. Thus, symbols coded using the bypass arithmetic encoding mode generally require more bits to encode than symbols encoded using the regular arithmetic encoding mode.

As described herein, a compression efficiency of one or more symbols (e.g., a sign symbol and/or a magnitude symbol) of a BVD for coding a current block that is flipped relative to a reference block used to code the current block may be improved. The current block (e.g., coded in RRIBC mode) and the reference block may be flipped in a direction with respect to each other. An indication of whether a value of a symbol of the BVD matches a value of the symbol of a BVD candidate used as a predictor of the BVD (e.g., a BVD predictor) may be entropy encoded (e.g., alternatively to the symbol, of the BVD, itself being entropy encoded). The BVD predictor may be selected from plurality of BVD candidates. The BVD predictor may be selected based on costs of the plurality of BVD candidates. The cost of each BVD candidate of the plurality of BVD candidates may be based on a template of a current block (e.g., a current template) and a template of a candidate reference block (e.g., a candidate template). For example, the cost of each BVD may be based on a comparison and/or difference between the current template and the candidate template. Direct template matching for a current block coded in RRIBC mode may result in selection and/or determination of a reference block that may not closely match the current block. Also, or alternatively, direct template matching for a current block coded in RRIBC mode may result in increased residual information. A reference block may be determined based on the current block, coded in RRIBC mode, being flipped in the direction relative to the reference block. A template of a candidate reference block (e.g., the candidate template) may have a shape that is the same as the current template but flipped in the direction (e.g., for coding a flipped current block). The candidate reference block may be displaced relative to the current block by a sum of the BVD candidate and a block vector predictor (BVP). The indication of whether the value of the symbol of the BVD matches the value of the symbol of the BVD predictor may have a non-uniform probability distribution. The indication having the non-uniform distribution may provide improved compression efficiency if coded in a regular mode, as compared to the magnitude symbol of the BVD, which may have and/or be assumed to have a uniform probability distribution, coded, for example, in a bypass mode.

Coding the BVD of a current block coded in RRIBC is discussed herein. The methods disclosed herein are similarly applicable for improving the compression efficiency of one or more symbols (e.g., a sign symbol and/or a magnitude symbol) of an MVD for coding the current block that is flipped relative to a reference block of another frame. For example, instead of, or in addition to, entropy coding a symbol of the MVD, an indication of whether a value of the symbol of the MVD matches a value of the symbol of an MVD candidate for use as a predictor of the MVD (e.g., an MVD predictor) may be entropy coded. The MVD predictor may be selected from among a plurality of MVD candidates, for example, based on costs associated with (e.g., of, based on, calculated for etc.) the plurality of MVD candidates. The cost of a (e.g., each) MVD candidate in the plurality of MVD candidates may be based on (e.g., determined and/or calculated based on) a template of a current block (e.g., a current template) and a template of a candidate reference block. For example, the cost may be determined (e.g., calculated based on a comparison (e.g., a difference between) the template of the current block and the template of the candidate reference block. As described herein, direct template matching may result in selection and/or determination of a reference block that may not closely match the current block and/or that may result in increased residual information. This may be due to by the reference block being determined based on the current block being flipped in the direction relative to the reference block. A template of a candidate reference block (e.g., a candidate template) may have a shape that is the same as the current template but flipped in the direction (e.g., for coding a flipped current block). The candidate reference block may be displaced relative to a co-location of the current block in a reference frame by a sum of the MVD candidate and a motion vector predictor (MVP). The indication of whether the value of the symbol of the MVD matches the value of the symbol of the MVD predictor may have a non-uniform probability distribution. The indication having the non-uniform distribution may provide improved compression efficiency if coded in a regular mode as compared to coding the symbol of the MVD (e.g. having a uniform probability distribution) coded, for example, in a bypass mode.

HEVC and/or VVC may (e.g., both) include a prediction technique configured to exploit the correlation between blocks of samples within a same picture. This technique may be referred to as intra block coding (IBC). A Reconstruction-Reordered intra block copy IBC (RRIBC) mode (e.g., also referred to as IBC-Mirror Mode) was introduced for screen content video coding to take advantage of symmetry within video content to further improve the coding efficiency of IBC. Both IBC and RRIBC are included in the Enhanced Compression Model (ECM) software algorithm that is currently under coordinated exploration study by the Joint Video Exploration Team (JVET) of ITU-T Video Coding Experts Group (VCEG) and ISO/IEC MPEG as a potential enhanced video coding technology beyond the capabilities of VVC.

Figures 21A, 21B:
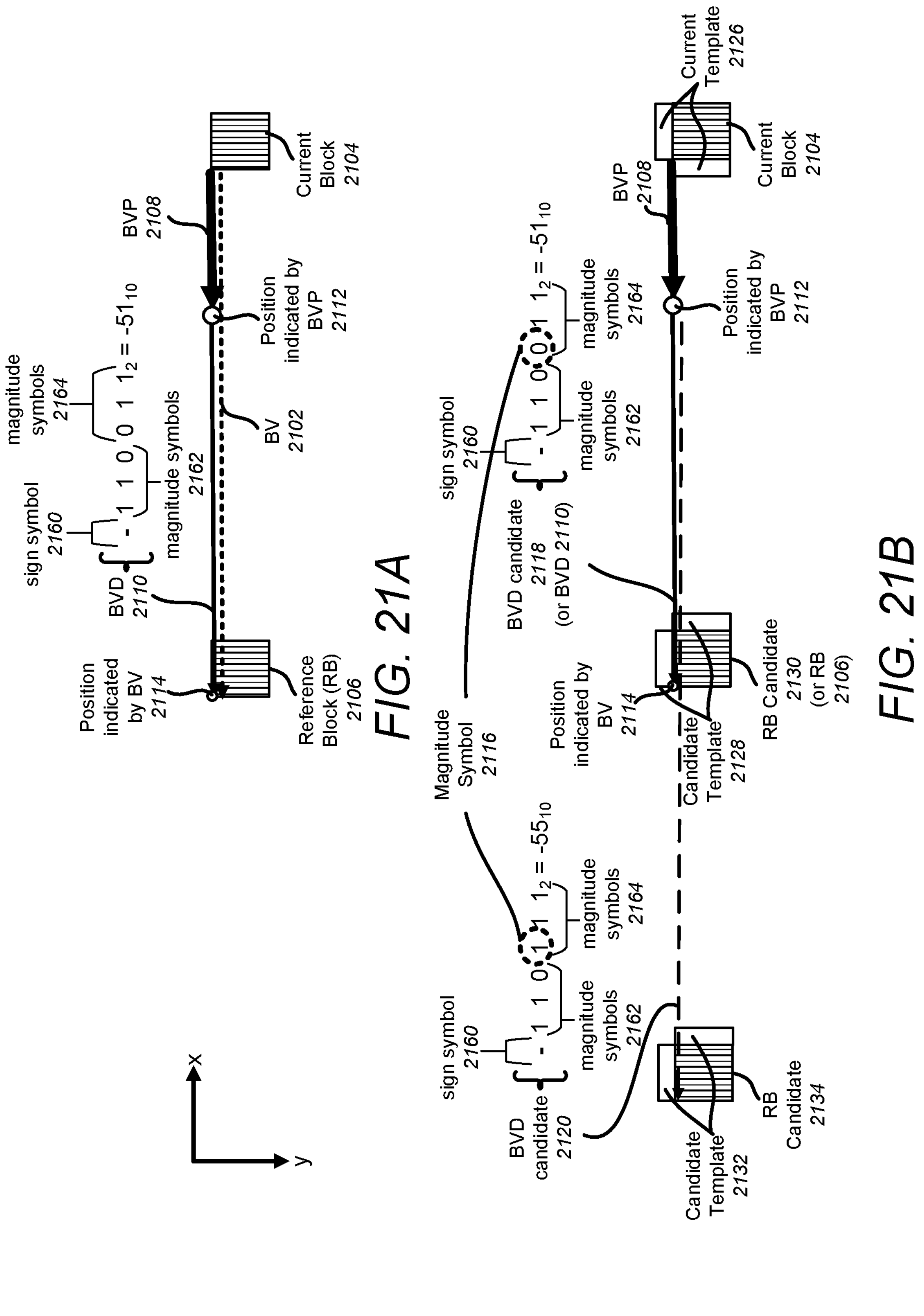
FIG. 21A shows an example of RRIBC.
FIG. 21B shows example block vector difference (BVD) candidates.

FIG. 21A shows an example of RRIBC. An encoder may determine a block vector (BV) 2102 that indicates the displacement from a current block (CB) 2104 to a reference block (RB) 2106, where CB 2104 and RB 2106 are flipped in a direction (e.g., a horizontal direction and/or a vertical direction) relative to each other. The encoder may determine a block vector (BV) 2102, for example, if RRIBC is performed. BV 2102 may point to position 2114, which may indicate (e.g., a top left corner of) RB 2106. The encoder may determine RB 2106 from among one or more RB candidates tested during a searching process. The CB 2104 may be flipped and compared to (e.g., matched with) RB candidates in a reference region corresponding to the direction (of flipping). The comparing (e.g., matching) may be used to determine RB 2106 (e.g., from the one or more RB candidates) for coding (e.g., determining prediction error and/or residual) the CB 2104 (e.g., as described herein, such as with respect to FIG. 19). The encoder may determine a difference (e.g., a sum of squared differences (SSD), a sum of absolute differences (SAD), a sum of absolute transformed differences (SATD), and/or a difference determined based on a hash function) between the sample(s) of one of the RB candidates (e.g., each of the one or more RB candidates) and the sample(s) of CB 2104 (e.g., that may be flipped in the direction with respect to the RB candidates, or vice versa). The encoder may determine RB 2106 from among the one or more RB candidates based on RB 2106 having the smallest difference from CB 2104 among the one or more RB candidates or based on some other criteria. RB 2106 and the one or more other RB candidates tested during the searching process may comprise decoded and/or reconstructed samples. The decoded and/or reconstructed samples may not have been processed by in-loop filtering operations (e.g., deblocking and/or SAO filtering).

The encoder may use RB 2106 to predict CB 2104 (e.g., based on the reference block 2106 being determined for current block 2104). For example, the encoder may determine a difference (e.g., a corresponding sample-by-sample difference) between RB 2106 and CB 2104 (e.g., for use in predicting CB 2104). The difference may be referred to as a prediction error or residual. The encoder may then signal the prediction error and the related prediction information in a bitstream. The prediction information may include BV 2102. In other instances, the prediction information may include an indication of BV 2102. A decoder, such as decoder 300 in FIG. 3, may receive the bitstream and decode CB 2104 by determining RB 2106, which forms the prediction of CB 2104, using the prediction information and combining the prediction with the prediction error. As described herein (e.g., with respect to FIG. 19), the BV 2102 may have a null component such as the vertical component, for example, if the direction of flipping is horizontal. The BV 2102 may be indicated as a component in the direction. For example, FIGS. 21A-D show the CB 2104 being coded in RRIBC mode and a horizontal direction of flipping. The BV 2102 may be signaled as a horizontal ("x") component and the vertical ("y") component may not need to be signaled (e.g., since it is null, and/or has 0 magnitude).

A BV may be predictively encoded. The BV 2102 may be predictively encoded (e.g., before being signaled in a bitstream). The BV 2102 may be predictively encoded, for example, based on the BVs of neighboring blocks of CB 2104 and/or BVs of other blocks. For example, the encoder may predictively encode BV 2102 using the merge mode and/or AMVP (e.g., as disclosed herein). For AMVP and RRIBC, the encoder may encode BV 2102 as a difference between BV 2102 and a BV predictor (BVP) 2108 (e.g., as shown in FIG. 21A and described herein, such as with respect to FIG. 18 and FIG. 19). The BVP 2108 may indicates a position 2112 relative to the CB 2104. The encoder may select BVP 2108 from a list of BVP candidates. The BVP candidates may be determined from previously decoded BVs of neighboring blocks of CB 2104 and/or other sources. The encoder and/or the decoder may generate and/or determine the list of BVP candidates. The list of BVPs may include a list of BVP components corresponding to the direction of flipping (e.g., as discussed herein, such as with respect to FIG. 19). The list of BVP candidates may be generated to include respective components in the direction of flipping (e.g., as described herein).

The encoder may signal, in a bitstream, an indication of BVP 2108 and a BV difference (BVD) 2110 (e.g., after and/or based on determining the BVP 2108, such as by selecting from the list of the BVP candidates). The encoder may indicate the BVP 2108 in the bitstream by an index (e.g., pointing into the list of BVP candidates) and/or one or more flags. The BVD 2110 may be calculated based on the difference between the BV 2102 and the BVP 2108. The BVD 2110 may comprise at most one non-null component in the direction of flipping (e.g., for the CB 2104 coded in RRIBC, such as described herein, such as with respect to FIG. 19). For example, The BVD 2110 may correspond to a horizontal component (BVDx) (e.g., as determined in accordance with (17) above) and no vertical component (BVDy) (e.g., with the vertical component being 0), for example, for horizontal flipping (e.g., as shown in FIGS. 21A-D). Reference to a BVD may refer to the component of the BVD in the direction of flipping (e.g., in context of RRIBC coded CBs as described herein). The BVD 2110 may be value represented (e.g., indicated) by a syntax element with a sign symbol 2160 and/or one or more magnitude symbols (e.g., magnitude symbols 2162 and/or magnitude symbols 2164). The BVD 2110 is shown in FIG. 21A as having a magnitude of 110011 in fixed length binary (or 51 in base 10) and a negative sign (the positive horizontal direction points to the right in the example of FIG. 21A) value in sign symbol 2160. The syntax element of the BVD 2110 may be determined as a codeword (e.g., a Golomb codeword and/or an exponential-Golomb codeword) that includes one or more magnitude symbols (e.g., as disclosed herein, such as with respect to FIG. 19 or 20). For example, for the codeword may include a prefix part and/or a suffix part. The prefix part may include one or more magnitude symbols 2162 in unary code. For example, the one or more magnitude symbols 2162 in unary code may be coded in a regular mode. The suffix part may include one or more symbols 2164, which may be coded in a bypass mode. The encoder may indicate the BVD 2110 in the bitstream via an arithmetic encoding of the syntax element including sign symbol 2160 and/or one or more magnitude symbols 2162 and 2164.

The decoder may decode the BV 2102, for example, by adding the BVD 2110 to the BVP 2108. The decoder may decode the CB 2104 by determining the RB 2106, which may form the prediction of the CB 2104, using the BV 2102 and combining the prediction with the prediction error. The decoder may determine the RB 2106, for example, by adding BV 2102 to the location of CB 2104. The sum of the BV 2102 and the location of the CB 2104 may give the location of RB 2106.

In at least some video technologies, the magnitude, such as magnitude symbols 2164 in a suffix of a codeword of the BVD 2110, may be encoded in bypass arithmetic encoding mode. The bypass arithmetic encoding mode may be used to speed up the arithmetic encoding process. Also, or alternatively, the bypass arithmetic encoding mode may result in compression of the magnitude symbols of BVD 2110 encoded in bypass arithmetic encoding mode being limited, for example, because their probability distributions are uniformly distributed (or at least assumed to be uniformly distributed). From information theory, a symbol cannot be compressed at a rate less than its entropy without loss of information, and a symbol with uniform probability distribution has maximum entropy. Thus, symbols encoded using the bypass arithmetic encoding mode generally require more bits to encode than symbols encoded using the regular arithmetic encoding mode.

As disclosed herein, an indication of whether a value of the magnitude symbol of BVD 2110 matches a value of the same magnitude symbol of a BVD candidate used as a predictor of BVD 2110 may be encoded (e.g., instead of the one or more magnitude symbol(s) 2164 and/or sign symbol(s) 2160 of the BVD 2110), which may improve compression efficiency of one or more magnitude symbols 2164 (and/or sign symbol 2160) of BVD 2110 may be achieved (e.g., relative to technologies in which a magnitude symbol of BVD 2110 is directly encoded). The indication of whether the value of the magnitude symbol of BVD 2110 matches the value of the magnitude symbol of the BVD predictor may have a non-uniform probability distribution, which may therefore provide improved compression efficiency. The encoder may select the BVD predictor from among a plurality of BVD candidates. The BVD predictor may be selected based on costs of the plurality of the respective BVD candidates. The BVD candidates may include a BVD candidate for each possible value of the magnitude symbol of BVD 2110. For example, a magnitude symbol of BVD 2110 represented in binary form has only two possible values. Therefore, the BVD candidates may include two BVD candidates for this representation (e.g., one for each possible value of the magnitude symbol in BVD 2110 being encoded): a first BVD candidate equal to BVD 2110 itself and a second BVD candidate equal to BVD 2110 but with the opposite (and/or another) value of the magnitude symbol of BVD 2110. The cost for each BVD candidate in the plurality of BVD candidates may be calculated (e.g., determined, obtained), for example, based on a difference between a template of the CB 2104 and a template of a RB candidate. The RB candidate may be displaced relative to the CB 2104 by a sum of the respective BVD candidate and the BVP 2108.

FIG. 21B shows an example magnitude symbol 2116 of the BVD 2110 to be entropy encoded. The magnitude symbol 2116 of BVD 2110 may be the most significant bit in the fixed length binary representation portion (e.g., the suffix of a codeword) of the BVD 2110. For example, the most significant bit in the fixed length binary representation of the BVD 2110 may have a binary value of 0. For example, magnitude symbol 2116 to be predicted may be the most significant symbol of magnitude symbols 2164 of BVD 2110. The encoder may entropy encode an indication of whether the value of magnitude symbol 2116 of BVD 2110 matches the value of the same magnitude symbol of a BVD candidate used as a predictor of BVD 2110 (e.g., as disclosed herein). The encoder may select the BVD predictor from among a plurality of BVD candidates, for example, based on cost(s) of the plurality of respective BVD candidates. The BVD candidates may include a BVD candidate for a plurality of possible values (e.g., each of the two possible values {0, 1} for binary values) of magnitude symbol 2116 of BVD 2110. A first BVD candidate 2118 may be equal to (e.g., match) BVD 2110, and a second BVD candidate 2120 may be equal to (e.g., match) BVD 2110 but with an opposite (or other) value of magnitude symbol 2116 of BVD 2110.

FIG. 21B shows both BVD candidates (e.g., BVD candidate 2120 and BVD candidate 2118) used to entropy encode magnitude symbol 2116 of BVD 2110. The BVD candidate 2118 is shown equal to BVD 2110 itself, and the BVD candidate 2120 is shown equal to BVD 2110, but with the opposite (or other) value of magnitude symbol 2116 of BVD 2110. The BVD candidate 2120 has a magnitude of 110111 in fixed length binary (or 55 in base 10) and a negative sign. The BVD candidate 2118 has a magnitude of 110011 in fixed length binary (or 51 in base 10). The BV 2102, which points to position 2114, as shown in FIG. 21A, is not reproduced in FIG. 21B for clarity, but may be assumed to be present.

The cost for a (e.g., each) BVD candidate of the plurality of BVD candidates may be calculated (e.g., determined, obtained). The cost may be calculated, for example, based on a difference between a template of CB 2104 (e.g., current template) and a template of a RB candidate (e.g., candidate template) displaced relative to the CB 2104 by a sum of the respective BVD candidate and the BVP 2108. For example, candidate templates 2128 and 2132 may be determined for respective RB candidates 2130 and 2134 indicated by respective BVD candidates 2118 and 2120. A transform operation (e.g., an affine transform) may be used with respect to candidate template 2126 to determined candidate templates 2128 and 2132. The transform operation may allow for matching templates that do not correspond directly in shape (e.g., that are rotated and/or flipped relative to each other. The transform operation may correspond to the direction of flipping for coding CB 2104. For example, each of candidate templates 2128 and 2132 may have a shape that corresponds to that of current template 2126 flipped in the direction with respect to CB 2104. For example, for the CB 2104 coded in RRIBC with a flipping direction of horizontal, current template 2126 may be flipped in the horizontal direction to derive a shape of each of candidate templates 2128 and 2132. Current template 2126, candidate template 2128, and/or candidate template 2132 may be defined relative to CB 2104, RB candidate 2130, and/or RB candidate 2134, respectively. Performing the same flipping operation on the CB 2104 to current template 2126 to derive candidate templates 2128 and 2132 may result in an RB candidate identified based on a determined BVD candidate being more likely the same as the RB 2106. The BVD candidate selected and/or determined as predicting BVD 2110 (e.g., based on a cost value) may be therefore also more likely to be accurately selected and/or determined.

The encoder may determine a cost for a BVD candidate. The encoder may determine a cost for a BVD candidate (e.g., BVD candidate 2118), for example, based on a difference between a current template 2126 of the CB 2104 and a candidate template 2128 of a RB candidate 2130 (e.g., displaced relative to CB 2104 by a sum of BVD candidate 2118 and BVP 2108). The encoder may determine the difference between the current template 2126 and the candidate template 2128, for example, based on a difference (e.g., sum of squared differences (SSD), sum of absolute differences (SAD), sum of absolute transformed differences (SATD), mean removal SAD, and/or mean removal SSD) between samples of current template 2126 and samples of candidate template 2128. The encoder may similarly determine a cost for BVD candidate 2120, for example, based on a difference between current template 2126 of the CB 2104 and a candidate template 2132 of a RB candidate 2134 (e.g., displaced relative to CB 2104 by a sum of BVD candidate 2120 and BVP 2108). The encoder may determine the difference between current template 2126 and the candidate template 2132, for example, based on a difference (e.g., SSD, SAD, SATD, mean removal SAD, and/or mean removal SSD) between samples of current template 2126 and samples of candidate template 2128. Current template 2126 may comprise one or more samples in one or more directions (e.g., to the left and/or above) the CB 2104. For example, the one or more samples may be from one or more columns to left of CB 2104 and/or from one or more rows above the CB 2104. FIG. 21B shows an example position and shape (e.g., L-shape rotated clockwise 90 degrees) of current template 2126. Samples of current template 2126 may be compared to samples from candidate templates 2128 and 2132 having shapes that correspond to that of current template 2126 flipped in the direction (e.g., as discussed herein, such as with respect to FIGS. 22A-C).

The encoder may select one of the plurality of BVD candidates as a BVD predictor, for example, based on (e.g., after determining) the one or more costs of the BVD candidates (e.g., of each of the plurality of BVD candidates). For example, the encoder may select the BVD candidate with the smallest cost (e.g., the closest matching cost) among the plurality of BVD candidates as the BVD predictor, and/or a cost below a certain value (e.g., less than the other costs, less than an acceptable value, etc.).

Figure 21C:
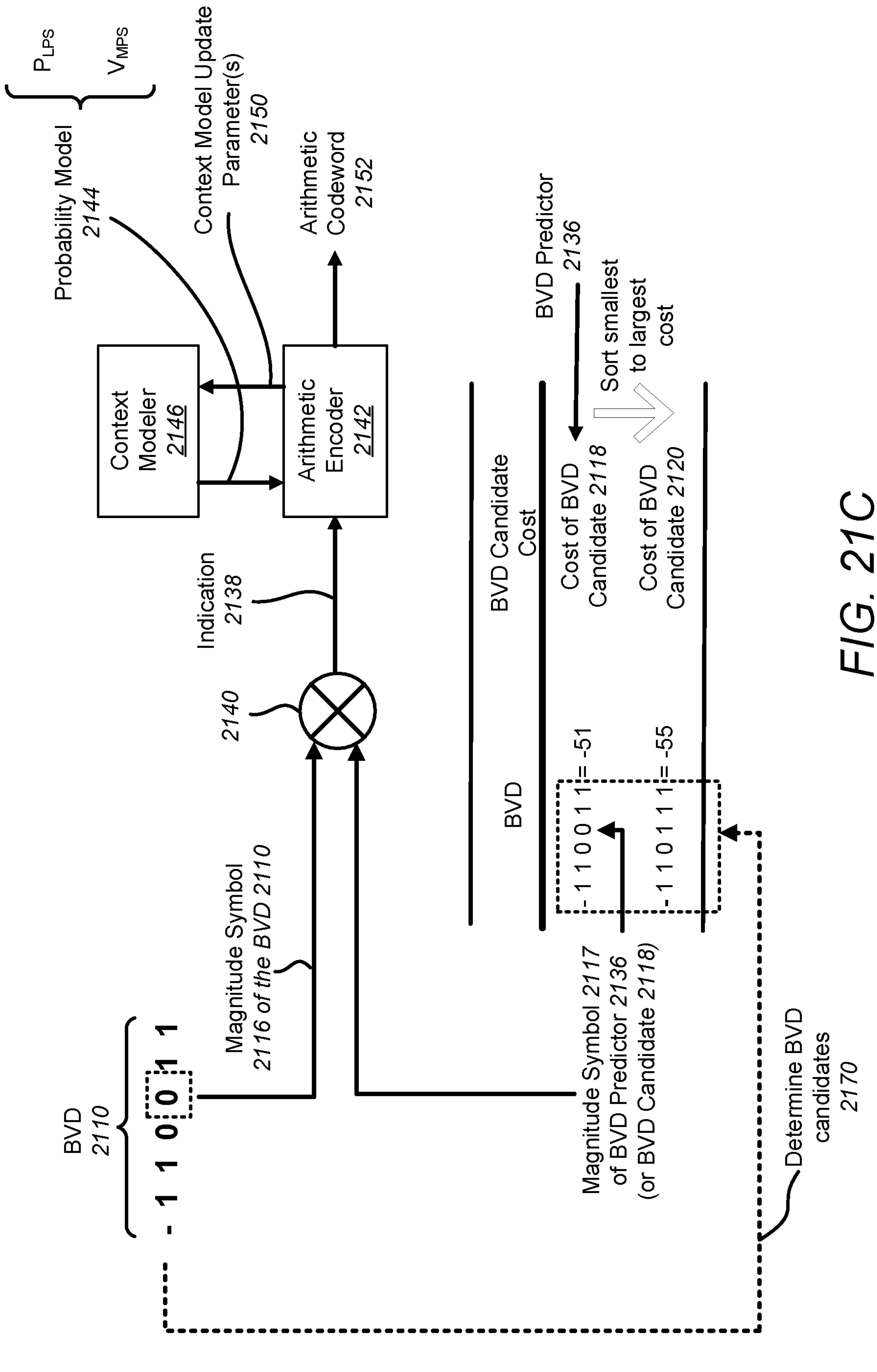
FIG. 21C shows an example of entropy encoding.

FIG. 21C shows an example table with the value (e.g., sign and magnitude) of BVD candidates 2118 and 2120 and costs of each BVD candidate 2118 and 2120 in respective rows. The table shows one value for each example BVD candidate because, for the CB 2104 coded in RRIBC, the BVD has at most one non-null component, thus the BVD candidates will each have at most one non-null component. The BVD candidates 2118 and 2120 may be assumed to be the only BVD candidates for ease of discussion. More BVD candidates may be used. The rows of the table are shown sorted by the costs of BVD candidates 2118 and 2120, with the BVD candidate with the smallest cost on top. The BVD candidate 2118 corresponds to (e.g., has) the smallest cost among the BVD candidates 2118 and 2120. The encoder may select BVD candidate 2118 as the BVD predictor 2136 for BVD 2110 (e.g., based on the corresponding cost being the smallest/smaller than another BVD candidate 2120). The BVD candidates 2118 and 2120, and/or a quantity of BVD candidates, may be determined 2170 based on BVD 2110 (e.g., as described herein, such as with respect to FIG. 21B, and/or with respect to FIGS. 23-24). For example, a BVD candidate may be determined as having a unique combination of values for a predetermined (e.g., selected) number of symbols to be predicted. For example, the BVD candidates 2118 and 2120 for the BVD 2110 (having a magnitude symbol 2116 to be predicted) may have mutually unique values (e.g., distinct values) of magnitude symbols 2116.

The encoder may entropy encode an indication 2138 of whether the value of magnitude symbol 2116 of BVD 2110 matches the value of magnitude symbol 2117 in BVD predictor 2136 (e.g., based on having selected BVD candidate 2118 as the BVD predictor 2136). The magnitude symbol 2117 of the BVD predictor 2136 is shown as having a value of 0 in FIG. 21C. Thus, the magnitude symbol 2117 of the BVD predictor 2136 is shown as having a value that matches the value of the magnitude symbol 2116 of the BVD 2110. The indication 2138 is shown as indicating that the value of the magnitude symbol 2116 of BVD 2110 matches the value of the magnitude symbol 2117 of the BVD predictor 2136. The indication 2138 may be a single bit that indicates matching and/or a level of matching between the magnitude symbol 2116 of the BVD 2110 and the magnitude symbol 2117 of the BVD predictor 2136. The indication 2138 may have the value 0 to indicate the value of magnitude symbol 2116 of BVD 2110 matches the value of magnitude symbol 2117 of BVD predictor 213. The indication 2138 may have a value of 1 to indicate the value of magnitude symbol 2116 of BVD 2110 does not match the value of magnitude symbol 2117 of BVD predictor 2136. A logic 2140 may be used to determine indication 2138. For example, the logic 2140 may implement a logical exclusive and/or (XOR) function. The indication 2138 may also, or alternatively, indicate the first candidate among the plurality of candidates (e.g., as sorted based on their respective costs) that has a value of magnitude symbol 2117 that matches the value of magnitude symbols 2116 in BVD 2110 (e.g., for magnitude symbols 2117 and 2116 being non-binary).

The encoder may entropy encode indication 2138 using arithmetic encoder 2142 (e.g., as described herein, such as depicted in FIG. 21C). The indication 2138 may have a non-uniform probability distribution (e.g., as described herein). An arithmetic encoder 2142 may process indication 2138 in regular arithmetic encoding mode (e.g., as described herein). For example, the arithmetic encoder 2142 may subdivide a current coding interval into m disjoint subintervals. Each of the m disjoint subintervals may have a width proportional to the probability of the symbol being encoded having a different one of the values in an m-ary source alphabet. For example, indication 2138 may be binary (e.g., as in the example shown in the FIGS. 21C and 21D). m may be equal to two and/or the current coding interval may be subdivided into two disjoint intervals that may have widths proportional to probabilities of a different one of the two possible values {0, 1} for indication 2138 being encoded (e.g., a first of the two disjoint intervals may have width proportional to a probability of a value 0 being encoded for indication 2138, the other of the two disjoint intervals may have a width proportional to a probability of a value 1 being encoded for indication 2138). The probabilities of the two possible values for indication 2138 may be indicated by a probability model 2144 for indication 2138. Arithmetic encoder 2142 may encode indication 2138 by choosing the subinterval corresponding to the actual value of indication 2138 as the new coding interval for the next binary symbol to be encoded.

Arithmetic encoder 2142 may receive probability model 2144 (e.g., from context modeler 2146). The probability model 2144 may be determined (e.g., by context modeler 2146 and/or arithmetic encoder 2142) for indication 2138, for example, by a fixed selection and/or an adaptive selection from among two or more probability models. For example, context modeler 2146 may determine probability model 2144 by a fixed selection and/or an adaptive selection from among two or more probability models based on a position of the magnitude symbol 2116 in BVD 2110 and/or an index of (e.g., a value indicating) the position of the magnitude symbol 2116 in BVD 2110. The position (and/or index of the position) of magnitude symbol 2116 in BVD 2110 may indicate a distance between two candidate BVDs (e.g., between the BVD candidate 2120 and the BVD candidate 2118, such as shown in FIG. 21B). The likelihood of the value of the magnitude symbol 2117 of the BVD predictor 2136 matching the value of the magnitude symbol 2116 of the BVD 2110 may be related to this distance. More particularly, an extent of the difference between respective candidate templates of the BVD candidates may be larger for greater values of the distance between the candidate BVDs. The larger the difference between respective candidate templates of the BVD candidates, the more likely the costs of the BVD candidates accurately reflect the BVD candidate with a value of magnitude symbol 2116 that matches the value of magnitude symbol 2116 of BVD 2110. Thus, the position (and/or index of the position) of the magnitude symbol 2116 in the BVD 2110 may be helpful in selecting the probability model 2144 for indication 2138.

The context modeler 2146 may compare the position (and/or the index of the position) of the magnitude symbol 2116 in BVD 2110 to one or more thresholds, for adaptive selection from among two or more probability models. For example, context modeler 2146 may compare the position (and/or the index of the position) of the magnitude symbol 2116 in the BVD 2110 to a first threshold. The context modeler 2146 may select a first probability model for indication 2138, for example, based on the position (or index of the position) of magnitude symbol 2116 in BVD 2110 being less than the threshold. The context modeler 2146 may select a second (e.g., different) probability model for indication 2138, for example, based on the position (or index of the position) of magnitude symbol 2116 in BVD 2110 being greater than the threshold. The context modeler 2146 may compare the position (and/or index of the position) of the magnitude symbol 2116 in the BVD 2110 to a second threshold, for example, based on the position (or index of the position) of magnitude symbol 2116 in BVD 2110 being greater than the threshold. The context modeler 2146 may select a second probability model for indication 2138, for example, based on the position (and/or the index of the position) of the magnitude symbol 2116 in the BVD 2110 being less than the second threshold. The context modeler 2146 may select a third probability model for indication 2138, for example, based on the position (and/or the index of the position) of magnitude symbol 2116 in BVD 2110 being greater than the second threshold.

The probability model 2144 may be determined based on (e.g., by) a fixed selection and/or an adaptive selection from among two or more probability models. For example, the probability model 2144 may be determined by the fixed selection and/or the adaptive selection based on the change in the value of the BVD 2110 corresponding to an incremental change in a value of the magnitude symbol 2116 in the BVD 2110. The change in the value of BVD 2110 corresponding to an incremental change in value of the magnitude symbol 2116 in the BVD 2110 may be determined, for example, as 2(n−1), where n is the bit position of the magnitude symbol 2116 in the BVD 2110. FIG. 21C shows an example in which n=4. Based on the bit position n=4, the change in value of the BVD 2110 for an incremental change in value of magnitude symbol 2116 of BVD 2110 may be determined as 2(4−1) or 8. The change in the value of the BVD 2110 for an incremental change in the value of the magnitude symbol 2116 of the BVD 2110 may indicate the distance between the two BVD candidates. As described herein, the likelihood of the value of the magnitude symbol 2117 of the BVD predictor 2136 matching the value of the magnitude symbol 2116 of the BVD 2110 may be related to this distance. For example, the extent of the difference between respective templates of the BVD candidates may be larger for greater values of the distance between the candidate BVDs. The larger the difference between respective templates of the BVD candidates, the more likely it may be that the costs of the BVD candidates accurately reflect the BVD candidate having a value of the magnitude symbol 2117 that matches the value of the magnitude symbol 2116 of the BVD 2110. Thus, the change in a value of BVD 2110 for an incremental change in value of the magnitude symbol 2116 of the BVD 2110 may be helpful and/or used in selecting probability model 2144 for indication 2138.

The value of the BVD 2110, corresponding to (e.g., for) an incremental change in the value of the magnitude symbol 2116 of the BVD 2110, may be compared (e.g., by the context modeler 2146 and/or arithmetic encoder 2142) to one or more thresholds, for example, for adaptive selection from among two or more probability models. For example, context modeler 2146 may compare the value of the BVD 2110 for an incremental change in value of the magnitude symbol 2116 of the BVD 2110 to a first threshold. A first probability model may be selected for indication 2138, for example, based on the value of the BVD 2110 for an incremental change in value of the magnitude symbol 2116 of the BVD 2110 being less than the first threshold. A second probability model (e.g., different from the first probability model) may be selected for indication 2138, for example, based on the value of the BVD 2110 for an incremental change in the value of the magnitude symbol 2116 of the BVD 2110 being greater than the first threshold. The value of BVD 2110 for an incremental change in value of magnitude symbol 2116 of BVD 2110 may be compared to a second threshold, for example, based on the value of BVD 2110 for an incremental change in value of magnitude symbol 2116 of BVD 2110 being greater than the threshold. A second probability model may be selected for indication 2138, for example, based on the value of the BVD 2110 for an incremental change in value of the magnitude symbol 2116 of the BVD 2110 being less than the second threshold. A third probability model may be selected for indication 2138, for example, based on the value of the BVD 2110 for an incremental change in value of the magnitude symbol 2116 of the BVD 2110 being greater than the second threshold.

The probability model 2144 may comprise one or more parameters (e.g., two parameters, such as shown in FIG. 21C). The one or more parameters may comprise, for example, one or more of: a probability PLPS of the least probable symbol (LPS) for indication 2138, the value vMPS of the most probable symbol (MPS) for indication 2138, the probability PMPS of the MPS for indication 2138, and/or the value vLPS of the LPS for the indication 2138. For example, the probability model 2144 may comprise two parameters: the PLPS and the vMPS. For example, the probability model 2144 may comprise the PMPS in addition or alternatively to the probability PLPS for indication 2138. For example, the probability model 2144 may comprise the vLPS for indication 2138 in addition or alternatively to the vMPS for indication 2138. One or more probability model update parameters 2150 may be determined and/or provided (e.g., by the arithmetic encoder 2142 and/or to the context modeler 2146), for example, based on (e.g., after) the indication 2138 being encoded (e.g., by the arithmetic encoder). The probability model 2144 may be adapted and/or updated (e.g., by the context modeler 2146) based on the one or more probability model update parameters 2150. For example, the one or more probability model update parameters 2150 may comprise the actual coded value of indication 2138. Context modeler 2146 may update probability model 2144 by increasing the PLPS for indication 2138 (e.g., based on and/or if the actual coded value of indication 2138 is not equal to vMPS) and/or by decreasing PLPS for indication 2138 (e.g., otherwise).

A value in the range of the final coding interval may be determined (e.g., by the arithmetic encoder 2142) as an arithmetic codeword 2152 for the binary symbols. A value in the range of the final coding interval may be determined, for example, after processing a number of binary symbols. The value in the range of the final coding interval may be determined as the arithmetic codeword 2152, for example, based on (e.g., after) processing a number of binary symbols (e.g., corresponding to one or more syntax elements). The arithmetic codeword 2152 may be output (e.g., by the arithmetic encoder 2142), for example based on and/or after the arithmetic codeword is determined. For example, arithmetic encoder 2142 may output arithmetic codeword 2152 to a bitstream that may be received and/or processed by a video decoder.

Figure 21D:
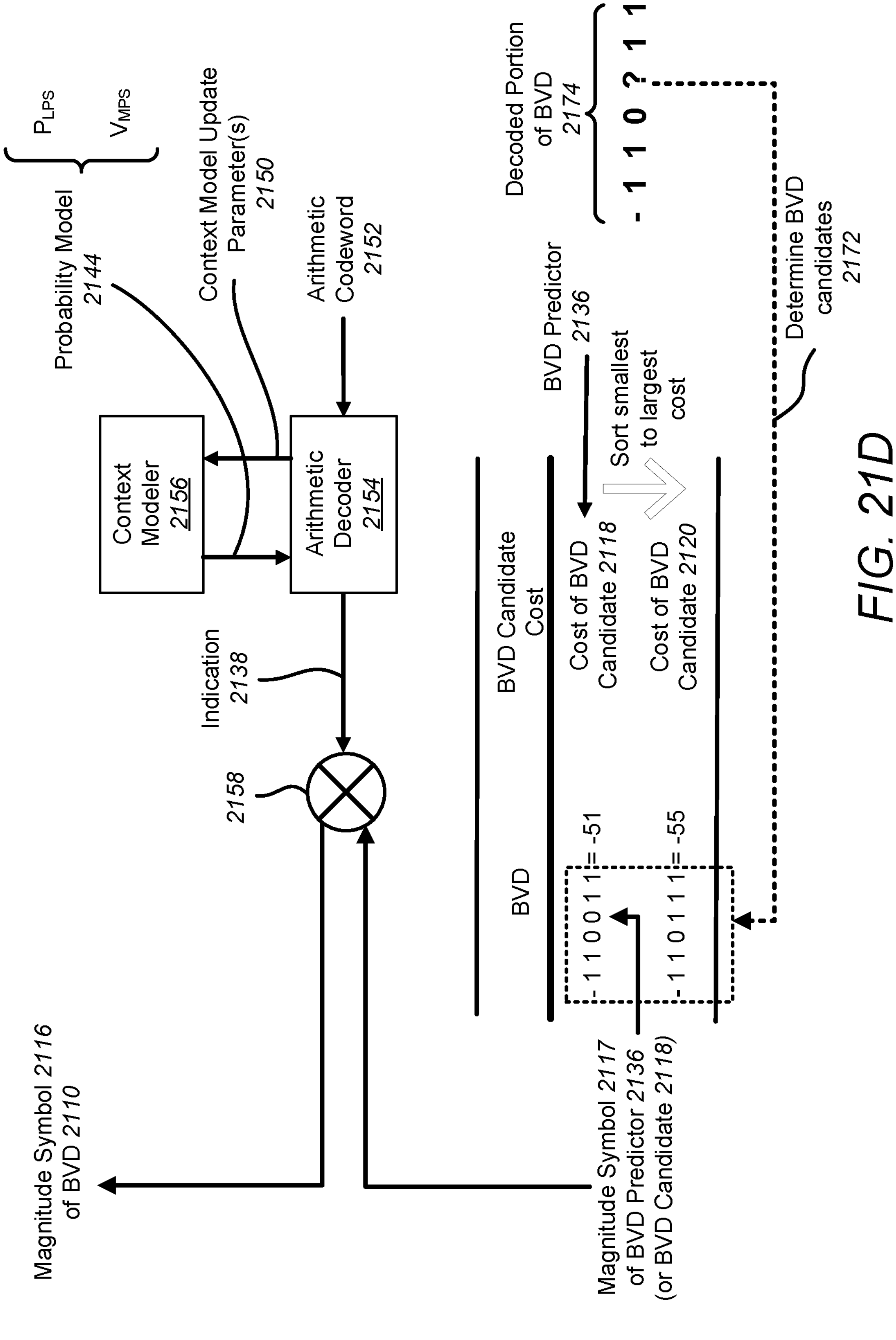
FIG. 21D shows an example of entropy decoding.

FIG. 21D shows an example of a decoder. More specifically, FIG. 21D shows an example of a decoder (e.g., decoder 300 in FIG. 3 and/or the arithmetic decoder 2154 in FIG. 21D, etc.) that may receive arithmetic codeword 2152, arithmetically decode indication 2138 from arithmetic codeword 2152, and/or use indication 2138 to determine the magnitude symbol 2116 of the BVD 2110. The decoder may receive the arithmetic codeword 2152 via (e.g., in) a bitstream. The decoder may provide arithmetic codeword 2152 to an arithmetic decoder 2154. The indication 2138 (e.g., determined as described herein) may have a non-uniform probability distribution. The arithmetic decoder 2154 may process indication 2138 in regular arithmetic decoding mode (e.g., based on the indication 2138 having a non-uniform probability distribution). For example, arithmetic decoder 2154 may perform recursive interval subdivision (e.g., as described herein) to decode symbols encoded by arithmetic codeword 2152. For example, arithmetic decoder 2154 may arithmetically decode a symbol that takes a value from an m-ary source alphabet by dividing an initial coding interval into m disjoint subintervals. The m disjoint subintervals may (e.g., each) have widths (e.g., a width) proportional to the probabilities (e.g., the probability) of the symbol having a different one of the values in the m-ary source alphabet. m may be equal to two and/or the initial coding interval may be subdivided into two disjoint intervals that each have a width proportional to the probability of a different one of the two possible values {0, 1} (e.g., for binary symbol, such as the indication 2138). The probabilities, of the symbol, having the different values in the m-ary source alphabet may be referred to as a probability model for the symbol (e.g., as described herein). The symbol may be arithmetically decoded from arithmetic codeword 2152 based on (e.g., by) determining the symbol value corresponding to the subinterval in which the arithmetic codeword falls. The decoder may (e.g., sequentially) decode each symbol si of a sequence s={s1, s2, . . . si, . . . sN) encoded by arithmetic codeword 2152. For example, the symbols si of the sequence s may be decoded based on (e.g., by) recursively using the interval-subdivision scheme N times and determining which subinterval arithmetic codeword 2152 falls within for each recursive iteration.

The arithmetic decoder 2154 may receive probability model 2144 for indication 2138 from context modeler 2146 (e.g., for decoding the symbol corresponding to the indication 2138). The context modeler 2156 may determine probability model 2144 for indication 2138, for example, based on (e.g., by) a fixed selection and/or an adaptive selection from among two or more probability models (for example, as described herein, such as with respect to the for context modeler 2146 in FIG. 21C).

One or more probability model update parameters 2150 may be determined and/or provided (e.g., by the arithmetic decoder 2154 and/or to the context modeler 2156). The one or more probability model update parameters 2150 may be determined and/or provided, for example after arithmetic decoder 2154 decodes indication 2138 from arithmetic codeword 2152. The probability model 2144 may be adapted and/or updated (e.g., by the context modeler 2156), for example, based on the one or more probability model update parameters 2150. For example, the one or more probability model update parameters 2150 may comprise the actual decoded value of the indication 2138. The probability model 2144 may be updated by increasing PLPS for indication 2138 (e.g., based on and/or if the actual decoded value of indication 2138 is not equal to vMPS). The probability model 2144 may be updated by decreasing PLPS for indication 2138 (e.g., based on and/or if the actual decoded value of indication 2138 is equal to vMPS).

The decoder may determine the value of magnitude symbol 2116 of BVD 2110 based on the value of the magnitude symbol 2117 of the BVD predictor 2136 and the value of indication 2138 (e.g., after and/or based on decoding the indication 2138). For example, the decoder may determine the value of magnitude symbol 2116 of BVD 2110 as being equal to the magnitude symbol of the BVD predictor 2136 based on the indication 2138 indicating that the value of the magnitude symbol 2116 of the BVD 2110 matches the value of the magnitude symbol 2117 of the BVD predictor 2136. Also, or alternatively, the decoder may determine the value of magnitude symbol 2116 of BVD 2110 as being not equal to (and/or equal to the opposite value of) the magnitude symbol 2117 of the BVD predictor 2136, for example, based on indication 2138 indicating that the value of the magnitude symbol 2116 of the BVD 2110 does not match the value of the magnitude symbol 2116 of the BVD predictor 2136. The magnitude symbol 2116 of the BVD predictor 2110 may have a value that matches the value of magnitude symbol 2116 of the BVD 2110 (e.g., a value of 0 in FIG. 21D). The indication 2138 may therefore indicate that the value of magnitude symbol 2116 of BVD 2110 matches the value of magnitude symbol 2116 of BVD predictor 2137. The indication 2138 may be, for example, a single bit that has the value: 0 if the value of magnitude symbol 2116 of BVD 2110 matches the value of magnitude symbol 2117 of BVD predictor 2136; and the indication 2138 may be, for example, a single bit that has the value 1 if the value of magnitude symbol 2116 of BVD 2110 does not match the value of magnitude symbol 2117 of BVD predictor 2136. A logic 2158 may be used to determine magnitude symbol 2116 of BVD 2110. For example, the logic 2158 may implement a logical XOR function. The indication 2138 may indicate (e.g., based on the magnitude symbols 2116/2117 being non-binary) the first candidate among the plurality of candidates (e.g., as sorted based on their respective costs) that has a value of magnitude symbol 2117 that matches the value of the magnitude symbols 2116 of the BVD 2110.

The value of the magnitude symbol 2117 of the BVD predictor 2136 may be determined (e.g., by the decoder, as described herein, such as with respect to the encoder). The BVD predictor 2136 may be selected from among a plurality of BVD candidates based on costs of the plurality of the BVD candidates. The BVD candidates may include a BVD candidate for each possible value of the magnitude symbol 2116 of the BVD 2110. For example, a magnitude symbol of the BVD 2110 represented in binary form has only two possible values. Therefore, the BVD candidates may include at least two BVD candidates for representation (e.g., at least one for each possible value of the magnitude symbol in the BVD 2110 being encoded): a first BVD candidate equal to the BVD 2110 and a second BVD candidate equal to the BVD 2110 but with the opposite (and/or other) value of the magnitude symbol of the BVD 2110. The cost for each BVD candidate of the plurality of BVD candidates may be determined and/or calculated (e.g., as described herein, such as with respect to the encoder). For example, the cost may be determined and/or calculated based on a difference between a current template of CB 2104 and a candidate template of a RB candidate. The RB candidate may be displaced relative to the CB by a sum of the BVD candidate and the BVP 2108. The decoder may select the BVD candidate with the least and/or lowest cost as BVD predictor 2136. The BVD candidates (e.g., BVD candidates 2118 and 2120) may be determined 2172 from a decoded portion of BVD 2174 (e.g., similar to how BVD candidates are determined 2170 from BVD 2110 at the encoder). For example, each magnitude symbol except magnitude symbol 2116 may be decoded from arithmetic codeword 2152. The BVD candidates may be determined and/or generated (e.g., by the decoder) by assigning a unique combination of values to a number of symbols (e.g., that are omitted from arithmetic codeword 2152). In the example shown in FIG. 21D, one magnitude symbol 2116 may be predicted, and thus only two BVD candidates 2118 and 2120 may be determined as having magnitude symbol 2116 with opposite values of 0 and 1, respectively.

Entropy coding (e.g., encoding, decoding) an indication of whether a value of a magnitude symbol of a BVD matches a value of the magnitude symbol of a BVD candidate (e.g., used as a predictor of the BVD) may be used with respect to multiple magnitude symbols of the BVD (e.g., as described herein, such as with respect to FIGS. 21A-21D). For example, the above approach may be further used with respect to one or more magnitude symbols (and/or a sign symbol) of BVD 2110 other than magnitude symbol 2116. For each additional magnitude symbol of BVD 2110 that the approach discussed above with respect to FIGS. 21A-D is used, additional BVD candidates may be determined. For example, $2^N$ different BVD candidates may be determined, for example, based on N magnitude symbols of BVD 2100 (e.g., by using the methods discussed herein, such as with respect to FIGS. 21A-D)—one for each possible combination of values for the N magnitude symbols of BVD 2110. Cost values may be further determined for (e.g., each of) the BVD candidates and used (e.g., sorted to determine a lowest cost BVD candidate) to determine a BVD predictor for encoding each of the N magnitude symbols of the BVD 2110.

Also, or alternatively, the BVD 2110 and/or the BVD candidates may be represented using fixed-length binary and/or other binarizations and/or representations. For example, BVD 2110 may be represented using unary, truncated unary, k-th order truncated Rice, k-th order exponential-Golomb (EGk), and/or some combination of two or more of these binarization processes. For EGk, each codeword includes a unary prefix of length LN+1 and a suffix of length LN+k, where $LN=\lfloor \log 2((N>>k)+1)\rfloor$. For EGk representations of BVD 2110 and/or components of BVD candidates, any magnitude symbols coded (e.g., as discussed herein, such as with respect to FIGS. 21A-D) may be in the respective suffix of one or more of the BVD 2110 and/or the BVD candidates.

Entropy coding as discussed herein (e.g., discussed with respect to one or more symbols of a BVD used in RRIBC, such as with respect to FIGS. 21A-D) may also, or alternatively, be used with respect to one or more symbols (e.g., sign and/or magnitude) of an MVD (e.g., used in inter prediction). For inter prediction, the terms BV, BVP, BVD, and BVD candidate (e.g., as used in FIGS. 21A-D and associated description herein) may be replaced by the terms MV, MVP, MVD, and MVD, respectively. Whereas RRIBC and inter prediction based on a translational motion model and/or a direction of flipping (e.g., reflection) for a prediction block are discussed herein, methods discussed herein (e.g., with respect to FIGS. 21A-D) may be used with respect to IBC and/or inter prediction based on an affine motion model (and/or other transformation models) for the prediction block.

A candidate template (e.g., each of the candidate templates, as shown in FIG. 21B) may have a shape that corresponds to that of the current template (e.g., defined relative to a CB) flipped in a direction. The shape of the current template may be defined relative to the CB and/or may adjoin and/or surround the CB. The current template may or may not be located immediately adjacent to the CB. The current template may include a plurality of samples in a reconstructed portion of the picture frame. For example, the plurality of samples may include a plurality of reference pixels that have been reconstructed (e.g., encoded and then decoded) and are distributed along at least one of two adjacent sides (e.g., depending on where the picture frame has been reconstructed, such as a left side and an upper side) of the CB. The plurality of reference pixels of the CB may also be referred to as first reference pixels that are close to the CB. A pixel close to the CB may refer to a distance between the pixel and a side of the CB that is closest to the pixel is less than a threshold. The distance between the pixel and the side of the coding block may be defined by a number or count of pixels between the pixel and the side of the CB. The threshold may be equal to 1, or 2, or 3, or 4, etc.

The current template may include a first portion and a second portion. The first portion may include a number of rows of (e.g., neighboring reconstructed) samples above the CB. The second portion may include a number of columns of (e.g., neighboring reconstructed) samples to the left of the CB. Other shapes of current template may be defined relative to the CB to include a set of reconstructed samples. A candidate template may be compared against the current template by comparing a sample from the candidate template to a sample from the current template, where the sample from the candidate template is at a location that corresponds to, based on a transformation model relating the candidate RB to the CB, a location of the sample of current template. For example, in RRIBC, the candidate template may be compared against the current template by comparing samples from the candidate template to samples from the current template. For each comparison, a sample from the candidate template is compared to a sample of the current template, where the sample from the candidate template is at a location that mirrors, based on a direction of flipping, a location of the sample from the current template.

For example, the current template may have a size $T_s$ (e.g., a width of the second portion), a position $(x_c, y_c)$ may refer to the top-left corner of the CB, the CB may have a size W×H and a position $(x_{ref}, y_{ref})$ may refer to the top-left corner of a RB. A pair of samples from the second portion of the current template and a corresponding portion of the reference template (e.g., for horizontal flipping) may be defined as $\{(x_c-1-j, y_c+i), (x_{ref}+W+j, y_{ref}+i)\}$, where $j\in[0, T_s)$, $i\in[0, H)$. Samples in the first portion of the current template may be similarly compared to samples in a corresponding portion of the candidate template. For example, a pair of samples for the first portion of the current template and the corresponding portion of the reference template may be defined as $\{(x_c+j, y_c-1-i), (x_{ref}+W-1-j, y_{ref}-1-i)\}$, where $j\in[0, W)$, $i\in[0, T'_s)$. Here, the size $T'_s$ may be a height of the first portion. In an example, $T_s$ may be equal to $T'_s$.

Figure 22A:
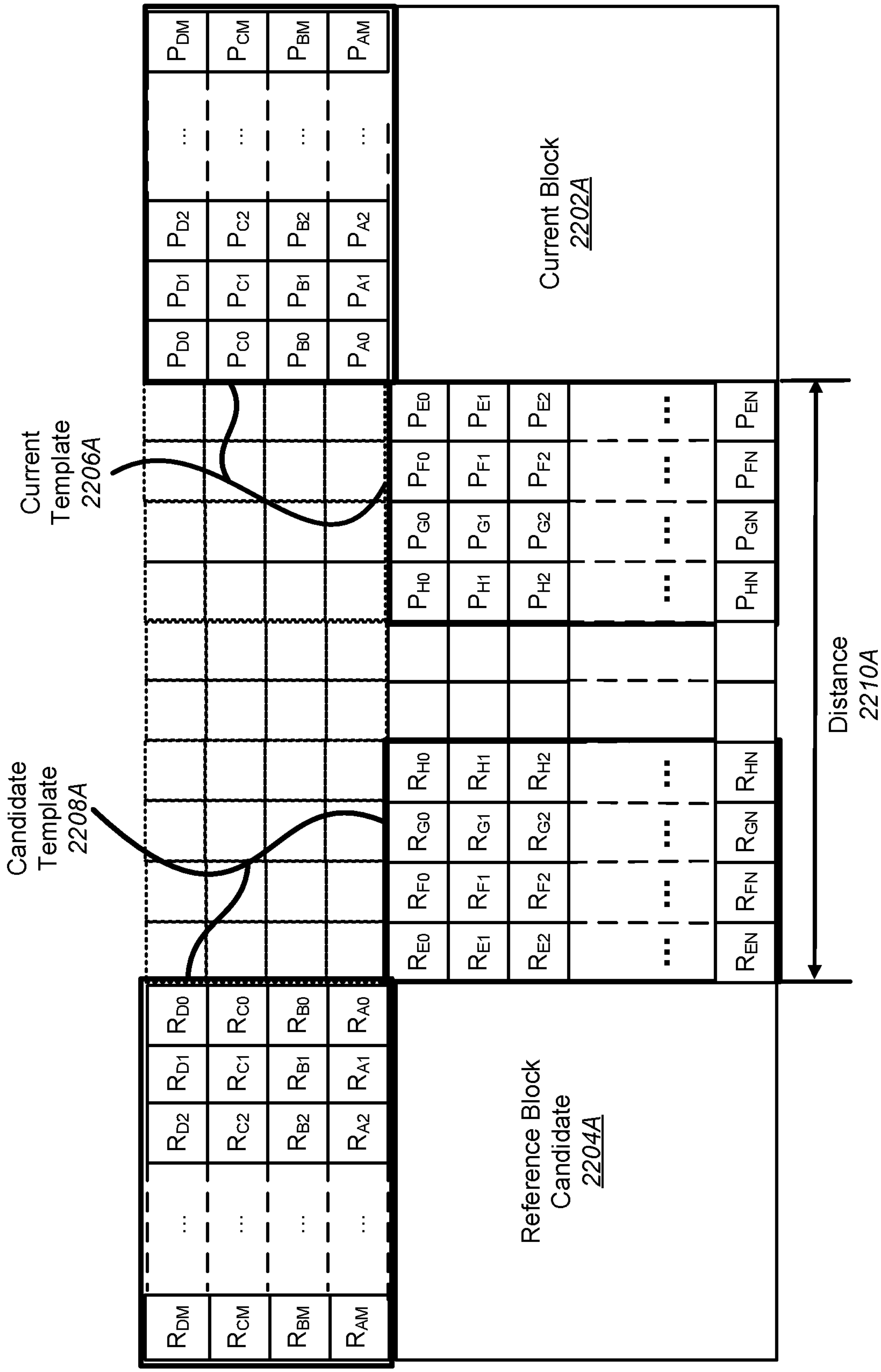
FIGS. 22A-22C show examples of template matching.

In another example, the direction of flipping may be vertical flipping. The current template may have a size of $T_s$ (e.g., a width of the second portion), position $(x_c, y_c)$ may refer to the top-left corner of the CB, which may have a size of W×H, and position $(x_{ref}, y_{ref})$ may refer to the top-left corner of the RB. A pair of samples for the second portion of the current template and a corresponding portion of the reference template may therefore be defined as $\{x_c-1-j, y_c+i), (x_{ref}-1-j, y_{ref}+H-1-i)\}$, where $j\in[0, T_s)$, $i\in[0, H)$. Samples in the first portion of the current template may be also, or alternatively, compared to samples in a corresponding portion of the candidate template. For example, a pair of samples for the first portion of the current template and the corresponding portion of the reference template may be defined as $\{(x_c+j, y_c-1-i), (x_{ref}+j, y_{ref}+H+i)\}$, where $j\in[0, W)$, $i\in[0, T'_s)$. Here, the size $T'_s$ may be a height of the first portion. In an example, $T_s$ may be equal to $T'_s$ FIG. 22A shows an example of template matching between a current template 2206A, of a CB 2202A, and a candidate template 2208A of a RB candidate 2204A. Samples $P_{idx}$ of current template 2206A of a CB 2202A (e.g., to be predicted) and samples $R_{idx}$ of candidate template 2208A of a RB candidate 2204A are shown in FIG. 22A for the case of horizontal flipping. To compare samples of these templates (e.g., to calculate a matching and/or comparison cost), a sum of differences between pairs of samples may be determined (e.g., calculated) as according to equation (29):

$$\sum|P_{idx}-R_{idx}|,\ idx=\{idx_{HOR}, idx_{VER}\}; \tag{29}$$

where $$idx_{HOR}=\{D_{HOR}, n\},\ D\in\{\text{"A"}, \text{"B"}, \text{"C"}, \text{"D"}\},\ n\in[0, cbWidth-1];$$

and $$idx_{VER}=\{D_{VER}, m\},\ D\in\{\text{"E"}, \text{"F"}, \text{"G"}, \text{"H"}\},\ m\in[0, cbHeight-1].$$

Portions of current template 2206A and candidate template 2208A may be compared based on a distance 2210A between the reference block candidate 2204A and the current block 2202A. Equation (29) may be used based on (e.g., if) the distance 2210A being such that the current template 2206A and the candidate template 2208A do not overlap. For example, equation (29) may be used based on (e.g., if) the distance 2210A being greater than or equal to twice the width of the left portion of current template 2206A (e.g., 4 in FIG. 22A).

Figure 22B:
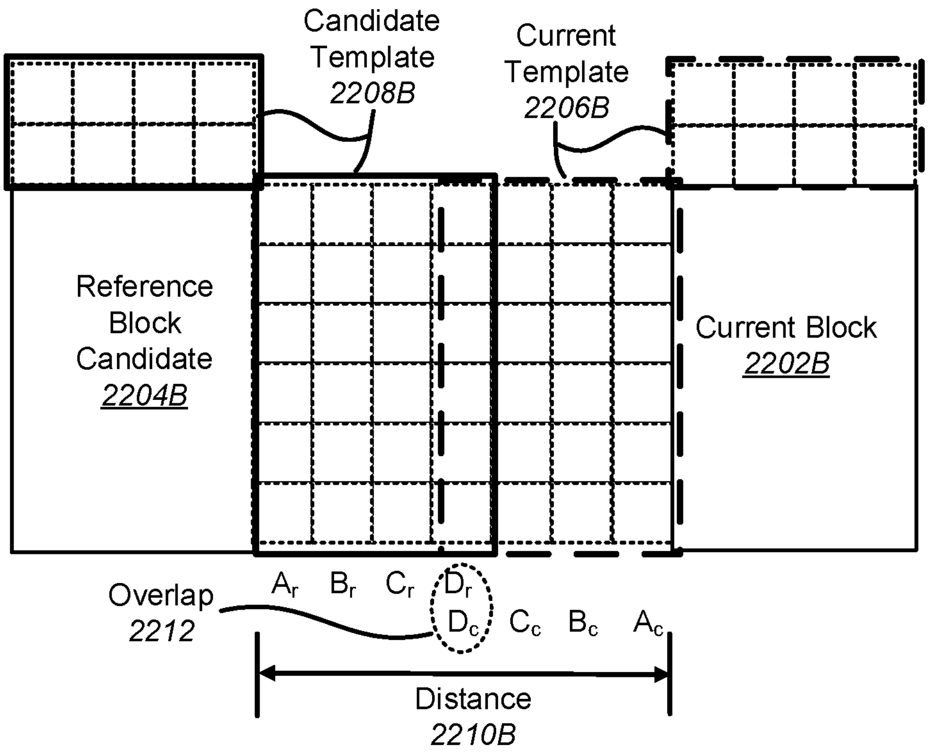

FIG. 22B shows an example of template matching between a current template 2206B, of a CB 2202B, and a candidate template 2208B, of a RB candidate 2204B. More specifically, FIG. 22B shows an example of template matching between the current template 2206B, of a CB 2202B, and a candidate template 2208B, of a RB candidate 2204B, for example, if a distance 2210B between the CB 2202B and the RB candidate 2204B is less than a sum of the candidate template 2208B size and the current template 2206B size (e.g., such that the candidate template 2208B and the current template 2206B overlap). For example, A distance 2210B may be less than twice the template size ($T_s$) (e.g., of the left portion of current template 2206B). For example, FIG. 22B shows an example in which one column of samples of the current template 2206B and the candidate template 2208B overlap (e.g., at overlap 2212).

Figure 22C:
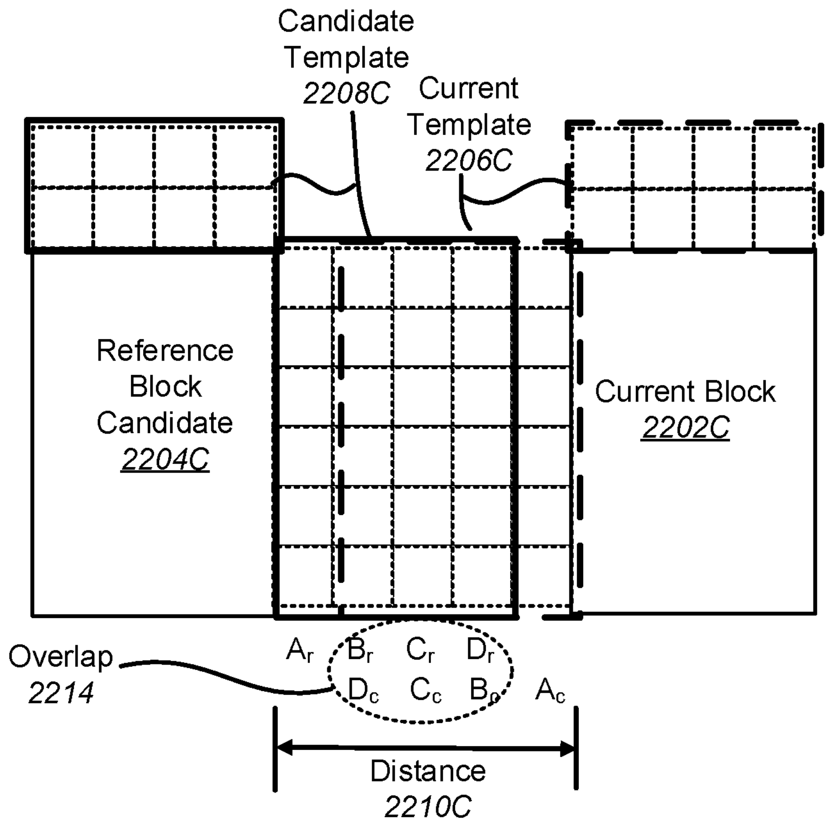

FIG. 22C shows an example of template matching between a current template 2206C, of a CB 2202C, and a candidate template 2208C of a RB candidate 2204C. In FIG. 22C, as in FIG. 22B, the distance 2210C is shown to be less than twice the template size (Ts), (e.g., of the left portion of current template 2206C). FIG. 22C differs from FIG. 22B, for example, in that three columns of samples of current template 2206C and candidate template 2208C overlap (e.g., at overlap 2214).

Sample(s) corresponding to a portion of overlap (e.g., 2212, 2214) between a candidate template (e.g., 2208B, 2208C) and a current template (e.g., 2206B, 2206C) may be omitted from being compared (e.g., from summing over in the sum of equation (29)). Sample(s) corresponding to a portion of overlap (e.g., 2212, 2214) between a candidate template (e.g., 2208B, 2208C) and a current template (e.g., 2206B, 2206C) may be omitted from being compared, for example, based on the distance being less than twice the size of the template size. For horizontal flipping, as shown in FIG. 22B and FIG. 22C, only the upper portions of current template 2206B or 2206C may be compared against the corresponding upper portions of candidate templates 2208B or 2208C. Also, or alternatively, samples not included in the overlap 2212 or 2214, may be compared (e.g., included in a sum of differences)

Some samples from the portion that comprises an overlap (e.g., the portions of the templates that comprise overlaps 2212 or 2214) may be compared (e.g., to determine matching costs between templates). The samples from the portion that comprises the overlap (e.g., 2212 or 2214) may be compared based on the distance (e.g., 2210B or 2210C) being less than twice the size of the current and/or candidate template size and greater than the size of the current and/or candidate template. For horizontal flipping (e.g., shown in FIG. 22B and/or in FIG. 22C), the left portion of current template 2206B (e.g., of size $T_s/2$, and/or samples in columns Ac, Bc, and/or Cc for the example shown in FIG. 22B, and/or samples in column Ac for the example shown in FIG. 22C) may be compared against a corresponding (right) portion of candidate template (e.g., of size $T_s/2$, and/or samples in columns Ar, Br, and/or Cr for the example shown in FIG. 22B, and/or samples in column Ar for the example shown in FIG. 22C). Samples in an overlapping portion (e.g., Dr, Dc in FIG. 22B and Br, Cr, Dr, Dc. Cc. and Bc in FIG. 22C may be omitted from the comparison. For example, corresponding samples that directly overlap with each other (e.g., samples in Dr and Dc in FIG. 22B and samples in Cr and Cc in FIG. 22C) may be omitted from the comparison. Also, or alternatively, corresponding samples within the overlap (e.g., 2212 and/or 2214), but that do not directly overlap with each other (e.g., Br and Bc and Dr and Dc in FIG. 22C) may be included in the compensation so as to account for overcounting (e.g., only one of a comparison of Br and Bc or a comparison of Dr and Dc or both may be included with a factor, such as 0.5, to account for double counting the comparison). Also, or alternatively, (e.g., for simplicity) the portions comprising an overlap (e.g., 2212 and/or 2214) may be omitted entirely from being compared entirely based on the distance (2210B and/or 2210C) being equal to or less than the template size $T_s$. For example, the upper portions of candidate template (e.g., 2208B or 2208C) and the current template (e.g., 2206B or 2206C) may be compared for horizontal flipping based on the distances 2210B and/or 2210C being less than or equal to the template size $T_s$.

FIG. 23 shows an example method for using template matching to encode a CB that is flipped with respect to a RB. The CB may be coded in an RRIBC mode, for example (e.g., as described herein). More specifically, FIG. 23 shows a flowchart 2300 of an example method for using template matching to encode a CB that is flipped with respect to a RB. On or more steps of the method may be implemented by a computing device, such as an encoder, (e.g., encoder 200 as shown in FIG. 2, etc.).

At step 2302, the encoder may determine a BVD associated with a CB. For example, the BVD may be based on a difference between a BV, indicating the CB, and a BVP. The BV may indicate a displacement of a RB relative to the CB, and the RB may be used to predict the CB. The CB and the RB may be flipped in a direction with respect to each other. For example, the RB may be determined based on the CB being flipped in the direction. The RB may be located in and/or determined from (e.g., within and/or based on) a reference region corresponding to the direction of flipping. For example, the RB may be determined (e.g., selected) as a block, from a set of candidate blocks in the reference region, that most closely matches the CB. For example, the block that most closely match the CB may have the best (e.g., smallest) matching cost when compared to the CB (e.g., relative to the other candidate blocks).

The reference region may correspond to the direction. For example, the reference region may comprise a region aligned with the current block in the direction. For example, the reference region may be determined based on the direction and a position of the CB in a video frame. The reference region may include a rectangular region defined by a first range of values in a vertical direction and/or a second range of values in a horizontal direction.

At step 2304, the encoder may determine candidate templates of respective RB candidates (e.g., indicated by respective BVD candidates). The candidate templates may have a shape matching that of a current template (e.g., of the CB) flipped in the direction. The current template may be defined relative to the CB. The candidate templates may be defined relative to the respective RB candidates. The CB may be flipped in the direction relative to the RB. The RB and/or the RB candidates may be located in the reference region (e.g., corresponding to the direction of flipping).

At step 2306, the encoder may compare samples in each of the candidate templates against samples in the current template (e.g., to calculate respective costs of the corresponding RB candidate). For example, samples may be compared, for each candidate template, against corresponding samples in the current template (e.g., at locations, relative to the respective RB candidate or CB, flipped in the direction).

The BVD candidates may include at least a first BVD candidate and a second BVD candidate. A value of the symbol of the first BVD candidate may be different from a value of the symbol of the second BVD candidate. The first BVD candidate may be selected as the BVD predictor. The first BVD candidate may differs from the second BVD candidate only by the value of the symbol. The BVD may be one of the first or second BVD candidates. For example, the first and second BVD candidates may be represented in binary form (e.g., using unary, truncated unary, k-th order truncated Rice, k-th order exponential-Golomb (EGk), fixed-length, and/or some combination of two or more of these or other binarization processes). The BVD candidates may be determined based on the BVD. For example, a quantity (e.g., number) of the BVD candidates may corresponds to a quantity (e.g., number) of symbols of the BVD that are to be predicted (e.g., as described herein). A first codeword may be determined as indicating (and/or representing) the BVD. The first codeword may include the value of the symbol of the BVD. The encoder may determine the BVD candidates based on the first codeword. A second codeword may be entropy encoded, for example, based on the first codeword excluding the symbol. For example, the second codeword may include a subset of symbols of symbols of the BVD (e.g., excluding the symbol).

At step 2308, the encoder may select, based on the costs, one of the BVD candidates as a BVD predictor. The one of the BVD candidates may be selected as the BVD predictor, for example, based on the one of the BVD candidates having a smallest cost among the costs. The BVD predictor may be the first BVD candidate and/or the second BVD candidate.

At step 2310, the encoder may encode (e.g., entropy encode) an indication of whether a value of a symbol of the BVD matches a value of the symbol of the BVD predictor. The symbol may be a sign symbol of the BVD. The symbol may be a magnitude symbol of the BVD. The magnitude symbol may be in a component, of the BVD, corresponding to the direction. For example, the magnitude symbol may be in a horizontal component of the BVD based on the direction being horizontal. For example, the magnitude symbol is in a vertical component of the BVD based on the direction being vertical.

The encoding the indication may include arithmetically encoding the indication. The arithmetically encoding the indication may be based on a probability model indicating: a probability of a least probable symbol for the indication, and/or a value of a most probable symbol for the indication. The probability model may be selected, from a plurality of probability models, based on a position of the symbol in the BVD. The probability model may be selected, from the plurality of probability models, based on a change in value of the BVD for an incremental change in value of the symbol of the BVD. For example, the probability model may be selected, from the plurality of probability models, based on a comparison of a change in the value of the BVD to one or more thresholds.

A plurality of indications indicating whether a plurality of values of a plurality of respective symbols of the BVD matches a plurality of values of the plurality of symbols of the BVD predictor may be entropy encoded (e.g., by the encoder). A quantity of the BVD candidates may be determined, for example, based on a quantity of the plurality of indications. The plurality of symbols may include a subset of symbols indicating the BVD. For example, each of the BVD candidates may include the plurality of symbols with a unique combination of values (e.g., unique to each BVD candidate).

The second codeword (e.g., as described herein, such as with respect to step 2306 shown in FIG. 23) may exclude the plurality of symbols that are encoded as the plurality of respective indications. Encoding the indications of whether values of symbols of the BVD match corresponding values of symbols of the BVD predictor (e.g., as disclosed herein) may allow for more efficient compression (e.g., using a regular coding mode of a CABAC encoder) than encoding the values of symbols of the BVD directly (e.g., using the bypass coding mode of the CABAC encoder).

The method shown in FIG. 23, and/or as discussed herein, may be used with respect to one or more symbols (e.g., one or more magnitude symbols, sign symbols) of an MVD (e.g., used in inter prediction), for example, also or alternatively to one or more symbols (e.g., one or more magnitude symbols, sign symbols) of a BVD (e.g., used in RRIBC). For inter prediction, the terms BV, BVP. BVD, and BVD candidate (e.g., used in method 2300 of FIG. 23) may be replaced by the terms MV, MVP, MVD, and MVD.

Figure 24:
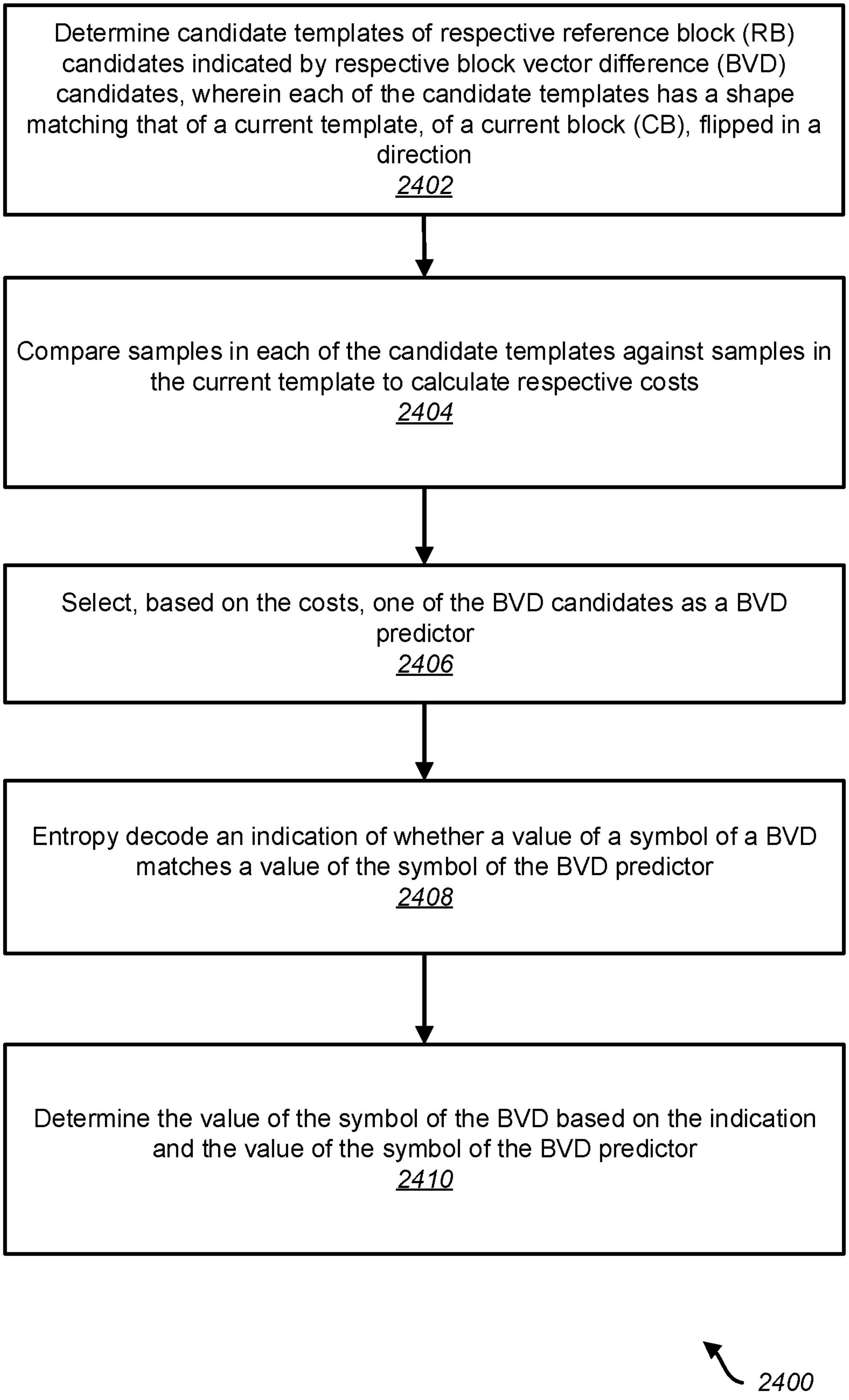
FIG. 24 shows an example method for using template matching to decode a CB that is flipped with respect to a reference block.

FIG. 24 shows an example method for using template matching to decode a CB that is flipped with respect to a RB. More specifically, FIG. 24 shows a flow chart 2400 of an example method for using template matching to decode a CB that is flipped with respect to a RB. For example, the CB may be coded in an RRIBC mode (e.g., as described herein). One or more steps of the method may be implemented by a computing device, such as a decoder (e.g., decoder 300 as shown in FIG. 3). At step 2402, the decoder may determine candidate templates of respective RB candidates indicated by respective block vector differences (BVD) candidates. One or more (e.g., each) of the candidate templates may have a shape matching that of a current template, of a CB, flipped in a direction. The current template may be defined relative to the CB. The candidate templates may be defined relative to the respective RB candidates. The CB may be flipped in the direction relative to the RB. The RB and/or RB candidates may be located in a reference region corresponding to the direction of flipping.

The RB candidates may be displaced relative to the CB by a sum of the respective BVD candidates and a block vector predictor (BVP). Information indicating the BVP may be received (e.g., via a bitstream). The information may indicate, for example, an index indicating the BVP (e.g., from a list of BVPs).

A codeword including a subset of symbols that indicate the BVD may be entropy decoded (e.g., from and/or based on the bitstream). The subset of symbols may exclude a symbol whose value is decoded as an indication of whether the value of the symbol of the BVD matches a value of the symbol of a BVD predictor (e.g., as described herein, such as with respect to 2410). The BVD candidates may be determined based on the codeword.

At step 2404, the decoder may compare samples in each of the candidate templates against samples in the current template (e.g., to calculate respective costs). The samples in a candidate template (e.g., in each of the candidate templates) may be compared against corresponding samples in the current template. The samples in the candidate templates may be compared with the corresponding samples in the current template, wherein locations of the samples relative to the respective RB candidates are flipped in the direction relative to locations of the corresponding samples in the current template relative to the CB.

At step 2406, the decoder may determine and/or select, based on the costs, one of the BVD candidates as a BVD predictor. The one of the BVD candidates may be selected and/or determined as the BVD predictor based on the one of the BVD candidates having a smallest cost among the costs of the other BVD candidates.

The BVD candidates may include at least a first BVD candidate and a second BVD candidate. A value of the symbol of the first BVD candidate may be different from a value of the symbol of the second BVD candidate. The first BVD candidate may be selected as the BVD predictor. The first BVD candidate may differ from the second BVD candidate, for example, only by the value of the symbol. The BVD may be one of the first or second BVD candidates. For example, the first and second BVD candidates may be represented in binary form, such as unary, truncated unary, k-th order truncated Rice, k-th order exponential-Golomb (EGk), fixed-length, and/or some combination of two or more of these or other binarization processes. The first BVD candidate may be represented in binary form using a Golomb codeword comprising the magnitude symbol of the first BVD candidate in a suffix of the Golomb codeword. The Golomb codeword may be an exponential-Golomb codeword.

At step 2408, the decoder may entropy decodes an indication of whether a value of a symbol of a BVD matches a value of the symbol of the BVD predictor. The symbol may be a sign symbol of the BVD, for example. The symbol may be a magnitude symbol of the BVD, for example. The magnitude symbol may be in a component, of the BVD, corresponding to the direction. The magnitude symbol may be in a horizontal component of the BVD, for example, based on the direction being horizontal. The magnitude symbol may be in a vertical component of the BVD, for example, based on the direction being vertical.

The decoding the indication may include arithmetically decoding the indication. The decoding the indication may be based on a probability model indicating: a probability of a least probable symbol for the indication, and/or a value of a most probable symbol for the indication. The probability model may be selected from a plurality of probability models based on a position of the symbol in the BVD. The probability model may be selected from the plurality of probability models based on a change in value of the BVD for an incremental change in value of the symbol of the BVD. For example, the probability model may be selected from the probability models based on a comparison of the change in the value of the BVD to one or more thresholds.

A plurality of indications indicating whether a plurality of values of a plurality of respective symbols of the BVD matches a plurality of values of the plurality of symbols of the BVD predictor may be entropy decoded. A quantity of the BVD candidates (e.g., as described with respect to step 2402) may be determined based on a quantity of the plurality of indications. For example, the quantity of the plurality of indications may be predetermined (e.g., at and/or by the encoder and/or the decoder) and/or may be indicated in the bitstream (e.g., by the encoder). The plurality of symbols may include a subset of symbols indicating (and/or representing a value of) the BVD. For example, each of the BVD candidates may include the plurality of symbols having a unique combination of values to the BVD candidate.

At step 2410, the decoder may determine the value of the symbol of the BVD based on the indication and the value of the symbol of the BVD predictor. The value of the symbol of the BVD may be determined as being equal to the symbol of the BVD predictor based on the indication indicating that the value of the symbol of the BVD matches the value of the symbol of the BVD predictor. The value of the symbol of the BVD may be determined as being not equal to the symbol of the BVD predictor based on the indication indicating that the value of the symbol of the BVD does not match the value of the symbol of the BVD predictor. For example, the BVD not being equal to the symbol of the BVD predictor may include being equal to an opposite value of the value of the symbol of the BVD predictor. For example, the symbol may be a binary symbol, where the values 0 and 1 are opposite values.

A first codeword that excludes the symbol may be entropy decoded (e.g., as described herein, such as with respect to 2402). A second codeword, indicating the BVD (and including the first codeword and/or the symbol with the determined value), may be entropy decoded. A value of the BVD may be determined by binarizing and/or debinarizing the second codeword representing the BVD.

A block vector (BV) may be determined (e.g., by the decoder) based on a sum of the BVD and the BVP. The BV may indicate a displacement of a RB relative to the CB. The RB may be used to determine the CB. The CB and/or the RB may be flipped in the direction with respect to each other. The RB may be located in a reference region corresponding to the direction of flipping.

The reference region may correspond to the direction by being aligned with the CB in the direction. For example, the reference region may be determined based on the direction and a position of the CB in a video frame. In some examples, the reference region may include a rectangular region defined by a first range of values in a vertical direction and a second range of values in a horizontal direction.

The methods discussed herein (e.g., the method described with respect to FIG. 24) may be used with respect to one or more symbols (e.g., a magnitude symbol and/or sign symbol) of an MVD (e.g., used in inter prediction) in addition or alternatively to the one or more symbols (e.g., a magnitude symbol and/or sign symbol) of a BVD (e.g., used in RRIBC, as described herein). For inter prediction, the BV, BVP, BVD, and BVD candidate in the method 2400 (e.g., shown in FIG. 24 and described herein) may be replaced by the MV, MVP, MVD, and MVD.

The encoder and/or the decoder may perform certain reciprocal operations to respectively encode and/or the decode the CB, as described herein (e.g., as described with respect to FIGS. 23 and 24). The encoder and/or the decoder may each and/or either determine candidate templates of respective RB candidates indicated by respective BVD candidates (e.g., as described with respect to S2304 of FIG. 23 and/or S2402 of FIG. 24). In some examples, each of the candidate templates has a shape matching that of a current template, of the CB, flipped in a direction.

The current template may include a set of reconstructed samples neighboring the CB. For example, the reconstructed samples may include reconstructed pixels. The current template may have an “L” shape. For example, the current template may include: a first portion comprising a number of rows of samples above the CB, and a second portion comprising a number of columns of samples to the left of the CB. A candidate template may include (e.g., based on the direction of flipping being horizontal): the number of rows of samples above the CB, and the number of columns of samples to the right of the CB. A candidate template may include (e.g., based on the direction of flipping being vertical): the number of rows of samples below the CB, and the number of columns of samples to the left of the CB.

The encoder and/or the decoder may (e.g., each and/or either) compare samples in each of the candidate templates against samples in the current template (e.g., to calculate respective costs, such as described with respect to step 2306 in FIG. 23 and/or step 2404 in FIG. 24). The encoder may compare (e.g., for each candidate template) the samples in the candidate template with corresponding samples in a template corresponding to the current template flipped in the direction.

A subset of the samples in the candidate template and corresponding samples in the current template may not be used by the encoder in the comparison (e.g., the subset may be excluded from the comparison). For example, the subset may be excluded based on a distance between a RB candidate (e.g., of the RB candidates) and the CB being less than a given (e.g., predefined) distance (e.g., less than at least twice a size, such as a height or a width, of the first portion or of the second portion in the direction of flipping). If the distance is less than the given distance, the candidate template and the current template may overlap (e.g., the first and/or second portions may overlap with each other). The excluded subset of the samples may be samples of the portions of the templates comprising an overlapping region. The subset of samples (e.g., in the overlapping region) may not be used to calculate a cost for a candidate template corresponding to the RB candidate (e.g., differences therebetween may not be used to determine the cost). For example, the portion corresponding to the horizontal direction may be the second portion including the number of columns of samples to the left of the CB (e.g., if the CB is coded in an RRIBC mode and flipped in a horizontal direction). The portion corresponding to the horizontal direction may be the first portion including the number of rows of samples above the CB (e.g., if the CB is coded in the RRIBC mode and flipped in a vertical direction).

For example, the samples of the current template may exclude samples in the second portion based on the direction being horizontal and based on a distance between a RB candidate (of the RB candidates) and the CB being less than a number that is two times the number of columns. The distance may include a distance between a right side of the RB candidate and a left side of the CB. The second portion, and/or an overlapping region thereof, may be excluded from the current template (e.g., for comparing to candidate templates to calculate respective costs).

The samples of the current template (e.g., for use in calculating a cost for a candidate template corresponding to the RB candidate) may exclude samples in the first portion (e.g., if the direction is vertical and based on the distance between the RB candidate, of the RB candidates, and the CB being less than a number that is two times the number of rows). The distance may include a distance between a bottom side of the RB candidate and an upper side of the CB. The first portion may be excluded from the current template for comparing to candidate templates (e.g., to calculate respective costs). The RB candidates may be displaced relative to the CB by a sum of the respective BVD candidates and the BVP. The encoder and/or the decoder may each select, based on the costs, one of the BVD candidates as a BVD predictor (e.g., as described herein, such as with respect to step 2308 in FIG. 23 and/or step 2406 in FIG. 24).

An indication, of whether a value of a symbol of the BVD matches a value of the symbol of the BVD predictor, that is entropy encoded (e.g., by the encoder) may be entropy decoded (e.g., by the decoder). The indication may be decoded based on (e.g., from) a bitstream (e.g., as described herein, such as with respect to step 2310 in FIG. 23 and/or step 2408 in FIG. 24).

The symbol may be a sign symbol of the BVD. The symbol may be a magnitude symbol of the BVD. The magnitude symbol may be in a component, of the BVD, corresponding to the direction. For example, the magnitude symbol may be in a horizontal component of the BVD based on the direction being horizontal. Also, or alternatively, the magnitude symbol may be in a vertical component of the BVD based on the direction being vertical.

The BVD candidate (e.g., selected as the BVD predictor from the BVD candidates) may be represented in binary form using a Golomb codeword. The symbol of the one of the BVD candidates may be in a suffix of the Golomb codeword. The symbol may be a most significant magnitude symbol (e.g., in the suffix). The Golomb codeword may be an exponential-Golomb codeword. Each of the BVD candidates may be represented in binary form as respective codewords (e.g., a Golomb codeword or an exponential-Golomb codeword).

Figure 25:
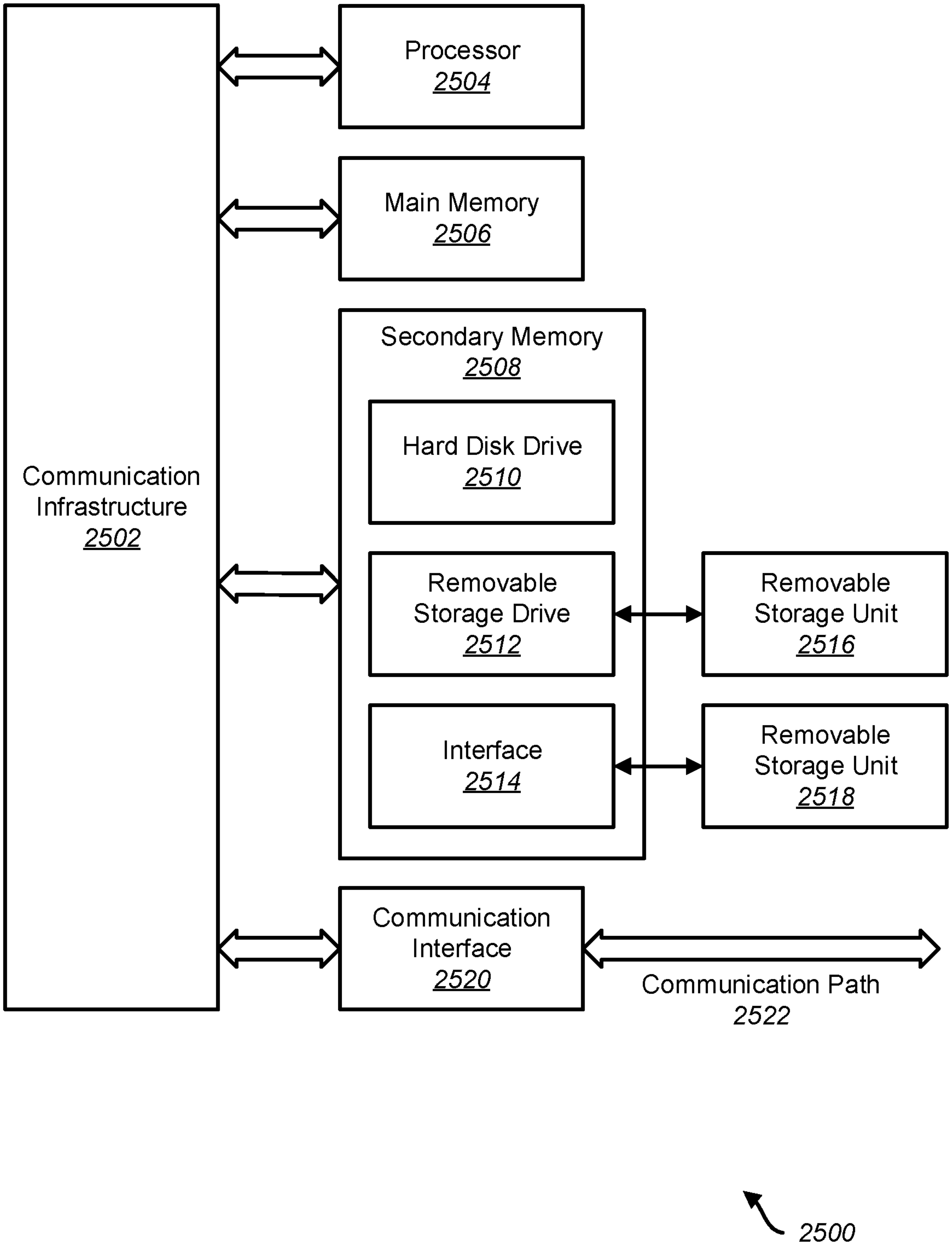
FIG. 25 shows an example computer system in which examples of the present disclosure may be implemented.

FIG. 25 shows an example computer system in which examples of the present disclosure may be implemented. For example, the example computer system 2500 shown in FIG. 25 may implement one or more of the methods described herein. For example, various devices and/or systems described herein (e.g., in FIGS. 1, 2, and 3) may be implemented in the form of one or more computer systems 2500. Furthermore, each of the steps of the flowcharts depicted in this disclosure may be implemented on one or more computer systems 2500.

The computer system 2500 may comprise one or more processors, such as a processor 2504. The processor 2504 may be a special purpose processor, a general purpose processor, a microprocessor, and/or a digital signal processor. The processor 2504 may be connected to a communication infrastructure 2502 (for example, a bus or network). The computer system 2500 may also comprise a main memory 2506 (e.g., a random access memory (RAM)), and/or a secondary memory 2508.

The secondary memory 2508 may comprise a hard disk drive 2510 and/or a removable storage drive 2512 (e.g., a magnetic tape drive, an optical disk drive, and/or the like). The removable storage drive 2512 may read from and/or write to a removable storage unit 2516. The removable storage unit 2516 may comprise a magnetic tape, optical disk, and/or the like. The removable storage unit 2516 may be read by and/or may be written to the removable storage drive 2512. The removable storage unit 2516 may comprise a computer usable storage medium having stored therein computer software and/or data.

The secondary memory 2508 may comprise other similar means for allowing computer programs or other instructions to be loaded into the computer system 2500. Such means may include a removable storage unit 2518 and/or an interface 2514. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2518 and interfaces 2514 which may allow software and/or data to be transferred from the removable storage unit 2518 to the computer system 2500.

The computer system 2500 may also comprise a communications interface 2520. The communications interface 2520 may allow software and data to be transferred between the computer system 2500 and external devices. Examples of the communications interface 2520 may include a modem, a network interface (e.g., an Ethernet card), a communications port, etc. Software and/or data transferred via the communications interface 2520 may be in the form of signals which may be electronic, electromagnetic, optical, and/or other signals capable of being received by the communications interface 2520. The signals may be provided to the communications interface 2520 via a communications path 2522. The communications path 2522 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2516 and 2518 or a hard disk installed in the hard disk drive 2510. The computer program products may be means for providing software to the computer system 2500. The computer programs (which may also be called computer control logic) may be stored in the main memory 2506 and/or the secondary memory 2508. The computer programs may be received via the communications interface 2520. Such computer programs, when executed, may enable the computer system 2500 to implement the present disclosure as discussed herein. In particular, the computer programs, when executed, may enable the processor 2504 to implement the processes of the present disclosure, such as any of the methods described herein. Accordingly, such computer programs may represent controllers of the computer system 2500.

Figure 26:
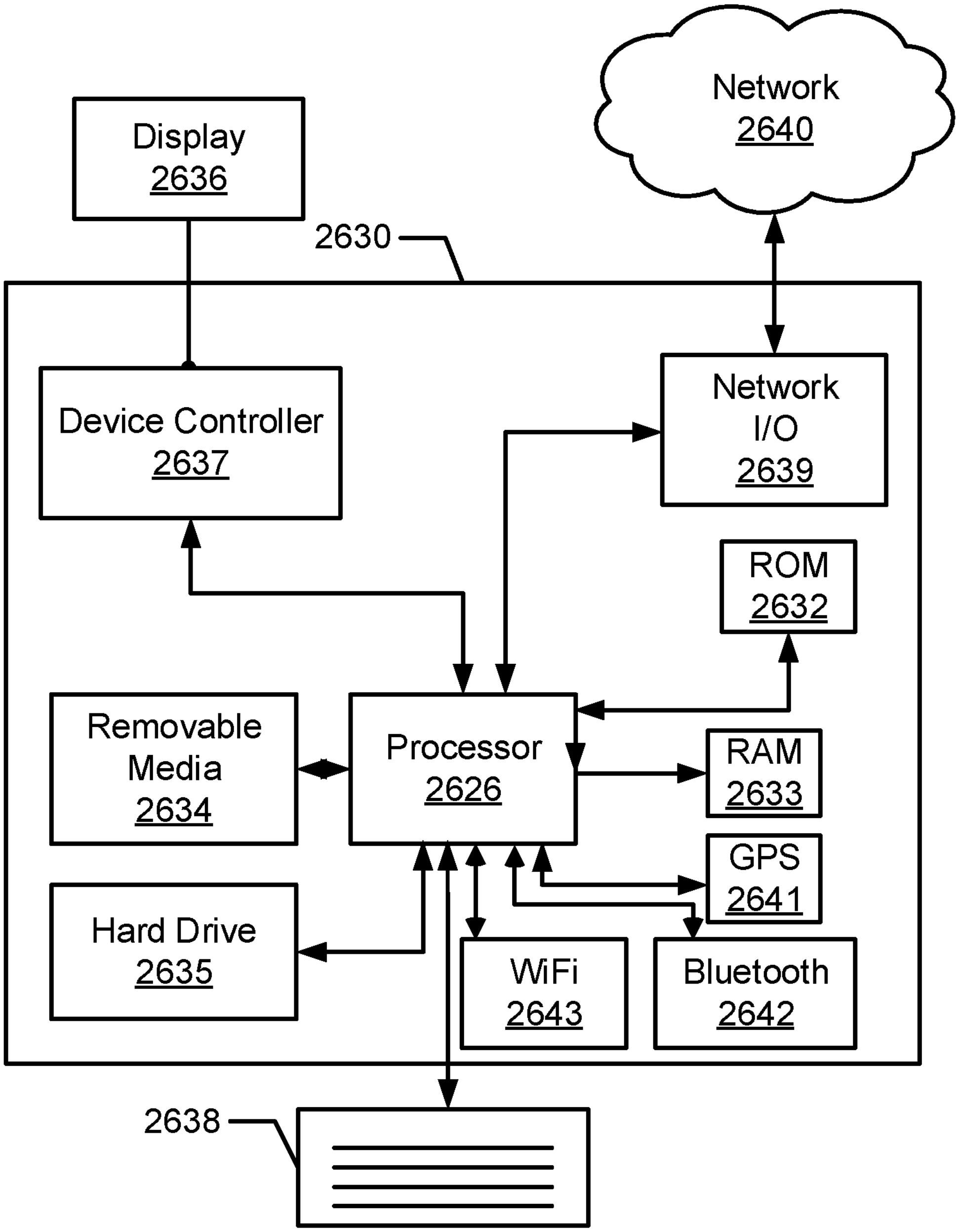
FIG. 26 shows example elements of a computing device that may be used to implement any of the various devices described herein.

FIG. 26 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2630 may include one or more processors 2626, which may execute instructions stored in the random-access memory (RAM) 2633, the removable media 2634 (such as a Universal Serial Bus (USB) drive, compact disk (CD) or digital versatile disk (DVD), or floppy disk drive), or any other desired storage medium. Instructions may also be stored in an attached (or internal) hard drive 2626. The computing device 2630 may also include a security processor (not shown), which may execute instructions of one or more computer programs to monitor the processes executing on the processor 2626 and any process that requests access to any hardware and/or software components of the computing device 2630 (e.g., ROM 2632, RAM 2633, the removable media 2634, the hard drive 2635, the device controller 2637, a network interface 2639, a GPS 2641, a Bluetooth interface 2642, a WiFi interface 2643, etc.). The computing device 2630 may include one or more output devices, such as the display 2636 (e.g., a screen, a display device, a monitor, a television, etc.), and may include one or more output device controllers 2637, such as a video processor. There may also be one or more user input devices 2638, such as a remote control, keyboard, mouse, touch screen, microphone, etc. The computing device 2630 may also include one or more network interfaces, such as a network interface 2639, which may be a wired interface, a wireless interface, or a combination of the two. The network interface 2639 may provide an interface for the computing device 2630 to communicate with a network 2640 (e.g., a RAN, or any other network). The network interface 2639 may include a modem (e.g., a cable modem), and the external network 2640 may include communication links, an external network, an in-home network, a provider's wireless, coaxial, fiber, or hybrid fiber/coaxial distribution system (e.g., a DOCSIS network), or any other desired network. Additionally, the computing device 2630 may include a location-detecting device, such as a global positioning system (GPS) microprocessor 2641, which may be configured to receive and process global positioning signals and determine, with possible assistance from an external server and antenna, a geographic position of the computing device 2630.

The example in FIG. 26 may be a hardware configuration, although the components shown may be implemented as software as well. Modifications may be made to add, remove, combine, divide, etc. components of the computing device 2630 as desired. Additionally, the components may be implemented using basic computing devices and components, and the same components (e.g., processor 2626, ROM storage 2632, display 2636, etc.) may be used to implement any of the other computing devices and components described herein. For example, the various components described herein may be implemented using computing devices having components such as a processor executing computer-executable instructions stored on a computer-readable medium, as shown in FIG. 26. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine a plurality of candidate templates, for a plurality of reference block (RB) candidates associated with a plurality of block vector differences (BVD) candidates, that are flipped in a direction relative to a current template for a current block (CB). The computing device may, based on a comparison between the current template and each candidate template of the plurality of candidate templates, determine a plurality of template matching costs associated with the plurality of BVD candidates. The computing device may, further comprising, based on the plurality of template matching costs, select a BVD candidate, of the plurality of BVD candidates, as a BVD predictor. The computing device may, further comprising decoding an indication of whether a value of a symbol of a BVD matches a value of a symbol of the BVD predictor. The computing device may, based on the indication and the value of the symbol of the BVD predictor, determine the value of the symbol of the BVD. Each candidate template may have a shape, of the current template, flipped in the direction. The comparisons between the current template and each candidate template may be based on comparisons between samples in the candidate template and corresponding samples in the current template, wherein the samples in the candidate template have locations, relative to associated RB candidates, that are flipped relative to locations of the corresponding samples, relative to the CB. Each candidate template may correspond to the current template flipped in the direction may comprise have a shape and orientation matching the current template being flipped in the direction, wherein the current template is defined relative to the CB, and wherein the candidate templates are defined relative to the respective RB candidates. If the direction is horizontal, based on a distance between a RB candidate, of the RB candidates, and the CB being less than a number that is two times the number of columns, the samples of the current template, used to calculate a cost for a candidate template corresponding to the RB candidate, may exclude samples in the second portion; or if the direction is vertical, based on the distance between the RB candidate, of the RB candidates, and the CB being less than a number that is two times the number of rows, the samples of the current template, used to calculate a cost for a candidate template corresponding to the RB candidate, may exclude samples in the first portion. If the direction is horizontal, based on a distance between a RB candidate, of the RB candidates, and the CB being less than a number that is two times the number of columns and that is greater than the number of columns, the samples of the current template, used to calculate a cost for a candidate template corresponding to the RB candidate, may exclude a portion of the samples in the second portion; or if the direction is vertical, based on the distance between the RB candidate, of the RB candidates, and the CB being less than a number that is two times the number of rows and that is greater than the number of columns, the samples of the current template, used to calculate a cost for a candidate template corresponding to the RB candidate, may exclude a portion of the samples in the first portion. The RB candidates may be displaced relative to the CB by a sum of the respective BVD candidates and a block vector predictor (BVP). Each candidate template, corresponding to a reference block candidate, comprises: based on the direction being horizontal, a same quantity of columns of samples to the right of the RB candidate as a quantity of columns of samples, in the current template, to the left of the CB; or based on the direction being vertical, a same quantity of rows of samples below the RB candidate as a quantity of rows of samples, in the current template, above the CB. The comparisons between the current template and each candidate template may not include comparisons between samples, in the candidate template and that overlap with the current template, and corresponding samples in the current template. The comparisons between the current template and each candidate template may include comparisons between samples, in the candidate template and that overlap with the current template, and corresponding samples in the current template. The computing device may decode a codeword comprising a subset of symbols indicating the BVD, wherein the subset of symbols exclude the symbol of the BVD. The computing device may determine the plurality of BVD candidates based on the codeword. The BVD candidates may comprise a first BVD candidate and a second BVD candidate; and a value of the symbol of the first BVD candidate may be different from a value of the symbol of the second BVD candidate, wherein the first BVD candidate may be selected as the BVD predictor. The first BVD candidate may differ from the second BVD candidate only by the value of the symbol. The computing device may entropy decode a first codeword that may exclude the symbol. The computing device may determine a second codeword indicating the BVD, wherein the second codeword may comprise the first codeword and the symbol with the value. The computing device may entropy decode a plurality of indications indicating whether a plurality of values of a plurality of respective symbols of the BVD matches a plurality of values of the plurality of symbols of the BVD predictor. A quantity of the BVD candidates may be determined based on a quantity of the plurality of indications. The plurality of symbols may comprise a subset of symbols indicating the BVD. Each of the BVD candidates may comprise the plurality of symbols with a unique combination of values. The symbol of the BVD may be one or more of: a sign symbol of the BVD, or a magnitude symbol of the BVD. The magnitude symbol may be in a component, of the BVD, corresponding to the direction. Based on the direction being horizontal, the magnitude symbol may be in a horizontal component of the BVD; or based on the direction being vertical, the magnitude symbol may be in a vertical component of the BVD. The BVD candidate, of the plurality of BVD candidates, may be selected as the BVD predictor based on being associated with a smallest template matching cost of the plurality of template matching costs. The decoding the indication further may comprise arithmetically decoding the indication based on a probability model indicating: a probability of a least probable symbol for the indication; and/or a value of a most probable symbol for the indication. The probability model may be selected from probability models based on a position of the symbol in the BVD. The probability model may be selected from probability models based on a change in value of the BVD for an incremental change in value of the symbol of the BVD. The probability model may be selected from the plurality of probability models based on a comparison of the change in the value of the BVD to one or more thresholds. The determining the value of the symbol of the BVD further may comprise determining the value of the symbol of the BVD as being: equal to the symbol of the BVD predictor based on the indication indicating that the value of the symbol of the BVD matches the value of the symbol of the BVD predictor; or not equal to the symbol of the BVD predictor based on the indication indicating that the value of the symbol of the BVD does not match the value of the symbol of the BVD predictor. The determining the value of the symbol of the BVD as being not equal to the symbol of the BVD predictor may comprise determining the value of the symbol of the BVD as being equal to an opposite value of the value of the symbol of the BVD predictor. The computing device may determine a RB based on the BVD, wherein the CB or the RB may be flipped in the direction relative to the other. The computing device may determine a block vector (BV) based on a sum of the BVD and a block vector predictor (BVP), wherein: the BV indicates a displacement of a reference block (RB) relative to the CB; and the RB may be used to predict the CB. The RB may be determined based on the CB being flipped in the direction. The CB and the RB may be flipped in the direction with respect to each other. The RB may be located in a reference region corresponding to the direction. The RB candidates may be located in the reference region. The one of the BVD candidate may be represented in binary form using a Golomb codeword comprising the symbol of the one of the BVD candidates in a suffix of the Golomb codeword. The Golomb codeword may be an exponential-Golomb codeword. The symbol may be a most significant magnitude symbol in the suffix. The current template may comprise a set of reconstructed samples neighboring the CB. The reconstructed samples may comprise reconstructed pixels. The decoding the indication may comprise entropy decoding the indication. The decoding the indication may comprise arithmetically decoding the indication based on a probability model indicating one or more of: a probability of a least probable symbol for the indication; or a value of a most probable symbol for the indication. The CB may be encoded in a reconstruction-reordered intra block copy mode. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the BVD. A computer-readable medium may store instructions that, when executed, cause performance of the described method, additional operations and/or include the additional elements.

A computing device may perform a method comprising multiple operations. The computing device may determine a block vector difference (BVD) based on a difference between a block vector (BV), of a current block (CB), and a block vector predictor (BVP). The computing device may determine a plurality of candidate templates, for a plurality of reference block (RB) candidates associated with a plurality of BVD candidates, that are flipped in a direction relative to a current template for the CB. The computing device may, based on comparisons between the current template and each of the candidate templates of the RB candidates associated with the BVD candidates, determine a plurality of template matching costs for the plurality of BVD candidates. The computing device may, based on the plurality of template matching costs, select a BVD candidate, of the BVD candidates, as a BVD predictor. The computing device may encode an indication of whether a value of a symbol of the BVD matches a value of a symbol of the BVD predictor. Each of the candidate templates corresponds to the current template flipped in the direction may have a shape and orientation matching the current template being flipped in the direction, wherein the current template may be defined relative to the CB, and wherein the candidate templates are defined relative to the respective RB candidates. Each candidate template may have a shape, of the current template, flipped in the direction. The determining the plurality of template matching costs may be based on, for each candidate template of the plurality of candidate templates, comparisons between samples in the candidate template are compared and corresponding samples in the current template, wherein the samples in the candidate template are at locations, relative to a corresponding RB candidate, corresponding to locations, of the corresponding samples in the current template relative to the CB, flipped in the direction. The current template may comprise a first portion comprising a number of rows of samples above the CB; and a second portion comprising a number of columns of samples to the left of the CB. Based on the direction being horizontal, each candidate template may comprise: the number of rows of samples above the CB, and the number of columns of samples to the right of the CB; or based on the direction being vertical, each candidate template may comprise: the number of rows of samples below the CB, and the number of columns of samples to the left of the CB. If the direction is horizontal, based on a distance between a RB candidate, of the RB candidates, and the CB being less than a number that is two times the number of columns, the samples of the current template, used to calculate a cost for a candidate template corresponding to the RB candidate, may exclude samples in the second portion; or if the direction is vertical, based on the distance between the RB candidate, of the RB candidates, and the CB being less than a number that is two times the number of rows, the samples of the current template, used to calculate a cost for a candidate template corresponding to the RB candidate, may exclude samples in the first portion. If the direction is horizontal, based on a distance between a RB candidate, of the RB candidates, and the CB being less than a number that is two times the number of columns and that is greater than the number of columns, the samples of the current template, used to calculate a cost for a candidate template corresponding to the RB candidate, may exclude a portion of the samples in the second portion; or if the direction is vertical, based on the distance between the RB candidate, of the RB candidates, and the CB being less than a number that is two times the number of rows and that is greater than the number of columns, the samples of the current template, used to calculate a cost for a candidate template corresponding to the RB candidate, may exclude a portion of the samples in the first portion. The RB candidates may be displaced relative to the CB by a sum of the respective BVD candidates and the BVP. The BVD candidates may comprise a first BVD candidate and a second BVD candidate; and a value of the symbol of the first BVD candidate may be different from a value of the symbol of the second BVD candidate, wherein the first BVD candidate is selected as the BVD predictor. The first BVD candidate differs from the second BVD candidate only by the value of the symbol. The computing device may determine a first codeword, comprising the symbol with the value, indicating the BVD, wherein the BVD candidates are determined based on the first codeword The computing device may entropy encode a second codeword based on the first codeword excluding the symbol. The computing device may entropy encode a plurality of indications indicating whether a plurality of values of a plurality of respective symbols of the BVD matches a plurality of values of the plurality of symbols of the BVD predictor. A quantity of the BVD candidates may be determined based on a quantity of the plurality of indications. The plurality of symbols may comprise a subset of symbols indicating the BVD. Each of the BVD candidates may comprise the plurality of symbols with a unique combination of values. The symbol may be a sign symbol of the BVD. The symbol may be a magnitude symbol of the BVD. The magnitude symbol may be in a component, of the BVD, corresponding to the direction. Based on the direction being horizontal, the magnitude symbol may be in a horizontal component of the BVD; or based on the direction being vertical, the magnitude symbol may be in a vertical component of the BVD. The one of the BVD candidates may be selected as the BVD predictor based on the one of the BVD candidates having a smallest cost among the costs. The encoding the indication further may comprise arithmetically encode the indication based on a probability model indicating: a probability of a least probable symbol for the indication; and/or a value of a most probable symbol for the indication. The probability model may be selected from probability models based on a position of the symbol in the BVD. The probability model may be selected from probability models based on a change in value of the BVD for an incremental change in value of the symbol of the BVD. The probability model may be selected from the plurality of probability models based on a comparison of the change in the value of the BVD to one or more thresholds. The BV indicates a displacement of a reference block (RB) relative to the CB; and the RB may be used to predict the CB. The RB may be determined based on the CB being flipped in the direction. The CB and the RB may be flipped in the direction with respect to each other. The RB may be located in a reference region corresponding to the direction. The RB candidates may be located in a reference region corresponding to the direction. The CB may be coded in a reconstruction-reordered intra block copy mode. The one of the BVD candidate may be represented in binary form using a Golomb codeword comprising the symbol of the one of the BVD candidates in a suffix of the Golomb codeword. The Golomb codeword may be an exponential-Golomb codeword. The symbol may be a most significant magnitude symbol in the suffix. The current template may comprise a set of reconstructed samples neighboring the CB. The reconstructed samples may comprise reconstructed pixels. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to decode the BVD. A computer-readable medium may store instructions that, when executed, cause performance of the described method, additional operations and/or include the additional elements.

A computing device may perform a method comprising multiple operations. The computing device may determine a plurality of candidate templates, for a plurality of reference block (RB) candidates associated with a plurality of block vector differences (BVD) candidates, based on a current template for a current block (CB), wherein each candidate template, of the plurality of candidate templates, has a shape, of the current template, flipped in a direction. The computing device may, based on a comparison between the current template and each candidate template of the plurality of candidate templates, determine a plurality of template matching costs corresponding to the plurality of BVD candidates. The computing device may, based on the plurality of template matching costs, select a BVD candidate, of the plurality of BVD candidates, as a BVD predictor. The computing device may, decode information based on a BVD and the BVD predictor. The computing device may determine, based on the decoded information, a value of a symbol of the BVD. The decoded information may comprise an indication of whether a value of a symbol of the BVD matches a value of a corresponding symbol of the BVD predictor. The current template may comprise: a first portion comprising a first quantity of rows of samples above the CB; and a second portion comprising a second quantity of columns of samples to the left of the CB. Each candidate template, of the plurality of candidate templates, corresponding to a RB candidate of the plurality of RB candidates, may comprise, based on the direction being a horizontal direction: a first portion comprising the first quantity of rows of samples above the RB candidate; and a second portion comprising the second quantity of columns of samples to the right of the RB candidate. Each candidate template, of the plurality of candidate templates, corresponding to a RB candidate of the plurality of RB candidates, may comprise, based on the direction being a vertical direction: a first portion comprising the first quantity of rows of samples below the RB candidate; and a second portion comprising the second quantity of columns of samples to the left of the RB candidate. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the BVD. A computer-readable medium may store instructions that, when executed, cause performance of the described method, additional operations and/or include the additional elements.

A computing device may perform a method comprising multiple operations. The computing device may determine a plurality of candidate templates, for a plurality of reference block (RB) candidates associated with a plurality of motion vector differences (MVD) candidates, that are flipped in a direction relative to a current template for a current block (CB). The computing device may, based on a comparison between the current template and each candidate template of the plurality of candidate templates, determine a plurality of template matching costs associated with the plurality of MVD candidates. The computing device may, further comprising, based on the plurality of template matching costs, select a MVD candidate, of the plurality of MVD candidates, as a MVD predictor. The computing device may, further comprising decoding an indication of whether a value of a symbol of a MVD matches a value of a symbol of the MVD predictor. The computing device may, based on the indication and the value of the symbol of the MVD predictor, determine the value of the symbol of the MVD. Each candidate template may have a shape, of the current template, flipped in the direction. The comparisons between the current template and each candidate template may be based on comparisons between samples in the candidate template and corresponding samples in the current template, wherein the samples in the candidate template have locations, relative to associated RB candidates, that are flipped relative to locations of the corresponding samples, relative to the CB. Each candidate template may correspond to the current template flipped in the direction may comprise have a shape and orientation matching the current template being flipped in the direction, wherein the current template is defined relative to the CB, and wherein the candidate templates are defined relative to the respective RB candidates. If the direction is horizontal, based on a distance between a RB candidate, of the RB candidates, and the CB being less than a number that is two times the number of columns, the samples of the current template, used to calculate a cost for a candidate template corresponding to the RB candidate, may exclude samples in the second portion; or if the direction is vertical, based on the distance between the RB candidate, of the RB candidates, and the CB being less than a number that is two times the number of rows, the samples of the current template, used to calculate a cost for a candidate template corresponding to the RB candidate, may exclude samples in the first portion. If the direction is horizontal, based on a distance between a RB candidate, of the RB candidates, and the CB being less than a number that is two times the number of columns and that is greater than the number of columns, the samples of the current template, used to calculate a cost for a candidate template corresponding to the RB candidate, may exclude a portion of the samples in the second portion; or if the direction is vertical, based on the distance between the RB candidate, of the RB candidates, and the CB being less than a number that is two times the number of rows and that is greater than the number of columns, the samples of the current template, used to calculate a cost for a candidate template corresponding to the RB candidate, may exclude a portion of the samples in the first portion. The RB candidates may be displaced relative to the CB by a sum of the respective MVD candidates and a motion vector predictor (MVP). Each candidate template, corresponding to a reference block candidate, comprises: based on the direction being horizontal, a same quantity of columns of samples to the right of the RB candidate as a quantity of columns of samples, in the current template, to the left of the CB; or based on the direction being vertical, a same quantity of rows of samples below the RB candidate as a quantity of rows of samples, in the current template, above the CB. The comparisons between the current template and each candidate template may not include comparisons between samples, in the candidate template and that overlap with the current template, and corresponding samples in the current template. The comparisons between the current template and each candidate template may include comparisons between samples, in the candidate template and that overlap with the current template, and corresponding samples in the current template. The computing device may decode a codeword comprising a subset of symbols indicating the MVD, wherein the subset of symbols exclude the symbol of the MVD. The computing device may determine the plurality of MVD candidates based on the codeword. The MVD candidates may comprise a first MVD candidate and a second MVD candidate; and a value of the symbol of the first MVD candidate may be different from a value of the symbol of the second MVD candidate, wherein the first MVD candidate may be selected as the MVD predictor. The first MVD candidate may differ from the second MVD candidate only by the value of the symbol. The computing device may entropy decode a first codeword that may exclude the symbol. The computing device may determine a second codeword indicating the MVD, wherein the second codeword may comprise the first codeword and the symbol with the value. The computing device may entropy decode a plurality of indications indicating whether a plurality of values of a plurality of respective symbols of the MVD matches a plurality of values of the plurality of symbols of the MVD predictor. A quantity of the MVD candidates may be determined based on a quantity of the plurality of indications. The plurality of symbols may comprise a subset of symbols indicating the MVD. Each of the MVD candidates may comprise the plurality of symbols with a unique combination of values. The symbol of the MVD may be one or more of: a sign symbol of the MVD, or a magnitude symbol of the MVD. The magnitude symbol may be in a component, of the MVD, corresponding to the direction. Based on the direction being horizontal, the magnitude symbol may be in a horizontal component of the MVD; or based on the direction being vertical, the magnitude symbol may be in a vertical component of the MVD. The MVD candidate, of the plurality of MVD candidates, may be selected as the MVD predictor based on being associated with a smallest template matching cost of the plurality of template matching costs. The decoding the indication further may comprise arithmetically decoding the indication based on a probability model indicating: a probability of a least probable symbol for the indication; and/or a value of a most probable symbol for the indication. The probability model may be selected from probability models based on a position of the symbol in the MVD. The probability model may be selected from probability models based on a change in value of the MVD for an incremental change in value of the symbol of the MVD. The probability model may be selected from the plurality of probability models based on a comparison of the change in the value of the MVD to one or more thresholds. The determining the value of the symbol of the MVD further may comprise determining the value of the symbol of the MVD as being: equal to the symbol of the MVD predictor based on the indication indicating that the value of the symbol of the MVD matches the value of the symbol of the MVD predictor; or not equal to the symbol of the MVD predictor based on the indication indicating that the value of the symbol of the MVD does not match the value of the symbol of the MVD predictor. The determining the value of the symbol of the MVD as being not equal to the symbol of the MVD predictor may comprise determining the value of the symbol of the MVD as being equal to an opposite value of the value of the symbol of the MVD predictor. The computing device may determine a RB based on the MVD, wherein the CB or the RB may be flipped in the direction relative to the other. The computing device may determine a motion vector (MV) based on a sum of the MVD and a motion vector predictor (MVP), wherein: the MV indicates a displacement of a reference block (RB) relative to the CB; and the RB may be used to predict the CB. The RB may be determined based on the CB being flipped in the direction. The CB and the RB may be flipped in the direction with respect to each other. The RB may be located in a reference region corresponding to the direction. The RB candidates may be located in the reference region. The one of the MVD candidate may be represented in binary form using a Golomb codeword comprising the symbol of the one of the MVD candidates in a suffix of the Golomb codeword. The Golomb codeword may be an exponential-Golomb codeword. The symbol may be a most significant magnitude symbol in the suffix. The current template may comprise a set of reconstructed samples neighboring the CB. The reconstructed samples may comprise reconstructed pixels. The decoding the indication may comprise entropy decoding the indication. The decoding the indication may comprise arithmetically decoding the indication based on a probability model indicating one or more of: a probability of a least probable symbol for the indication; or a value of a most probable symbol for the indication. The CB may be encoded in a inter prediction mode. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the MVD. A computer-readable medium may store instructions that, when executed, cause performance of the described method, additional operations and/or include the additional elements.

A computing device may perform a method comprising multiple operations. The computing device may determine a motion vector difference (MVD) based on a difference between a motion vector (MV), of a current block (CB), and a motion vector predictor (MVP). The computing device may determine a plurality of candidate templates, for a plurality of reference block (RB) candidates associated with a plurality of MVD candidates, that are flipped in a direction relative to a current template for the CB. The computing device may, based on comparisons between the current template and each of the candidate templates of the RB candidates associated with the MVD candidates, determine a plurality of template matching costs for the plurality of MVD candidates. The computing device may, based on the plurality of template matching costs, select a MVD candidate, of the MVD candidates, as a MVD predictor. The computing device may encode an indication of whether a value of a symbol of the MVD matches a value of a symbol of the MVD predictor. Each of the candidate templates corresponds to the current template flipped in the direction may have a shape and orientation matching the current template being flipped in the direction, wherein the current template may be defined relative to the CB, and wherein the candidate templates are defined relative to the respective RB candidates. Each candidate template may have a shape, of the current template, flipped in the direction. The determining the plurality of template matching costs may be based on, for each candidate template of the plurality of candidate templates, comparisons between samples in the candidate template are compared and corresponding samples in the current template, wherein the samples in the candidate template are at locations, relative to a corresponding RB candidate, corresponding to locations, of the corresponding samples in the current template relative to the CB, flipped in the direction. The current template may comprise a first portion comprising a number of rows of samples above the CB; and a second portion comprising a number of columns of samples to the left of the CB. Based on the direction being horizontal, each candidate template may comprise: the number of rows of samples above the CB, and the number of columns of samples to the right of the CB; or based on the direction being vertical, each candidate template may comprise: the number of rows of samples below the CB, and the number of columns of samples to the left of the CB. If the direction is horizontal, based on a distance between a RB candidate, of the RB candidates, and the CB being less than a number that is two times the number of columns, the samples of the current template, used to calculate a cost for a candidate template corresponding to the RB candidate, may exclude samples in the second portion; or if the direction is vertical, based on the distance between the RB candidate, of the RB candidates, and the CB being less than a number that is two times the number of rows, the samples of the current template, used to calculate a cost for a candidate template corresponding to the RB candidate, may exclude samples in the first portion. If the direction is horizontal, based on a distance between a RB candidate, of the RB candidates, and the CB being less than a number that is two times the number of columns and that is greater than the number of columns, the samples of the current template, used to calculate a cost for a candidate template corresponding to the RB candidate, may exclude a portion of the samples in the second portion; or if the direction is vertical, based on the distance between the RB candidate, of the RB candidates, and the CB being less than a number that is two times the number of rows and that is greater than the number of columns, the samples of the current template, used to calculate a cost for a candidate template corresponding to the RB candidate, may exclude a portion of the samples in the first portion. The RB candidates may be displaced relative to the CB by a sum of the respective MVD candidates and the MVP. The MVD candidates may comprise a first MVD candidate and a second MVD candidate; and a value of the symbol of the first MVD candidate may be different from a value of the symbol of the second MVD candidate, wherein the first MVD candidate is selected as the MVD predictor. The first MVD candidate differs from the second MVD candidate only by the value of the symbol. The computing device may determine a first codeword, comprising the symbol with the value, indicating the MVD, wherein the MVD candidates are determined based on the first codeword The computing device may entropy encode a second codeword based on the first codeword excluding the symbol. The computing device may entropy encode a plurality of indications indicating whether a plurality of values of a plurality of respective symbols of the MVD matches a plurality of values of the plurality of symbols of the MVD predictor. A quantity of the MVD candidates may be determined based on a quantity of the plurality of indications. The plurality of symbols may comprise a subset of symbols indicating the MVD. Each of the MVD candidates may comprise the plurality of symbols with a unique combination of values. The symbol may be a sign symbol of the MVD. The symbol may be a magnitude symbol of the MVD. The magnitude symbol may be in a component, of the MVD, corresponding to the direction. Based on the direction being horizontal, the magnitude symbol may be in a horizontal component of the MVD; or based on the direction being vertical, the magnitude symbol may be in a vertical component of the MVD. The one of the MVD candidates may be selected as the MVD predictor based on the one of the MVD candidates having a smallest cost among the costs. The encoding the indication further may comprise arithmetically encode the indication based on a probability model indicating: a probability of a least probable symbol for the indication; and/or a value of a most probable symbol for the indication. The probability model may be selected from probability models based on a position of the symbol in the MVD. The probability model may be selected from probability models based on a change in value of the MVD for an incremental change in value of the symbol of the MVD. The probability model may be selected from the plurality of probability models based on a comparison of the change in the value of the MVD to one or more thresholds. The MV indicates a displacement of a reference block (RB) relative to the CB; and the RB may be used to predict the CB. The RB may be determined based on the CB being flipped in the direction. The CB and the RB may be flipped in the direction with respect to each other. The RB may be located in a reference region corresponding to the direction. The RB candidates may be located in a reference region corresponding to the direction. The CB may be coded in a inter prediction mode. The one of the MVD candidate may be represented in binary form using a Golomb codeword comprising the symbol of the one of the MVD candidates in a suffix of the Golomb codeword. The Golomb codeword may be an exponential-Golomb codeword. The symbol may be a most significant magnitude symbol in the suffix. The current template may comprise a set of reconstructed samples neighboring the CB. The reconstructed samples may comprise reconstructed pixels. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to decode the MVD. A computer-readable medium may store instructions that, when executed, cause performance of the described method, additional operations and/or include the additional elements.

A computing device may perform a method comprising multiple operations. The computing device may determine a plurality of candidate templates, for a plurality of reference block (RB) candidates associated with a plurality of motion vector differences (MVD) candidates, based on a current template for a current block (CB), wherein each candidate template, of the plurality of candidate templates, has a shape, of the current template, flipped in a direction. The computing device may, based on a comparison between the current template and each candidate template of the plurality of candidate templates, determine a plurality of template matching costs corresponding to the plurality of MVD candidates. The computing device may, based on the plurality of template matching costs, select a MVD candidate, of the plurality of MVD candidates, as a MVD predictor. The computing device may, decode information based on a MVD and the MVD predictor. The computing device may determine, based on the decoded information, a value of a symbol of the MVD. The decoded information may comprise an indication of whether a value of a symbol of the MVD matches a value of a corresponding symbol of the MVD predictor. The current template may comprise: a first portion comprising a first quantity of rows of samples above the CB; and a second portion comprising a second quantity of columns of samples to the left of the CB. Each candidate template, of the plurality of candidate templates, corresponding to a RB candidate of the plurality of RB candidates, may comprise, based on the direction being a horizontal direction: a first portion comprising the first quantity of rows of samples above the RB candidate; and a second portion comprising the second quantity of columns of samples to the right of the RB candidate. Each candidate template, of the plurality of candidate templates, corresponding to a RB candidate of the plurality of RB candidates, may comprise, based on the direction being a vertical direction: a first portion comprising the first quantity of rows of samples below the RB candidate; and a second portion comprising the second quantity of columns of samples to the left of the RB candidate. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the MVD. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

determining, by a computing device, a plurality of candidate templates, for a plurality of reference block (RB) candidates associated with a plurality of block vector differences (BVD) candidates, that are flipped in a direction relative to a current template for a current block (CB) of content;

based on comparisons between the current template and each candidate template of the plurality of candidate templates, determining a plurality of template matching costs associated with the plurality of BVD candidates;

based on the plurality of template matching costs, selecting a BVD candidate, of the plurality of BVD candidates, as a BVD predictor;

decoding an indication of whether a value of a symbol of a BVD matches a value of a symbol of the BVD predictor; and based on the indication and a value of the symbol of the BVD predictor, determining a value of the symbol of the BVD.

2. The method of claim 1, wherein each candidate template has a shape, of the current template, flipped in the direction.

3. The method of claim 1, wherein the comparisons between the current template and each candidate template are based on comparisons between samples in the candidate template and corresponding samples in the current template, wherein the samples in the candidate template have locations, relative to associated RB candidates, that are flipped relative to locations of the corresponding samples, relative to the CB.

4. The method of claim 1, wherein each candidate template, corresponding to a reference block candidate, comprises:

based on the direction being horizontal, a same quantity of columns of samples to the right of the RB candidate as a quantity of columns of samples, in the current template, to the left of the CB; or based on the direction being vertical, a same quantity of rows of samples below the RB candidate as a quantity of rows of samples, in the current template, above the CB.

5. The method of claim 3, wherein the comparisons between the current template and each candidate template do not include comparisons between samples, in the candidate template that overlap with the current template, and corresponding samples in the current template.

6. The method of claim 1, further comprising:

decoding a codeword comprising a subset of symbols indicating the BVD, wherein the subset of symbols exclude the symbol of the BVD; and determining the plurality of BVD candidates based on the codeword.

7. The method of claim 1, wherein the symbol of the BVD is one or more of:

a sign symbol of the BVD, or a magnitude symbol of the BVD.

8. The method of claim 1, wherein the BVD candidate, of the plurality of BVD candidates, is selected as the BVD predictor based on being associated with a smallest template matching cost of the plurality of template matching costs.

9. The method of claim 1, further comprising:

determining a RB based on the BVD, wherein the CB or the RB is flipped in the direction relative to the other.

10. A method comprising:

determining, by a computing device, a block vector difference (BVD) based on a difference between a block vector (BV), of a current block (CB) of content, and a block vector predictor (BVP);

determining a plurality of candidate templates, for a plurality of reference block (RB) candidates associated with a plurality of BVD candidates, that are flipped in a direction relative to a current template for the CB;

based on comparisons between the current template and each of the candidate templates of the RB candidates associated with the BVD candidates, determining a plurality of template matching costs for the plurality of BVD candidates;

based on the plurality of template matching costs, selecting a BVD candidate, of the BVD candidates, as a BVD predictor; and encoding an indication of whether a value of a symbol of the BVD matches a value of a symbol of the BVD predictor.

11. The method of claim 10, wherein each candidate template has a shape, of the current template, flipped in the direction.

12. The method of claim 10, wherein the determining the plurality of template matching costs is based on, for each candidate template of the plurality of candidate templates, comparisons between samples in the candidate template and corresponding samples in the current template, wherein the samples in the candidate template are at locations, relative to a corresponding RB candidate, corresponding to locations, of the corresponding samples in the current template relative to the CB, flipped in the direction.

13. The method of claim 10, wherein the RB candidates are displaced relative to the CB by a sum of the respective BVD candidates and the BVP.

14. The method of claim 10, wherein:

the BVD candidates comprise a first BVD candidate and a second BVD candidate; and a value of the symbol of the first BVD candidate is different from a value of the symbol of the second BVD candidate, wherein the first BVD candidate is selected as the BVD predictor.

15. The method of claim 10, wherein the encoding the indication further comprises arithmetically encoding the indication based on a probability model indicating:

a probability of a least probable symbol for the indication; and a value of a most probable symbol for the indication.

16. The method of claim 10, wherein the RB candidates are located in a reference region corresponding to the direction.

17. The method of claim 10, wherein the CB is coded in a reconstruction-reordered intra block copy mode.

18. A method comprising:

determining, by a computing device, a plurality of candidate templates, for a plurality of reference block (RB) candidates associated with a plurality of block vector differences (BVD) candidates, and based on a current template for a current block (CB) of content, wherein each candidate template, of the plurality of candidate templates, has a shape, of the current template, flipped in a direction;

based on comparisons between the current template and each candidate template of the plurality of candidate templates, determining a plurality of template matching costs corresponding to the plurality of BVD candidates;

based on the plurality of template matching costs, selecting a BVD candidate, of the plurality of BVD candidates, as a BVD predictor;

decoding information based on a BVD and the BVD predictor; and determining, based on the decoded information, a value of a symbol of the BVD.

19. The method of claim 18, wherein the decoded information comprises an indication of whether a value of a symbol of the BVD matches a value of a corresponding symbol of the BVD predictor.

20. The method of claim 18, wherein the current template comprises:

a first portion comprising a first quantity of rows of samples above the CB; and a second portion comprising a second quantity of columns of samples to the left of the CB, and wherein each candidate template, of the plurality of candidate templates, corresponding to a RB candidate of the plurality of RB candidates, comprises:

based on the direction being a horizontal direction:

a first portion comprising the first quantity of rows of samples above the RB candidate; and a second portion comprising the second quantity of columns of samples to the right of the RB candidate, or based on the direction being a vertical direction:

a first portion comprising the first quantity of rows of samples below the RB candidate; and a second portion comprising the second quantity of columns of samples to the left of the RB candidate.

* * * * *